United States Patent [19]

Nakano

[11] Patent Number: 5,307,302

[45] Date of Patent: Apr. 26, 1994

[54] SQUARE ROOT OPERATION DEVICE

[75] Inventor: Hiraku Nakano, Kyoto, Japan

[73] Assignee: Matsushita Electric Industrial Co., Ltd., Osaka, Japan

[21] Appl. No.: 893,082

[22] Filed: Jun. 3, 1992

[30] Foreign Application Priority Data

Jun. 3, 1991 [JP] Japan .................... 3-131001

[51] Int. Cl.⁵ .............................. G06F 7/552
[52] U.S. Cl. ................................ 364/752
[58] Field of Search .................... 364/752, 748

[56] References Cited

U.S. PATENT DOCUMENTS

| | | | |
|---|---|---|---|
| 4,878,190 | 10/1989 | Darley et al. | 364/752 |
| 4,949,296 | 8/1990 | Malinowski | 364/752 |
| 4,999,801 | 3/1991 | Katsuno | 364/748 |
| 5,157,624 | 10/1992 | Hesson | 364/748 |
| 5,159,566 | 10/1992 | Briggs et al. | 364/752 |

FOREIGN PATENT DOCUMENTS 2-25924 of 1990 Japan .

OTHER PUBLICATIONS

P. Montuschi et al., On The Efficient Implementation Of Higher Radix Square Root Algorithms, Dipartimento di Automatica e Informatica, pp. 154–161.

Primary Examiner—David H. Malzahn
Attorney, Agent, or Firm—Willian Brinks Olds Hofer Gilson & Lione

[57] ABSTRACT

An approximation of square root's reciprocal is indexed by a table information storing means taking high-order positions of a 2-bit normalized operand output from a normalizing circuit as an address. A 0th partial residue as being a normalized operand is multiplied by an output of a residue holding circuit by a multiplying circuit to find a partial square root value. The partial square root values obtained at each iteration and having no bit-overlap are held in a plurality of partial square root value holding circuits as a merged square root value. A residue at the next step in an iterative computation is obtained by subtracting a product of the merged square root value times the partial square root value from the residue by an inverting circuit, a multiplicand generator and a $(R + S \times T + T)$ operation unit.

30 Claims, 30 Drawing Sheets

FIG. 2A

| | |
|---|---|
| bit number | 8888 7777 7777 7766<br>3210 9876 5432 1098 |
| input<br>2-bit normalized | |
| residue(0)<br>square root's reciprocal | |
| residue(0) * reciprocal<br>partial square root a1<br>a1 (multiplicand)<br>a1 * a1 | 0000 0100 0001 1100 |
| residue(1)<br>left shift 8 bit residue(1) | |
| residue(1) * reciprocal<br>partial square root a2<br>( a1*2 + a2 )(multiplicand)<br>( a1*2 + a2 ) * a2 | 0000 0111 0010 0001 |
| residue(2)<br>left shift 8 bit residue(2) | |
| residue(2) * reciprocal<br>partial square root a3<br>{( a1 + a2 )*2 + a3 }<br>{( a1 + a2 )*2 + a3 } * a3 | 1111 0011 0100 1110 |
| residue(3)<br>left shift 8 bit residue(3) | |
| residue(3) * reciprocal<br>partial square root a4<br>{( a1 + a2 + a3 )*2 + a4 }<br>{( a1 + a2 + a3 )*2 + a4 } * a4 | 0000 0000 0010 0110 |
| residue(4) | |

| | bit number | 77 7766 6666 |
|---|---|---|
| | | 32 1098 7654 | input
normalized significand residue(0)
square root's reciprocal

| residue(0) * reciprocal | 00 0100 1110 |
|---|---|
| partial square root a1 | |
| a1 (multiplicand) | 00 |
| left shift 8 bit residue(0) | 00 |
| a1 * a1 | 00 | residue(1)

| residue(1) * reciprocal | 11 1110 0110 |
|---|---|
| partial square root a2 | |
| ( a1*2 + a2 )(multiplicand) | 00 |
| left shift 8 bit residue(1) | 11 |
| ( a1*2 + a2 ) * a2 | 11 | residue(2)

| residue(2) * reciprocal | 11 0000 0101 |
|---|---|
| partial square root a3 | |
| {( a1 + a2 )*2 + a3 } | 00 |
| left shift 8 bit residue(2) | 10 |
| {( a1 + a2 )*2 + a3 } * a3 | 10 | residue(3)

| | bit number | 77 7766 6666 |
|---|---|---|
| | | 32 1098 7654 | residue(3)

| residue(3) * reciprocal partial square root a4 | 11 0101 0101 |
|---|---|
| { ( a1 + a2 + a3 )*2 + a4 } | 00 |
| left shift 8bit residue(3) | 11 |
| { ( a1 + a2 + a3 )*2 + a4 } * a4 | 11 | residue(4)

| residue(4) * reciprocal partial square root a5 | 00 0000 0010 |
|---|---|
| { ( a1 + a2 + a3 + a4 )*2 + a5 } | 00 |
| left shift 8 bit residue(4) | 00 |
| { ( a1 + a2 + a3 + a4 )*2 + a5 } * a5 | 00 | residue(5)

| residue(5) * reciprocal partial square root a6 | 11 1100 0000 |
|---|---|
| { ( a1 + -- + a5 )*2 + a6 } | 00 |
| left shift 8bit residue(5) | 11 |
| { ( a1 + -- + a5 )*2 + a6 } * a6 | 11 | residue(6)

| residue(6) * reciprocal partial square root a7 | 11 0110 0000 |
|---|---|
| { ( a1 + -- + a5 + a6 )*2 + a7 } | 00 |
| left shift 8 bit residue(6) | 11 |
| { ( a1 + -- + a5 + a6 )*2 + a7 } * a7 | 11 | residue(7)

| bit number | 88 10 | 7777 9876 | 7777 5432 | 7766 1098 | 6666 7654 |
|---|---|---|---|---|---|
| input normalized significand | | | | | 00 |
| residue(0) square root's reciprocal | | | | | 00 |
| residue(0) * reciprocal partial square root a1 a1 (multiplicand) a1 * a1 | 00 | 0100 | 1110 | 0111 | 0101 00 00 |
| residue(1) left shift 8bit residue(1) | | | | | 11 11 |
| residue(1) * reciprocal partial square root a2 ( a1*2 + a2 )(multiplicand) ( a1*2 + a2 ) * a2 | 11 | 1110 | 0110 | 0000 | 0010 00 11 |
| residue(2) left shift 8bit residue(2) | | | | | 11 10 |
| residue(2) * reciprocal partial square root a3 {( a1 + a2 )*2 + a3 } {( a1 + a2 )*2 + a3 } * a3 | 11 | 0000 | 0101 | 0100 | 1110 00 10 |
| residue(3) | | | | | 11 |

```
bit number                              88   7777 7777 7766 6666
                                        10   9876 5432 1098 7654 residue(3)                                                     11
left shift 8 bit residue(3)                                    11 residue(3) * reciprocal                 11   0101 0101 1111 1110
partial square root a4
{( a1 + a2 + a3 )*2 + a4 }                                     00
{( a1 + a2 + a3 )*2 + a4 } * a4                                11 residue(4)                                                     00
left shift 8 bit residue(4)                                    00 residue(4) * reciprocal                 00   0000 0010 1100 0000
partial square root a5
{( a1 + a2 + a3 + a4 )*2 + a5 }                                00
{( a1 + a2 + a3 + a4 )*2 + a5 } * a5                           00 residue(5)                                                     11
left shift 8 bit residue(5)                                    11 residue(5) * reciprocal                 11   1100 0000 0101 1110
partial square root a6
{( a1 + -- + a5 )*2 + a6 }                                     00
{( a1 + -- + a5 )*2 + a6 } * a6                                11 residue(6)                                                     11
left shift 8 bit residue(6)                                    11 residue(6) * reciprocal                 11   0110 0000 0011 1110
partial square root a7
{( a1 + -- + a5 + a6 )*2 + a7 }                                00
{( a1 + -- + a5 + a6 )*2 + a7 } * a7                           11 residue(7)                                                     11
```

| | | |
|---|---|---|
| bit number | 8888<br>3210 | 7777 7777 7766<br>9876 5432 1098 | input
2-bit normalized residue(0)
square root's reciprocal residue(0) * reciprocal      0000  0100 0001 1100
partial square root a1
a1 (multiplicand)
a1 * a1 residue(1)
left shift 8 bit residue(1)

residue(1) * reciprocal      1111  0111 0001 1101
partial square root a2
( a1*2 + a2 )(multiplicand)
( a1*2 + a2 ) * a2 residue(2)
left shift 8 bit residue(2)

residue(2) * reciprocal      0000  0011 0101 0000
partial square root a3
{( a1 + a2 )*2 + a3 }
{( a1 + a2 )*2 + a3 } * a3 residue(3)
left shift 8 bit residue(3)

residue(3) * reciprocal      0000  0000 0010 0110
partial square root a4
{( a1 + a2 + a3 )*2 + a4 }
{( a1 + a2 + a3 )*2 + a4 } * a4 residue(4)

FIG.18B

| 6666 | 6666 | 5555 | 5555 | 5544 | 4444 | 4444 | 3333 | 3333 |
|------|------|------|------|------|------|------|------|------|
| 7654 | 3210 | 9876 | 5432 | 1098 | 7654 | 3210 | 9876 | 5432 |
|      | 0001 | 0000 | 1101 | 1111 | 1000 | 0101 | 0100 | 1100 |
|      | 0100 | 0011 | 0111 | 1110 | 0001 | 0101 | 0011 | 0011 |
| 0000 | 0100 | 0011 | 0111 | 1110 | 0001 | 0101 | 0011 | 0011 |
| 0001 | 1101 | 1000 | 0101 | 0010 | 0010 | 0111 | 0001 | 1000 |
| 0000 | 0000 | 0000 | 1000 | 0100 | 0000 | 0000 | 0000 | 0000 |
| 0000 | 0100 | 0100 | 0001 | 0000 | 0000 | 0000 | 0000 | 0000 |
| 1111 | 1111 | 1111 | 0110 | 1110 | 0001 | 0101 | 0011 | 0011 |
| 1111 | 0110 | 1110 | 0001 | 0101 | 0011 | 0011 | 1011 | 0100 |
| 0101 | 1010 | 0010 | 0010 | 0111 | 0001 | 1000 | 0000 | 0000 |
| 0000 | 0000 | 0001 | 0000 | 0111 | 0111 | 0010 | 0000 | 0000 |
| 1111 | 0110 | 1101 | 1101 | 1110 | 1100 | 0100 | 0000 | 0000 |
| 0000 | 0000 | 0000 | 0011 | 0110 | 0110 | 1111 | 1011 | 0100 |
| 0000 | 0011 | 0110 | 0110 | 1111 | 1011 | 0100 | 0110 | 1010 |
| 1001 | 0110 | 0111 | 0010 | 1100 | 0000 | 0000 | 1110 | 1010 |
| 0000 | 0000 | 0001 | 0000 | 0110 | 1110 | 0100 | 0011 | 0101 |
| 0000 | 0011 | 0110 | 0110 | 1101 | 0011 | 1110 | 1111 | 1001 |
| 0000 | 0000 | 0000 | 0000 | 0010 | 0111 | 0101 | 0111 | 0001 |
| 0000 | 0000 | 0010 | 0111 | 0101 | 0111 | 0001 | 1000 | 0001 |
| 0101 | 0100 | 0010 | 0111 | 1101 | 1101 | 0111 | 1010 | 0100 |
| 0000 | 0000 | 0001 | 0000 | 0110 | 1110 | 0100 | 0110 | 1010 |
| 0000 | 0000 | 0010 | 0000 | 1101 | 1100 | 1000 | 1101 | 0100 |
| 0000 | 0000 | 0000 | 0110 | 0111 | 1010 | 1000 | 1010 | 1101 |

1111 0000 0000 0000  0000 0000 0000 0000
``` ns
SQUARE ROOT OPERATION DEVICE

BACKGROUND OF THE INVENTION

This invention pertains to a square root operation device in a data processor.

Generally, the Newton-Raphson method is the basis of many of square root operation devices. The process of finding the square root of a numeric value A by this method is first to obtain $1/\sqrt{A}$, thereafter the obtained $1/\sqrt{A}$ being multiplied by A to produce $\sqrt{A}$. The Newton-Raphson method obtains $1/\sqrt{A}$ through a converging calculation. In such a converging calculation, it is known that the closer the initial value of a reciprocal comes to a true value, the lower the number of iteration required to be carried out until a convergent condition has been reached is. Japanese Patent Pub. No. 2-25924 discloses a high-speed square root operation device, according to which a result can be reached after about three to four converging calculations.

However, in such a prior art square root operation device by the Newton-Raphson method, the significand part of a floating-point number input operand is supplied to a multiplying circuit and serves therein as a multiplicand and a multiplier. Because of this, a $53 \times 53$ bit multiplying circuit corresponding to the bit length of the significand part provided with a leading bit is required if the square root of an IEEE standard double-precision floating-point number is to be found. If multiplication instructions and square root operation instructions are not carried out together, no problems will arise, and even though a multiplying circuit for carrying out a multiplication instruction is used for carrying out a square root operation instruction, no difficulties will arise, either. If there is no data interdependence between multiplication and square root operation instructions, to carry out both of the instructions at the same time requires a $53 \times 53$ bit multiplying circuit used for square root operations, which cause such a problem that hardware materials greatly increase.

The present invention was made to provide a square root operation device which applies, as a bit length of a multiplier, an operand length for fixed-point numbers, or a multiplying circuit smaller than the bit length of a significand part for floating-point numbers.

DISCLOSURE OF THE INVENTION

The present invention provides a square root operation device comprising a table information storing means for storing an approximation of square root's reciprocal for an input operand, a residue holding means for holding a residue in finding a square root by iterating at a time a fixed number of bits from a high-order position downward, a multiplying means for carrying out a multiplication (a residue output from the residue holding means and an approximation of square root's reciprocal output from the table information storing means are taken as a multiplicand and a multiplier respectively), a plurality of partial square root value holding means serving as a merged square root value holding means for holding a merged square root value obtained by merging square root values without a bit overlap at each iteration, wherein high-order positions of a product output from the multiplying means are taken as a partial square root value, and a multiplicand generating means for generating batch data of the merged square root value output from the plurality of partial square root value holding means and the square root output from the multiplying means, as a multiplicand. The present square root operation device of the invention further includes an operation means with the following functions. In other words, being supplied with a residue, R output from the residue holding means, a multiplicand, S output from the multiplicand generating means and a partial square root value, T output from the multiplying means, this operation means carries out the operation $(R - S \times T)$.

Before describing the fact that square root operation can be carried out with the above structure, a square root operation method applied to the present invention will be demonstrated. The square root of A is grouped by a fixed number of bits from a high-order position downward, which is expressed by the following formula (1). It is presumed here that there is no bit overlap between partial square root values.

$$\sqrt{A} = a_1 + a_2 + a_3 + a_4 + a_5 \quad (1)$$

Contrary, the following equation (2) is obtained by squaring both sides of the formula (1) for the transformation of the right side thereof.

$$\begin{aligned} A = {} & a_1 \times a_1 + \\ & (a_1 \times 2 + a_2) \times a_2 + \\ & \{(a_1 + a_2) \times 2 + a_3\} \times a_3 + \\ & \{(a_1 + a_2 + a_3) \times 2 + a_4\} \times a_4 + \\ & \{(a_1 + a_2 + a_3 + a_4) \times 2 + a_5\} \times a_5 + \ldots \end{aligned} \quad (2)$$

The square root can be found by means of the following steps using the formula (2).

(i) Multiplying A $(=R_0)$ by the reciprocal of $a_1$. A fixed number of bits at high-order positions of the resultant product of A times the reciprocal of $a_1$ is taken as $a_1$.

(ii) After the calculation of: $R_1 = R_0 - a_1 \times a_1$, left-shift $R_1$ by the fixed number of bits given at (i).

Thereafter, iterate the following (iii) and (iv) as required.

(iii) Multiply $R_i$ by the reciprocal of $a_1$, and take a fixed number of bits at high-order positions of the resultant product as $a_{i+1}$. However, a $a_{i+1}$ should be taken from a higher-order position than $a_1$ by one bit.

(iv) After the calculation of:

$$R_{i+1} = R_i - \{(a_1 + \ldots + a_i) \times 2 + a_{i+1}\} \times a_{i+1},$$

left-shift $R_{i+1}$ by the fixed number of bits given at (i).

High-order bits of A are taken as an address, and the approximation of a reciprocal of $a_1$ stored in the table information storing means is indexed. The product of $R_0 (=A)$ stored in the residue holding means as a 0th residue times the approximation of $a_1$'s reciprocal is calculated by means of the multiplying means whereby $a_1$ is obtained as a high-order bit of the product. Next, in the multiplicand generating means, $a_1$ is output at a first iterative computation, and $R_0$, $a_1$ and $a_1$ are input into the $(R - S \times T)$ operating means to give $R_1$. Next, $a_1$ will be stored in the merged square root value holding means. $R_1$ is left-shifted by a fixed number of bit places and is then stored in the residue holding means. The following process is repeated to the extent that the bit length of a merged square root value has become greater than that of a target square root, with $i \geq 1$.

The product of $R_i$ stored in the residue holding means as an i-th residue times the approximation of $a_1$'s reciprocal is calculated with the multiplying means, thereby giving $a_{i+1}$ as high-order bits of the product. Next, in the multiplicand generating means, $(a_1 + \ldots + a_i)$ is shifted to the left one bit place, which is then merged with $a_{i+1}$ and output as a multiplicand, while $R_i$, $\{(a_1 + \ldots + a_i) \times 2 + a_{i+1}\}$, and $a_{i+1}$ are fed into the $(R - S \times T)$ operating means, giving $R_{i+1}$. Then $a_{i+1}$ is stored in the merged square root value holding means. $R_{i+1}$ is left-shifted by a fixed number of bit places and is then stored in the residue holding means.

In the formulae (1) and (2), it is preconditioned that there are no bit overlaps between partial square root values, however, this precondition is not necessarily required if a square root can be found by the above processes under such a condition that there does exist a bit overlap between partial square root values. Among the processes describe above, index time of the table information storing means, multiplying time required for the multiplication of a residue times an approximation of a reciprocal, generation time of $\{(a_1 + \ldots + a_i) \times 2 + a_{i+1}\}$ and operation time of $(R - S \times T)$ take a large proportion of the whole executing time of a square rooting operation. The generation of a multiplicand, that is, $\{(a_1 + \ldots + a_i) \times 2 + a_{i+1}\}$ can be done by merely left-shifting $a_1$ to $a_i$ one bit place to make them merged with $a_{i+1}$, if there exist no bit overlaps between partial square root values. On the contrary, with regard to $(a_1 + \ldots + a_i)$, if there is a one-bit overlap between partial square root values, the executing time of a square rooting operation will not be influenced if the addition of $(a_1 + \ldots + a_i)$ is carried out together with the operation of $(R - S \times T)$ in advance to storing $a_i$ in the merged square root value holding means. On the other hand, in generating a multiplicand, $(a_1 + \ldots + a_i)$ is a first left-shifted one bit place and is then merged with $a_{i+1}$. The execution of an addition is not required even though there is a one-bit overlap between $a_i$ and $a_{i+1}$, accordingly. If there is a two or more bit overlap between partial square root values, the executing time of a square rooting operation increases, since the execution of an addition is needed in generating a multiplicand, $(a_1 + \ldots + a_i)$. The present invention is intended to be applied to such that there is no bit overlap between partial square root values, and that the addition of $(a_1 + \ldots + a_i)$ is not required.

As described above, the present invention includes the residue holding means, the table information storing means for storing an approximation of square root's reciprocal, the multiplying means of finding out a partial square root, and the $(R - S \times T)$ operating means for finding products, aligned in ascending order, of a merged square root value times a partial square root value by means of iterative computation, from a residue. With such an arrangement, square rooting operations can be carried out using an operand length in the case of a fixed-point number, or a multiplying circuit smaller than the bit length of a significant part in the case of a floating-point number, as the bit length of a multiplier. Therefore, the present invention is able to provide a data processor capable of carrying out the concurrent execution of a multiplication instruction and a square root operation without increasing hardware materials more than necessary. Additionally, when guard, round and sticky bits are used so as to round off a resultant square root, bits below LSB is a bit by bit taken as a guard bit and a round bit respectively, and then an OR of the remaining bits and a bit of each of residues is obtained to give a sticky bit. Accordingly, unlike devices in accordance with the Newton-Raphson method, it is unnecessary to go over accounts in the present invention, which is a second advantage of the invention.

BRIEF DESCRIPTION OF THE DRAWINGS

FIGS. 2A-2C are a table showing respective outputs of each of construction means in FIG. 1 using an example set of specific numeric values.

FIGS. 4A-4C are a table showing respective outputs of each of construction means in FIG. 3 using an example set of specific numeric values.

FIGS. 5A-5C are a table showing respective outputs of each of construction means continued from the ones in FIG. 4.

FIG. 14A-14C are a table showing respective outputs of each of construction means in FIG. 13 using an example set of specific numeric values.

FIGS. 15A-15C are a table showing respective outputs of each of construction means continued from the ones in FIG. 14.

FIGS. 18A-18C are a table showing respective outputs of each of constructions means in FIG. 16 using an example set of specific numeric values.

PREFERRED EMBODIMENTS

Figure 1:
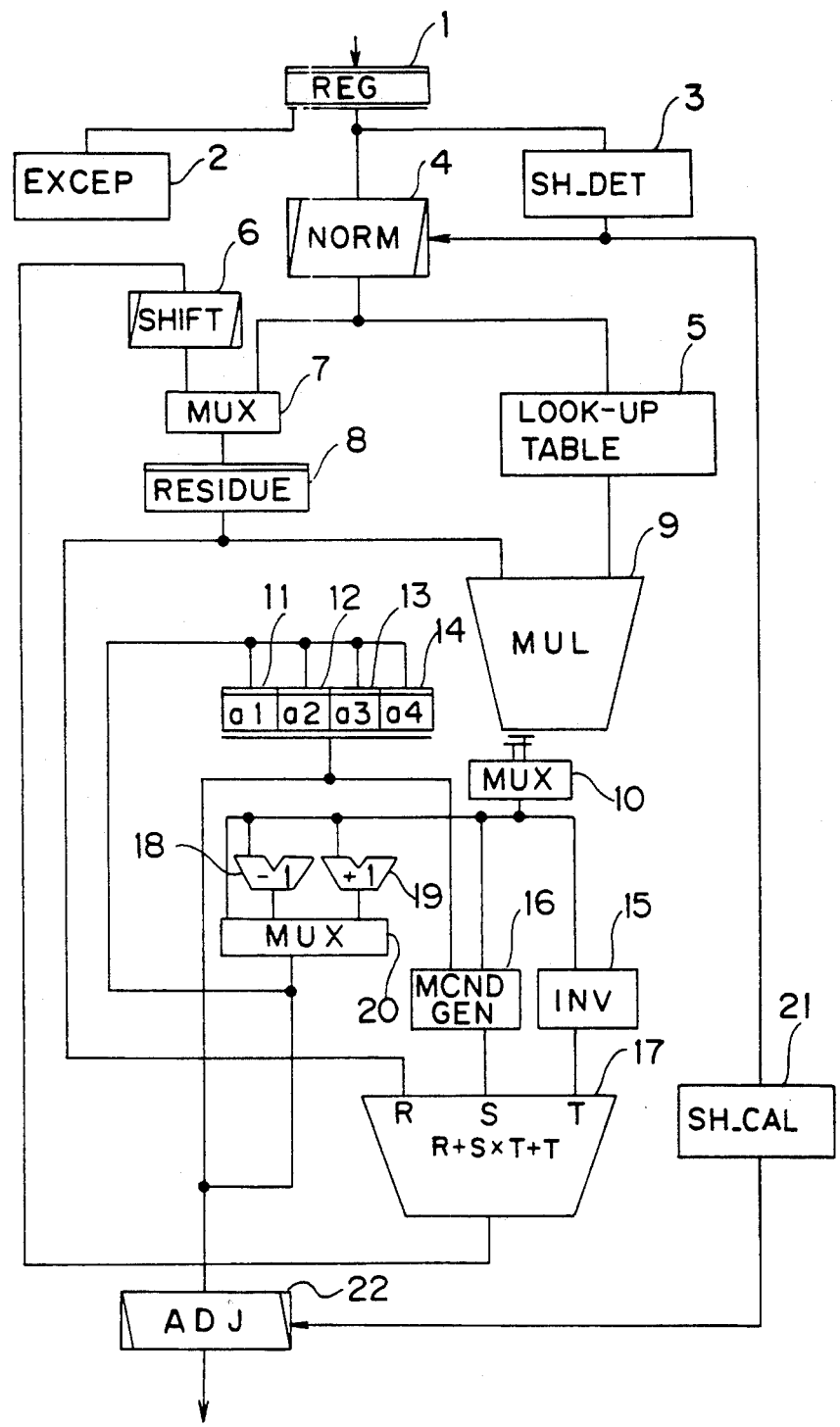
FIG. 1 is a block diagram of a fixed-point square root operation device of a first embodiment of the present invention.

Common particulars in the embodiments will be described.

Taking 13 bits (x indicates "0" or "1") in the formula (3) as an address, the approximation of a reciprocal of a square root is indexed.

```
0 1. x x x x x x x x x x x x          (3)
1 x. x x x x x x x x x x x x
```

A subtraction of the above address numeric value minus $2^{-12}$ to have a numeric value to be stored in the table information storing means take a bit greater value for a reciprocal of a square root is carried out to obtain a square root, thereafter the reciprocal of a square root being found.

The values of $2^{-2}$ to $2^{-16}$ of square root's reciprocal are stored in an actual table, and a sign bit which is always "0" and a $2^{-1}$ bit which is always "1" are not directly stored in the table. It is troublesome to give and repeat the same explanation about the above condition in detail in each embodiment. Accordingly, each explanation is given assuming the "01" is included in the table as the first two leading bits. When a multiplication is carried out, a multiplier is divided into groups each comprised of three bits one of which is overlapped, A multiple of a multiplicand is generated according to Booth's algorithm as shown in Table. A carry-save adder tree continuously performs an operation to such an extent that it has become a single partial carry and a single partial sum. A final product is obtained by adding these two (i.e., partial carry and partial sum) using a carry-propagate adder. In the multiplication of a residue times an approximation of square root's reciprocal, a value read out of Table is fed "1" at a leading end of the value while the inversion of the bit next to and on the right of a bit serving as an address is added to the trailing end. In multiplication operations, by having the one bit that is added on the right serve as a least significant bit, the effect is give at not $2^{-17}$ times but $2^{-16}$ times. For 01. 00000000000, all values of $2^{-2}$ to $2^{-16}$ to be stored in Table are "1". Even if a bit less, used as an address that specifies the location of an input operand, is zero, a multiplication will be carried out taking 1. 0000000000000000 as a multiplier by the foregoing effect at $2^{-16}$ times in the multiplying unit.

TABLE

| Multiplier bit | | | Multiple of operation to be executed |
|---|---|---|---|
| Set now being scanned | | High-order bit of lower set | |
| $a_{i+1}$ | $a_i$ | $a_{i-1}$ | |
| 0 | 0 | 0 | 0 |
| 0 | 0 | 1 | +1 |
| 0 | 1 | 0 | +1 |
| 0 | 1 | 1 | +2 |
| 1 | 0 | 0 | −2 |
| 1 | 0 | 1 | −1 |
| 1 | 1 | 0 | −1 |
| 1 | 1 | 1 | 0 |

In the operation of $(R-S\times T)$, with respect to the foregoing multiplying circuit construction, R is input into the carry-save adder tree as a sort of multiple. Additionally, the complement of "1" of the input of a multiple is taken to make the operation $\{R+S\times(-T)\}$, and the addition of "1" as being a least significant bit is made. Thus, an actual multiplier is made to be a 2's complement in a $(R-S\times T)$ operation unit because of the same effect as the above not at $2^{-17}$ times but at $2^{-16}$ times. Further, it is well known to those int he art that by suitably extending a sign bit at high-order positions, a multiplication can be carried out even for negative numbers, in the 2's complement notation.

If a $(R-S\times T)$ operation unit is divided into two parts (i.e., a multiplier inverting circuit and a $(R+S\times T)$ operation unit), and further if the addition of "1" to a partial square root value is done just prior the input of the $(R+S\times T)$ operation unit, the execution time of a square root operation is affected greatly. To avoid this, the following way is taken. In the following description, a $(R+S\times T+T)$ operation unit is used, wherein $\{R+S\times(T+1)+(T+1)\}$ is taken for $\{R+(S+1)\times(T+1)\}$. With respect to a multiplier, an effect of adding "1" to a partial square root is given by adding "0" to a least significant bit in an inverting circuit. Furthermore, with respect to a multiplicand, a multiplier is supplied to a carry-save adder tree as a sort of multiple.

Eight embodiments of the invention will be described below. In the embodiments, specific numeric values are used, which are represented in hexadecimal notation unless otherwise noted. It is understood that it seems that a sign bit is extra extended in some embodiments, since the values in the figures are referred to in a plurality of embodiments.

FIRST EMBODIMENT

FIG. 1 is a block diagram of a fixed-point square root operation device in accordance with a first embodiment of the present invention. The fixed-point square root operation device of the first embodiment is supplied with a 64-bit fixed-point number in 2's complement notation and outputs a 32-bit square root in 2's complement notation, wherein a bit length as being data for a partial square root value is "8" and there is no overlap between partial square root values. In FIG. 1, the reference numeral 1 denotes an input register; 2, an exception detector; 3, a normalization shift count detector; 4, a normalizing circuit; 5, a table information storing unit; 6, a shifter; 7, a multiplexer; 8, a residue holding circuit; 9, a multiplying circuit; 10, a multiplexer; 11 to 14, partial square root value holding circuits; 15, an inverting circuit ; 16, a multiplicand generator; 17, a $(R+S\times T+T)$ operation unit; 18, a constant subtracter; 19, a constant adder; 20, a multiplexer; 21, a digit adjustment shift count calculator; and 22, a digit adjustor.

The operation of the fixed-point square root operation device as shown in FIG. 1 will be described below with the help of specific numeric values. FIG. 2 shows a process through which an operand input is processed at each means. In the first place, an operand, that is, 10DF854CED1AA07D is input and set in the input register 1. The exception detector 2 carries out a check for operands, which detects a data exception if first two leading bits of the input operand are "10" or "11", and further detects an overflow exception if the two bits are "01". In the case of any exception occurring, an external instruction executing control unit, connected to the fixed-point square root operation device, is alerted, accordingly. For the numeric values used in this embodiment, no data exceptions are detected (this precondition will be omitted below). The normalization shift count detector 3 detects the number of shifts necessary for carrying out 2-bit normalization, outputting "2". The normalizing circuit 4 receives from the normalization shift count detector 3 an instruction telling that the number of shifts is 2 and then left-shifts the input data two bit places, thereby outputting 437E1533B46A81F4. Input into the table information storing unit 5 are 13 bits comprised of $2^{63}$ to $2^{51}$ of the normalizing circuit 4. From the table information storing unit 5, 0F96B is output. The bit of $2^{50}$ of the normalizing circuit 4 shall be inverted and added as a least significant bit to this output, however, "0" is added instead in this embodiment, and 0F96B serves as an actual multiplier in the multiplying circuit 9. The multiplexer 7 selects the output of the normalizing circuit 4 with the addition of a 4-bit zero to its leading bit. The output thus selected is set in the residue holding circuit 8, at which point in time the partial square root value holding circuits 11 to 14 are reset to zero. In the multiplying circuit 9, 0437E1533B46A81F4 is multiplied by 0F96B, a result of which is 041C1D852271800EAA4FC. The multiplexer 10 selects 9 bits comprised of $2^{79}$ to $2^{71}$ of the multiplying circuit 9, as a first partial square root value comprised of one bit for sign and eight bits for data. The partial square root value is supplied to the inverting circuit 15. The inverting circuit 15 bit-inverts the input and adds "0" to a least significant bit for output, if two bits in an adjoining relationship at low-order positions of the partial square root value are "11", if the partial square root is negative or if 11 bits comprised of $2^{63}$ to $2^{53}$ of a first residue at the second iteration are not "0", while it adds "1" to a least significant bit in other cases other than the above. In the multiplicand generator 16, eight bits for data except a sign bit of the output of the multiplexer 10 are padded into $2^{55}$ to $2^{48}$, and other bits are output in the form of zero, at the first iteration. Supplied with the outputs of the residue holding circuit 8, the multiplicand generator 16 and the inverting circuit 15, the (R+S×T+T) operation unit 17 carries out the operation (R+S×T+T), taking these outputs as R, S and T respectively, if "0" has been added to a least significant bit in the inverting circuit 15, while it carries out the operation (R+S×T+T) in other cases other than the above. A carry over is carried out in order that a corresponding bit to the least significant bit of a partial square root value goes to the place of $2^{48}$ at the first iteration, to the place of $2^{40}$ at the second iteration, to the place of $2^{32}$ at the third iteration and to the place of $2^{24}$ at the fourth iteration, thereafter "+T" in (R+S×T+T) being input into a carry-save adder tree. 000751533B46A81F4 and from the (R+S×T+T) operation unit 17 is shifted by the shifter 6 eight bit places to the left, selected by the multiplexer 7 and set in the residue holding circuit 8. The constant subtracter 18 subtracts "1" from LSB of the output of the multiplexer 10. The constant adder 19, on the other hand, adds "1" to LSB of the output of the multiplexer 10. If the output of the multiplexer 10 is positive and the output of the (R+S×T+T) operation unit 17 is negative, the multiplexer 20 selects the output of the constant subtracter 18, while, if two bits in an adjoining relationship at low-order positions of the partial square root values are "11" ad the output of the (R+S×T+T) operation unit 17 is positive, if the partial square root value is negative or if 11 bits comprised of $2^{63}$ to $2^{53}$ of a first residue obtained at the second iteration are not zero and the output of the (R+S×T+T) operation unit 17 is positive, it selects the output of the constant adder 19. In other cases other than the above, the multiplexer 20 selects the output of the multiplexer 10. Judging from the above conditions, the output of the multiplexer 10 is selected for output, at the first iteration. In the partial square root value holding circuit 11, the output of the multiplexer 20 is set.

Next, a second iterative computation begins. The output of the table information storing unit 5 is the same as the first iterative computation, and will stay unchanged at subsequent iterative computations. 0751533B46A81F400 of a first residue $R_1$, which has been set in the residue holding circuit 8, is multiplied by 0F96B by the multiplying circuit 9, a resultant product, 072128F271800EAA4FC00 being output. 072 of $2^{80}$ to $2^{72}$ is selected by the multiplexer 10, as a second partial square root value comprised of one bit for sign and eight bits for data. The inverting circuit 15 inverts 072 to form 18D which then is fed "0" serving as a least significant bit and output. The (R+S×T+T) operation unit 17 carries out an operation in which 18D is taken as an actual multiplier. The multiplicand generator 16 left-shifts the outputs of the partial square root value holding circuits 11 to 14 one bit place and pads nine bits output from the multiplexer 10 into $2^{48}$ to $2^{40}$ to output 106720000000000. Although FIG. 2 shows 106730000000000 whose $2^{40}$ bit is "1" to correspond to the output of the multiplicand generator 16, it is so designed that a practically like result is led by "+T" in the operation (R+S×T+T), in the square root operation device as shown in FIG. 1. Supplied with the outputs of the residue holding circuit 8, the multiplicand generator 16 and the inverting circuit 15, the (R+S×T+T) operation unit 17 carries out the operation (R+S×T+T), taking these outputs as R, S and T respectively. FFF2F8AB46A81F400 output from the (R+S×T+T) operation unit 17 is left-shifted by the shifter 6 eight bit places, selected by the multiplexer 7 and set in the residue holding circuit 8. The multiplexer 20 selects the output of the multiplexer 10 and outputs it. In the partial square root value holding circuit 12, the output of the multiplexer 20 is set.

Next, a third iterative computation commences. The output of the table information storing unit 5 still remains the same as the first iterative computation. F2F8AB46A81F40000 of a second residue $R_2$, which has been set in the residue holding circuit 8, is multiplied by 0F96B by means of the multiplying circuit 9, a resultant product, F34E6C87500EAA4FC0000 being output. 134 of $2^{80}$ to $2^{72}$ is selected by the multiplexer 10, as a third partial square root value comprised of one bit for sign and eight bits for data. The inverting circuit 15 inverts 134 to form 0CB which is then added "0" serving as a least significant bit and output. In the (R+S×T+T) operation unit 17, an operation is carried out in which 0CB is taken as an actual multiplier. On the other hand, the multiplicant generator 16 left-shifts the outputs of the partial square root value holding circuits 11 to 14 one bit place and pads nine bits output from the multiplexer 10 into $2^{40}$ to $2^{32}$ to output 106E53400000000. Although FIG. 2 shows 106E5350000000 whose $2^{32}$ bit is "1" to correspond to the output of the multiplicand generator 16, it is so designed that a practically like result is led by "+T" in the operation (R+S×T+T), in the square root operation device is shown in FIG. 1. Supplied with the outputs of the residue holding circuit 8, the multiplicand generator 16 and the inverting circuit 15, the (R+S×T+T) operation unit 17 carries out the operation (R+S×T+T), taking these outputs as R, S and T respectively. 00002757181F40000 output from the (R+S ×T+T) operation unit 17 is left-shifted by the shifter 6 eight bit places, selected by the multiplexer 7 and set in the residue holding circuit 8. The multiplexer 20 selects the output of the constant adder 19 and outputs it. In the partial square root value holding circuit 13, the output of the multiplexer 20 is set.

Then a fourth iterative computation begins. The output of the table information storing unit 5 still remains the same as the first iterative computation. 002757181F4000000 of a third residue $R_3$, which has been set in the residue holding circuit 8, is multiplied by 0F96B by means of the multiplying circuit 9, a resultant product, 00265427DD7A4FC000000 being output. 002 of $2^{80}$ to $2^{72}$ is selected by the multiplexer 10 as a fourth partial square root value comprised of one bit for sign and eight bits for data. The inverting circuit 15 inverts 002 to form 1FD which is then added "1" serving as a least significant bit and output. The $(R+S\times T+T)$ operation unit 17 carries out an operation wherein 1FE is taken as an actual multiplier. The multiplicand generator 16 left-shifts the outputs of the partial square root value holding circuits 11 to 14 one bit place and pads nine bits output from the multiplexer 10 into $2^{32}$ to $2^{24}$ to output 106E46A02000000. Supplied with the outputs of the residue holding circuit 8, the multiplicand generator 16 and the inverting circuit 15, the $(R+S\times T+T)$ operation unit 17 carries out the operation $(R+S\times T+T)$, taking these outputs as R, S and T respectively. The $(R+S \times T+T)$ operation unit 17 outputs 00067A8ADF0000000. The multiplexer 20 selects the output of the multiplexer 10 and outputs it. Set in the partial square root value 14 is the output of the multiplexer 20. The digit adjustment shift count calculator 21 right-shifts "2" which is an instruction received from the normalization shift count detector 3 one bit place to form and output "1". The digit adjustor 22 merges the outputs of the partial square root holding circuits 11 to 13 and the output of the multiplexer 20, is supplied with 83723502 and right-shifts the input by 1 as instructed by the digit adjustment shift count calculator 21 to output a final result of 41B91A81.

SECOND EMBODIMENT

Figure 3:
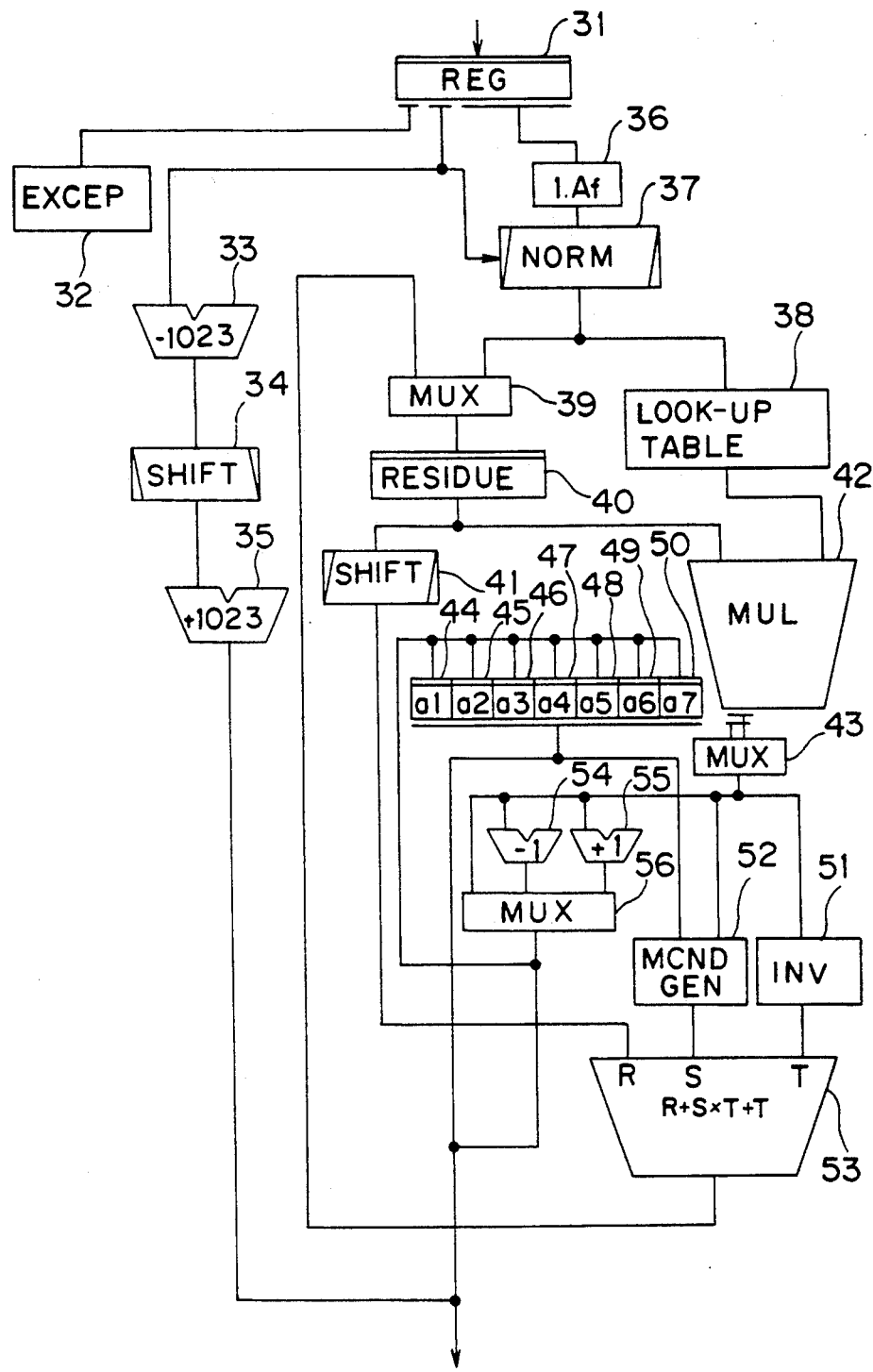
FIG. 3 is a block diagram of a floating-point square root operation device of a second embodiment of the invention.

FIG. 3 is a block diagram of a floating-point square root operation device in accordance with a second embodiment of the invention. An IEEE standard double-precision floating-point number is input into the floating-point square root operation device of this embodiment which then outputs the square root of the double-precision floating-point number, wherein a bit length as being data for a partial square root value is "8" and there is no overlap between partial square root values. FIG. 3 shows each of construction elements of the second embodiment, wherein the reference numeral 31 denotes an input register; 32, an exception detector; 33, an exponent constant subtracter; 34, a shifter; 35, an exponent constant adder; 36, a leading-bit adding circuit; 37, a normalizing circuit; 38, a table information storing unit; 39, a multiplexer; 40, a residue holding circuit; 41, a shifter; 42, a multiplying circuit; 43, a multiplexer; 44 to 50, partial square root value holding circuits; 51, an inverting circuit; 52, a multiplicand generator; 53, a $(R+S\times T+T)$ operation unit; 54, a constant subtracter; 55, a constant adder; and 56, a multiplexer.

The operation of the floating-point square root operation device as shown in FIG. 3 will be described using specified numeric values below. FIGS. 4 and 5 show a process in which a operand input is processed at each means. 56F80A494B9A80F8 is first input as an operand and set in the input register 31. The exception detector 32 carries out a positive-negative check for operands so that it detects a data exception when the operand is negative. In the case of any exception taking place, an external instruction executing control unit, connected to the floating-point square root operation device is alerted, accordingly. For the numeric values used here, the operand is positive (this precondition will be omitted below). No data exceptions are detected, accordingly, After subtracting 3FF from exponents of $2^{62}$ to $^{52}$ of the output of the input register 31 by the exponent constant subtracter 33, the exponents are right-shifted one bit place by the shifter 34 and added 3FF again by the exponent constant adder 35 to find resultant exponents. In the leading-bit adding circuit 36, "1" is added, as a leading bit, to the leading ends of significand parts of $2^{51}$ to $2^0$ of the output of the input register 31. The normalizing circuit 37, if the bit of $2^{52}$ of the output of the input register 31 is "1", outputs the input after left-shifting it two bit places while it, if the bit of $2^{52}$ of the output of the input register 31 is "0", outputs the input after left-shifting it three bit places. The table information storing unit 38 is supplied with 13 bits comprised $2^{55}$ to $2^{43}$ of the normalizing circuit 37, and 0D0DE is output. Further, the bit of $2^{42}$ of the normalizing circuit 37 shall be inverted and added as a least significant bit to the above output, however, "1" is added instead in this embodiment. 0D0DF becomes an actual multiplier in the multiplying circuit 42. The multiplexer 39 selects the output of the normalizing circuit 37. The output thus selected is set in the residue holding circuit 40, at which point in time the partial square root value holding circuit 44 to 50 are reset to zero. In the multiplying circuit 42, a multiplication of 06029252E6A03E0 times 0D0DF is carried out, producing a product, 04E75320D19917F6020. The multiplexer 43 selects nine bits comprised of $2^{71}$ to $2^{63}$ of the multiplying circuit 42, as a first partial square root value comprised of one bit for signal and eight bits for data. The inverting circuit 51 is supplied with the partial square root value which is bit-inverted, added "0" to a least significant bit and output, if two bits in an adjoining relationship at low-order positions of the partial square root value are "11" or if the partial square root is negative, while "1" is added to a least significant bit in other cases other than the above. In the multiplicand generator 52, eight bits for data, excluding a sign bit, of the output of the multiplexer 43 are padded into $2^{55}$ to $2^{48}$, and other bits are output in the form of zero, at the first iteration. The $(R+S\times T+T)$ operation unit 53 is supplied with the output of the residue holding circuit 40 which has been left-shifted eight bit places and output by the shifter 41, the output of the multiplicand generator 52 and the output of the inverting circuit 51, and takes these outputs as R, S and T respectively. The operation unit $(R+S\times T+T)$ 53 carries out the operation $(R+S\times T+T)$ if "0" has been added to a least significant bit in the inverting circuit 51, while it carries out the operation $(R+S\times T+T)$ in other cases other than the above. A carry over is carried out in order that a corresponding bit to the least significant bit of a partial square root goes to the place of $2^{48}$ at the first iteration, to the place of $2^{40}$ at the second iteration, to the place of $2^{32}$ at the third iteration, to the place of $2^{24}$ at the fourth iteration, to the place of $2^{16}$ at the fifth iteration, to the place of $2^8$ at the sixth iteration and the place of $2^0$ at the seventh iteration, thereafter "+T" in $(R+S\times T+T)$ being input into a carry-save adder tree. 3E0252E6A0-3E000 output from the $(R+S\times T+T)$ operation unit 53 is selected by the multiplexer 39 and set in the residue holding circuit 40. The constant subtracter 54 subtracts "1" from LSB of the output of the multiplexer 43. The constant adder 55 adds "1" to SLB of the output of the multiplexer 43. When the output of the multiplexer 43 is positive and the output of the (R+S×T+T) operation unit 53 is negative, the multiplexer 56 selects the output of the constant subtracter 54 while, when two bits in an adjoining relationship at low-order positions of the partial square root value are "11" and the output of the (R+S×T+T) 53 is positive or when the partial square root value is negative, it selects the output of the constant adder 55. In other cases other than the above, the multiplexer 56 selects the output of the multiplexer 43. Judging from the above conditions, the output of the multiplexer 43 is selected. An output of the multiplexer 56 is set in the partial square root value holding circuit 44.

Next, a second iterative computation begins. The output of the table information storing unit 38 is the same as the first iterative computation, and will stay unchanged at subsequent iterative computations. 3E02-52E6A03E00 of a first residue $R_1$, which has been set in the residue holding circuit 40, is multiplied by 0D0DF by the multiplying circuit 42, a resultant product of which is 3E6027619917F602000 that is output. 1E6 of $2^{72}$ to $2^{64}$ is selected by the multiplexer 43 as a second partial square root value comprised of one bit for sign and eight bits for data. The inverting circuit 51 inverts 1E6 to form 019, adds to it "0" as a least significant bit and outputs it. The (R+S×T+T) operation unit 53 carries out an operation in which 019 is taken as an actual multiplier. The multiplicand generator 52 left-shifts the outputs of the partial square root value holding circuits 44 to 50 one bit place and pads nine bits output from the multiplexer 43 into $2^{48}$ to $2^{40}$ to output 139E60000000000. Although FIGS. 4 and 5 show 139E70000000000 whose $2^{40}$ bit is "1" to correspond to the output of the multiplicand generator 52, it is so designed that a practically like result is led by "+T" in the operation (R+S×T+T), in the square root operation device as shown in FIG. 3. The (R+S×T+T) operation unit 53 carries out the operation (R+S×T+T) by being supplied with the output of the residue holding circuit 40 which has been left-shifted eight bit places and output from the shifter 41, the output of the multiplicand generator 52 and the output of the inverting circuit 51, taking these outputs as R, S and T respectively. 2CCBD6A03E00000 output from the (R+S×T+T) operation unit 53 is selected by the multiplexer 39 and set in the residue holding circuit 40. The multiplexer 56 selects the output of the multiplexer 43 and outputs it. In the partial square root value holding circuit 45, the output of the multiplexer 56 is set.

Next, a third iterative computation commences. The output of the table information storing unit 38 still remains the same as the first iterative computation. 2CCBD6A03E00000 of a second residue $R_2$, which has been set in the residue holding circuit 40, is multiplied by 0D0DF by means of the multiplying circuit 42, a resultant product of which is 3054E3F227F60200000 that is output. 105 of $2^{72}$ to $2^{64}$ is selected by the multiplexer 43 as a third partial square root value comprised of one bit for sign and eight bits for data. The inverting circuit 15 inverts 105 to form 0FA, adds to it "0" as a least significant bit and outputs it. In the (R+S ×T+T) operation unit 53, an operation is carried out in which 0FA is taken as an actual multiplier. On the other hand, the multiplicand generator 52 left-shifts the outputs of the partial square root value holding circuits 44 to 50 one bit place and pads nine bits output from the multiplexer 43 into $2^{40}$ to $2^{32}$ to output 139CD0500000000. Although FIGS. 4 and 5 show 139CD0600000000 whose $2^{32}$ bit is added by "1" to correspond to the output of the multiplicand generator 52, it is so designed that a practically like result is led by "+T" in the operation (R+S×T+T), in the square root operation device as shown in FIG. 3. Supplied with the output of the residue holding circuit 40 which has been left-shifted eight bit places and output by the shifter 41, the output of the multiplicand generator 52 and the output of the inverting circuit 51, the (R+S×T+T) operation unit 53 carries out the operation (R+S×T+T), taking these outputs as R, S and T respectively. 32FA1DFE0000000 output from the (R+S×T+T) operation unit 53 is selected by the multiplexer 39 and set in the residue holding circuit 40. The multiplexer 56 selects the output of the multiplexer 43 and outputs it. In the partial square root value holding circuit 46, the output of the multiplexer 56 is set.

A fourth iterative computation begins. The output of the table information storing unit 38 still remains the same as the first iterative computation. 32FA1D-FE0000000 of a third residue $R_3$, which has been set in the residue holding circuit 40, is multiplied by 0D0DF by means of the multiplying circuit 42, a result, 355FE0-3E80420000000 being output. 155 of $2^{72}$ to $2^{64}$ is selected by the multiplexer 43, as a fourth partial square root value comprised of one bit for sign and eight bits for data. The inverting circuit 51 inverts 155 to form 0AA, adds to it "0" as a least significant bit and outputs it. The (R+S×T+T) operation unit 53 carries out an operation wherein 0AA is taken as an actual multiplier. On the other hand, the multiplicand generator 52 left-shifts the outputs of the partial square root value holding circuit 44 to 50 one bit place and pads nine bits output from the multiplexer 43 into $2^{32}$ to $2^{24}$ to output 139CC0B55000000. Although FIGS. 4 and 5 show 139CC0B56000000 whose $2^{24}$ bit is added by "1" to correspond to the output of the multiplicand generator 52, it is so designed that a practically like result is led by "+T" in the operation (R+S×T+T), in the square root operation device as shown in FIG. 3. Supplied with the output of the residue holding circuit 40 which has been left-shifted eight bit places and output by the shifter 41, the output of the multiplicand generator 52 and the output of the inverting circuit 51, the (R+S×T+T) operation unit 53 carried out the operation (R+S×T+T), taking these outputs as R, S and T respectively. The (R+S×T+T) operation unit 53 outputs 0035F671C000000 which is selected and output by the multiplexer 39 and is set in the residue holding circuit 40. The multiplexer 56 selects the output of the constant adder 55, outputting it. In the partial square root value holding circuit 47, the output of the multiplexer 56 is set.

Next, a fifth iterative computation starts. The output of the table information storing unit 38 still remains unchanged (i.e., is the same as the first iterative computation). 0035F671C000000 of a fourth residue $R_4$, which has been set in the residue holding circuit 40, is multiplied by 0D0DF by means of the multiplying circuit 42, a resultant product, 002C073E19164000000 being output. 002 to $2^{72}$ to $2^{64}$ is selected by the multiplexer 43, as a fifth partial square root value comprised of one bit for sign and eight bits for data. The inverting circuit 51 inverts 002 to 1FD, adds to it "0" as a least significant bit and outputs it. The (R +S×T+T) operation unit 53 carries out an operation wherein 1FD is taken as an actual multiplier. On the other hand, the multiplicand generator 52 left-shifts the outputs of the partial square root value holding circuits 44 to 50 one bit place and pads nine bits output from the multiplexer 43 into $2^{24}$ to $2^{16}$ to output 139CC0AAC020000. Although FIGS. 4 and 5 show 139CC0AAC030000 whose $2^{16}$ bit is "1" to correspond to the output of the multiplicand generator 52, it is so designed that a practically like result is led by "+T" in the operation (R+S×T+T), in the square root operation device as shown in FIG. 3. Supplied with the output of the residue holding circuit 40 which has been left-sifted eight bit places and output by the shifter 41, the output of the multiplicand generator 52 and the output of the inverting circuit 51, the (R+S×T+T) operation unit 53 carries out the operation (R+S×T+T), taking these outputs as R, S and T respectively. The (R+S×T+T) operation unit 53 outputs 3B202FBFBF70000 which is selected and output by the multiplexer 39 and is set in the residue holding circuit 40. The multiplexer 56 selects the output of the multiplexer 43, outputting it. In the partial square root value holding circuit 48, the output of the multiplexer 56 is set.

Next, a sixth iterative computation starts. The output of the table information storing unit 38 still remains unchanged (i.e., is the same as the first iterative computation). 3B202FBFBF70000 of a fifth residue $R_5$, which has been set in the residue holding circuit 40, is multiplied by 0D0DF by means of the multiplying circuit 42, a resultant product, 3C05E7D56392C290000 being output. 1C0 of $2^{72}$ to $2^{64}$ is selected by the multiplexer 43, as a sixth partial square root value comprised of one bit for sign and eight bits for data. The inverting circuit 51 inverts 1C0 to form 03F, adds to it "0" as a least significant bit and outputs it. The (R +S×T+T) operation unit 53 carries out an operation wherein 03F is taken as an actual multiplier. The multiplicand generator 52 left-shifts the outputs of the partial square root value holding circuits 44 to 50 one bit place and pads nine bits output from the multiplexer 43 into $2^{16}$ to $2^8$ to output 139CC0AAC05C000. Although FIGS. 4 and 5 show 139CC0AAC05C100 whose $2^8$ bit is "1" to correspond to the output of the multiplicand generator 52, it is so designed that a practically like result is leg by "+T" is the operation (R+S×T+T), in the square root operation device as shown in FIG. 3. Supplied with the output of the residue holding circuit 40 which has been left-shifted eight bit places and output by the shifter 41, the output of the multiplicand generator 52 and the output of the inverting circuit 51, the (R+S×T+T) operation unit 53 carries out the operation (R+S×T+T), taking these outputs as R, S and T respectively. The (R+S×T+T) operation unit 53 outputs 33C329C4C6A7F00 which is selected and output by the multiplexer 39 and is set in the residue holding circuit 40. The multiplexer 56 selects the output of the multiplexer 43, outputting it. In the partial square root value holding circuit 49, the output of the multiplexer 56 is set.

Finally, a seventh iterative computation starts. The output of the table information storing unit 38 still remains unchanged (i.e., is the same as the first iterative computation). 33C329C4C6A7F00 of a sixth residue $R_6$, which has been set in the residue holding circuit 41, is multiplied by 0D0DF by means of the multiplying circuit 42, a result of which is 3603E8F143D17F4A100 that is output. 160 to $2^{72}$ to $2^{64}$ is selected by the multiplexer 43, as a seventh partial square root value comprised of one bit for sign and eight bits for data. The inverting circuit 51 inverts 160 to form 09F, adds to it "0" as a least significant bit and outputs it. The (R+S×T+T) operation unit 53 carries out an operation wherein 09F is taken as an actual multiplier. On the other hand, the multiplicand generator 52 left-shifts the outputs of the partial square root value holding circuits 44 to 50 one bit place and pads nine bits output from the multiplexer 43 into $2^8$ to $2^0$ to output 139CC0AAC0518160. Although FIGS. 4 and 5 show 139CC0AAC058161 whose $2^0$ bit is "1" to correspond to the output of the multiplicand generator 52, it is so design that a practically like result is led by "+T" in the operation (R+S×T+T), in the square root operation device as shown in FIG. 3. Supplied with the output of the residue holding circuit 40 which has been left-shifted eight bit places and output by the shifter 41, the output of the multiplicand generator 52 and the output of the inverting circuit 51, the (R+S×T+T) operation unit 53 carries out the operation (R+S×T+T), taking these outputs as R, S and T respectively. The (R+S×T+T) operation unit 53 outputs 31856ED4-1EA5B3F which is selected and output by the multiplexer 39 and is set in the residue holding circuit 40. The multiplexer 56 selects the output of the multiplexer 43, outputting it. In the partial square root value holding circuit 50, the output of the multiplexer 56 is set.

As a final result, 46739CC0AAC0580C is output from the square root operation device of FIG. 3, which is obtained by batching "0" as a sign bit for $2^{63}$, 11 bits output from the exponent constant adder 35 as exponent parts for $2^{62}$ to $2^{52}$, and seven low-order bits of the partial square root value circuit 44, 40 bits of the partial square root value holding circuit 45 to 49, and 5 high-order bits of the output of the multiplexer 56, as significand parts for $2^{51}$ to $2^0$.

THIRD EMBODIMENT

Figure 6:
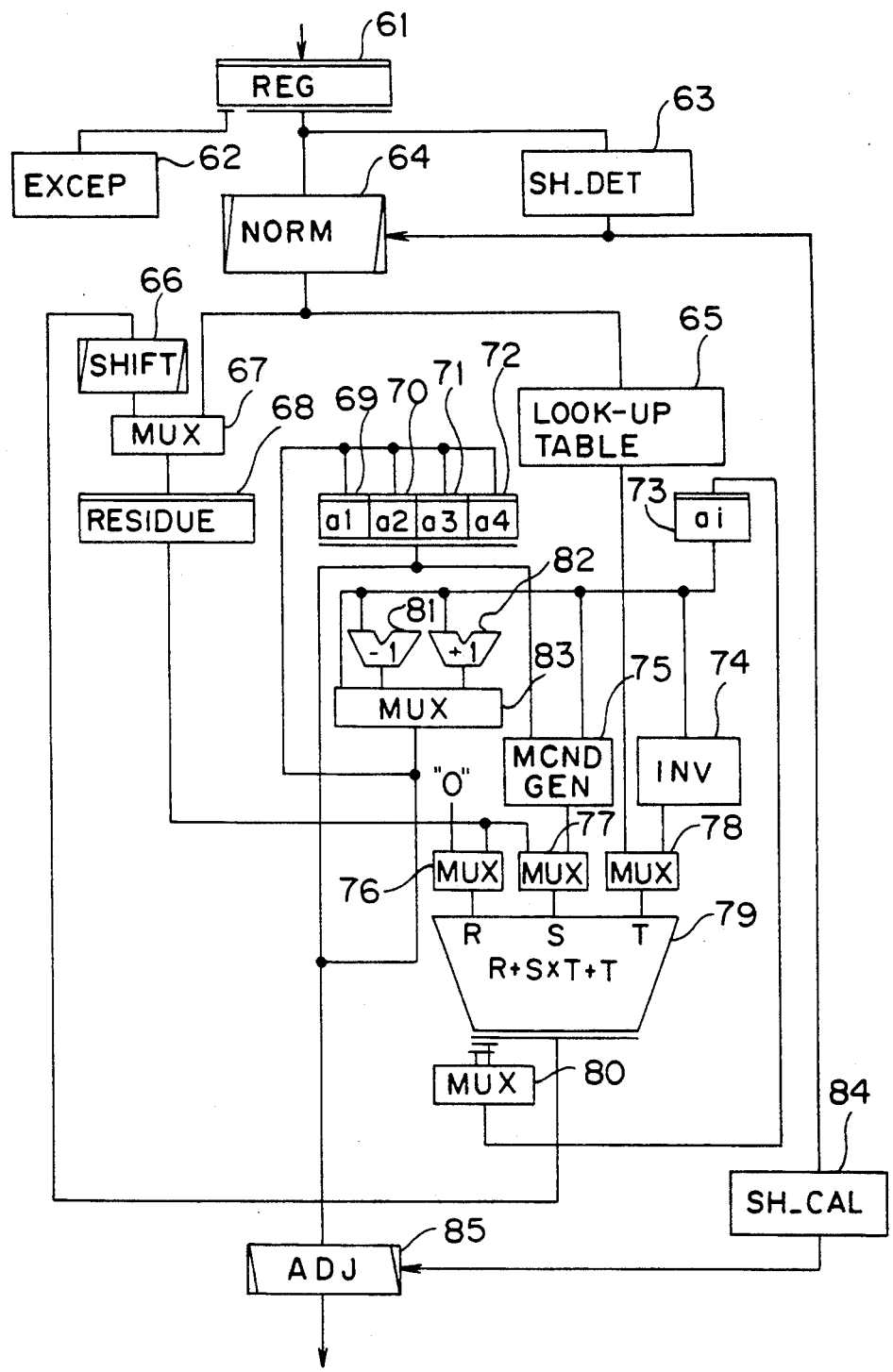
FIG. 6 is a block diagram showing a fixed-point square root operation device of a third embodiment of the present invention.

FIG. 6 is a block diagram of a fixed-point square root operation device in accordance with a third embodiment of the present invention. The fixed-point square root operation device of this embodiment is supplied with a 64-bit fixed-point number in 2's complement notation and the outputs a 32-bit square root in 2's complement notation, wherein a bit length as being data for a partial square root value is "8" and there is not overlap between partial square root values. In FIG. 6, the reference numeral 61 denotes an input register; 62, an exception detector; 63, a normalization shift count detector; 64, a normalizing circuit; 65, a table information storing unit; 66, a shifter; 67, a multiplexer; 68, a residue holding circuit; 69 to 72, post-correction partial square value holding circuits (hereinafter these are referred to as the "partial square root value holding circuit"; 73, a pre-correction partial square root value holding circuit; 74, an inverting circuit; 75, a multiplicand generator; 76 to 78, multiplexers; 79, a (R+S×T+T) operation unit; 80, a multiplexer; 81, a constant subtracter; 82, a constant adder; 83, a multiplexer; 84, a digit adjustment shift count calculator; and 85, a digit adjustor.

The operation of the fixed-point square root operation device as shown in FIG. 6 will be described below with the help of specific numeric values. FIG. 2 shows a process through which an operand input is processed at each means. In the first place, an operand, 10DF854CED1AA07D is input and set in the input register 61. The exception detection 62 carries out a check for operands, which detects a data exception if first two leading bits of the input operand are "10" or "11", while it detects an overflow exception if such two bits are "01". In the case of any exception taking place, an external instruction executing control unit, connected to the fixed-point square root operation device, is alerted, accordingly. For the numeric values used in this embodiment, no data exceptions are detected (this precondition will be omitted below). The normalization shift count detector 63 detects the number of shifts necessary for carrying out 2-bit normalization, outputting "2". The normalizing circuit 64 receives from the normalization shift count detector 63 an instruction telling that the number of shifts is 2 and then left-shifts the input data two bit places to output 437E1533B-46A81F4. Input into the table information storing unit 65 are 13 bits comprised of $2^{63}$ to $2^{51}$ of the normalizing circuit 64. From the table information storing unit 65, 0F96B is output. The bit of $2^{50}$ of the normalizing circuit 64 shall be inverted and added as a least significant bit to this output, however, "0" is added thereto in this embodiment instead. 0F96B becomes an actual multiplier in the $(R+S\times T+T)$ operation unit 79. The multiplexer 67 selects the output of the normalizing circuit 64 with the addition of a 4-bit zero to its leading end. The output thus selected is set in the residue holding circuit 68, at which point in time the partial square root value holding circuits 69 to 72 are rest to zero. The multiplexer 76, 77 and 78 selects "0", the output of the residue holding circuit 68 and the output of the table information storing unit 65, respectively. In the $(R+S\times T+T)$ operation unit 79, 0437E1533B46A81F4 is multiplied by 0F96B, a product, 041C1D852271800EAA4FC being output. The multiplexer 80 selects nine bits comprised of $2^{79}$ to $2^{71}$ of the output of the $(R+S\times T+T)$ operation unit 79, as a first partial square root value comprised of one bit for sign and eight bits of data. This partial square root value is set in the partial square root value holding circuit 73. The partial square root value is supplied to the inverting circuit 74 which bit-inverts such as input, extends an 8-bit sign at high-order positions, and adds "0" to a least significant bit for output if two bits in an adjoining relationship at low-order positions of the partial square root value are "11", if the partial square root value is negative or if 11 bits comprised of $2^{63}$ to $2^{53}$ of a first residue obtained at the second iteration are not "0". In other cases other than the above, "1" is added. Furthermore, in the multiplicand generator 75, eight bits for data except a sign bit of the output of the pre-correction square root value holding circuit 73 are padded into $2^{55}$ to $2^{48}$, and other bits are output in the form of zero, at the first iteration. The multiplexers 76, 77 and 78 select the output of the residue holding circuit 68, an output of the multiplicand generator 75 and the output of the inverting circuit 74 respectively. Supplied with the outputs of the multiplexers 76, 77 and 78, the $(R+S\times T+T)$ operation unit 79 carries out, taking these outputs as R, S and T respectively, the operation $(R+S\times T+T)$ if "0" has been added to a least significant bit in the inverting circuit 74, while it carries out the operation $(R+S\times T+T)$ in other cases than the above. A carry over is carried out in order that a corresponding bit to the least significant bit of a partial square root goes to the place of $2^{48}$ at the first iteration, to the place of $2^{40}$ at the second iteration, to the place of $2^{32}$ at the third iteration and to the place of $2^{24}$ at the fourth iteration, thereafter "+T" in $(R+S\times T+T)$ being input into a carry-save adder tree. 000751533D46A81F4 output from the $(R+S\times T+T)$ operation unit 79 is shifted by the shifter 68 eight bit places to the left, selected by the multiplexer 67 and set in the residue holding circuit 68. The constant subtracter 81 subtracts "1" from LSB of the output of the pre-correction square root value holding circuit 73. In the constant adder 82, "1" is added to LSB of the output of the pre-correction square root value holding circuit 73. If the output of the pre-correction square root value holding circuit 73 is positive and the output of the $(R+S\times T+T)$ operation unit 79 is negative, the multiplexer 83 selects the output of the constant subtracter 81. The multiplexer 83 however selects the output of the constant adder 80, if two bits in an adjoining relationship at low-order positions of the partial square root value are "11" and the output of the $(R+S\times T+T)$ operation unit 79 is positive, if the partial square root value is negative and the output of the $(R+S\times T+T)$ operation unit 79 is positive, or if 11 bits comprised of $2^{63}$ to $2^{53}$ of a first residue obtained at the second iteration are not zero and the output of the $(R+S\times T+T)$ operation unit 79 is positive. In other cases other than the above, the multiplexer 83 selects the output of the pre-correction square root value holding circuit 73. Judging from the above conditions, the output of the pre-correction square root value holding circuit 73 is selected at the first iteration. Then the output of the multiplexer 83 is set in the partial square root value holding circuit 69.

Next, a second iterative computation begins. The output of the table information storing unit 65 is the same as the first iterative computation and will stay unchanged at subsequent iterative computations. The multiplexes 76, 77 and 78 select "0", 0751533B46A81F400 of a first residue $R_1$ set in the residue holding circuit 68 and 0F96B output by the table information storing unit 65, respectively. The $(R+S\times T+T)$ operation unit 79 carries out the operation $(S\times T)$, thereby outputting a product, 072128F271800EAA4FC00. 072 of $2^{80}$ to $2^{72}$ is selected by the multiplexer 80, as a second partial square root value comprised of one bit for sign and eight bits for data. This partial square root value is set in the pre-correction partial square root value holding circuit 73. In the inverting circuit 74, 072 is inverted, extended with an 8-bit zero at high-order positions, formed into 1FF8D, fed "0" as a least significant bit and output. The $(R+S\times T+T)$ operation unit 79 carries out an operation in which 1FF8D is taken as an actual multiplier. The multiplicand generator 75 left-shifts the outputs of the partial square root value holding circuit 69 to 72 one bit place and pads nine bits output from the pre-correction partial square root value holding circuit 73 into $2^{48}$ to $2^{40}$ to output 106720000000000. Although FIG. 2 shows 106730000000000 whose $2^{40}$ bit is "1" to correspond to the output of the multiplicand generator 73, it is so designed that a practically like result is led by "+T" in the operation $(R+S\times T+T)$, in the square root operation device as shown in FIG. 6. The multiplexers 76, 77 and 78 select the output of the residue holding circuit 68, the output of the multiplicand generator 75 and the output of the inverting circuit 74, respectively. The $(R+S\times T+T)$ operation unit 79 carries out the operation $(R+S\times T+T)$ by being supplied with the outputs of the multiplexers 76, 77 and 78 wherein these outputs are taken as R, S and T respectively. FFF2F8AB46A81F400 output from the $(R+S\times T+T)$ operation unit 79 is left-shifted by the shifter 66 eight bit places, selected by the multiplexer 67 and set in the residue holding circuit 68. The multiplexer 83 selects the output of the pre-correction partial square root value holding circuit 73 and outputs it. In the partial square root value holding circuit 70, the output of the multiplexer 83 is set.

Next, a third iterative computation begins. The output of the table information storing unit 65 is the same as the first iterative computation. The multiplexers 76, 77 and 78 select "0", F2F8AB46A81F40000 of a second residue $R_2$ set in the residue holding circuit 68 and 0F96B output from the table information storing unit 65, respectively. The $(R+S \times T+T)$ operation unit 79 carries out the operation $(S \times T)$, thereby outputting a product, F34E6C87500EAA4FC0000. 134 of $2^{80}$ to $2^{72}$ is selected by the multiplexer 80, as a third partial square root value comprised of one bit for sign and eight bits for data. This partial square root value is set in the pre-correction partial square root value holding circuit 73. In the inverting circuit 74, 134 is inverted, extending with an 8-bit zero at high-order positions, formed into 000CB, fed "0" as a least significant bit and output. The $(R+S \times T+T)$ operation unit 79 carries out an operation in which 000CB is taken as an actual multiplier. The multiplicand generator 75 left-shifts the outputs of the partial square root value holding circuits 69 to 72 one bit place and pads nine bits output from the pre-correction partial square root value holding circuit 73 into $2^{40}$ to $2^{32}$ to output 106E53400000000. Although FIG. 2 shows 106E53500000000 whose $2^{32}$ bit is "1" to correspond to the output of the multiplicand generator 75, it is so designed that a practically like result is led by "+T" in the operation $(R+S \times T+T)$, in the square root operation device as shown in FIG. 6. The multiplexers 76, 77 and 78 select the output of the residue holding circuit 68, the output of the multiplicand generator 75 and the output of the inverting circuit 74, respectively. The $(R+S \times T+T)$ operation unit 79, which is supplied with the outputs of the multiplexers 76, 77 and 78 and takes them as R, S and T respectively, carries out the operation $(R+S \times T+T)$. 00002757181F40000 output from the $(R+S \times T+T)$ operation unit 79 is left-shifted by the shifter 66 eight bit places, selected by the multiplexer 67 and set in the residue holding circuit 68. The multiplexer 83 selects the output of the constant adder 82 and outputs it. In the partial square root value holding circuit 71, the output of the multiplexer 83 is set.

Next, a fourth iterative computation begins. The output of the table information storing unit 65 is the same as the first iterative computation. The multiplexers 76, 77 and 78 select "0", 002757181F4000000 of a third residue $R_3$ set in the residue holding circuit 68 and 0F96B output by the table information storing unit 65, respectively. The $(R+S \times T+T)$ operation unit 79 carries out the operation $(S \times T)$, thereby outputting a resultant product, 00265427DD7A4FC000000. 002 of $2^{80}$ to $2^{72}$ is selected by the multiplexer 80, as a fourth partial square root value comprised of one bit for sign and eight bits for data. In the inverting circuit 74, 002 is inverted, extended with an 8-bit zero at high-order positions, formed into 1FFFD, fed "1" as a least significant bit and output. The $(R+S \times T+T)$ operation unit 79 carries out an operation in which 1FFFE is taken as an actual multiplier. The multiplicand generator 75 left-shifts the outputs of the partial square root value holding circuits 69 to 72 one bit place and pads nine bits output from the pre-correction partial square root value holding circuit 73 into $2^{32}$ to $2^{24}$ to output 106E46A02000000. The multiplexers 76, 77 and 78 select the output of the residue holding circuit 68, the output of the multiplicand generator 75 and the output of the inverting circuit 74, respectively. The $(R+S \times T+T)$ operation unit 79, which is supplied with the outputs of the multiplexers 76, 77 and 78 and takes them as R, S and T respectively, carries out the operation $(R+S \times T+T)$. The $(R+S \times T+T)$ operation unit 79 outputs 00067A8ADF0000000. The multiplexer 83 selects the output of the pre-correction partial square root value holding circuit 73 and outputs it. In the partial square root value holding circuit 72, the output of the multiplexer 83 is set. The digit adjustment shift count calculator 84 right-shifts "2" which is an instruction received from the normalization shift count detector 63 one bit place to form and output "1". The digit adjustor 85 merges the outputs of the partial square root holding circuits 69 to 71 and the output of the multiplexers 83, is supplied with 83723502 and right-shifts the input by 1 as instructed by the digit adjustment shift count calculator 84 to output a final result of 41B91A81.

FOURTH EMBODIMENT

Figure 7:
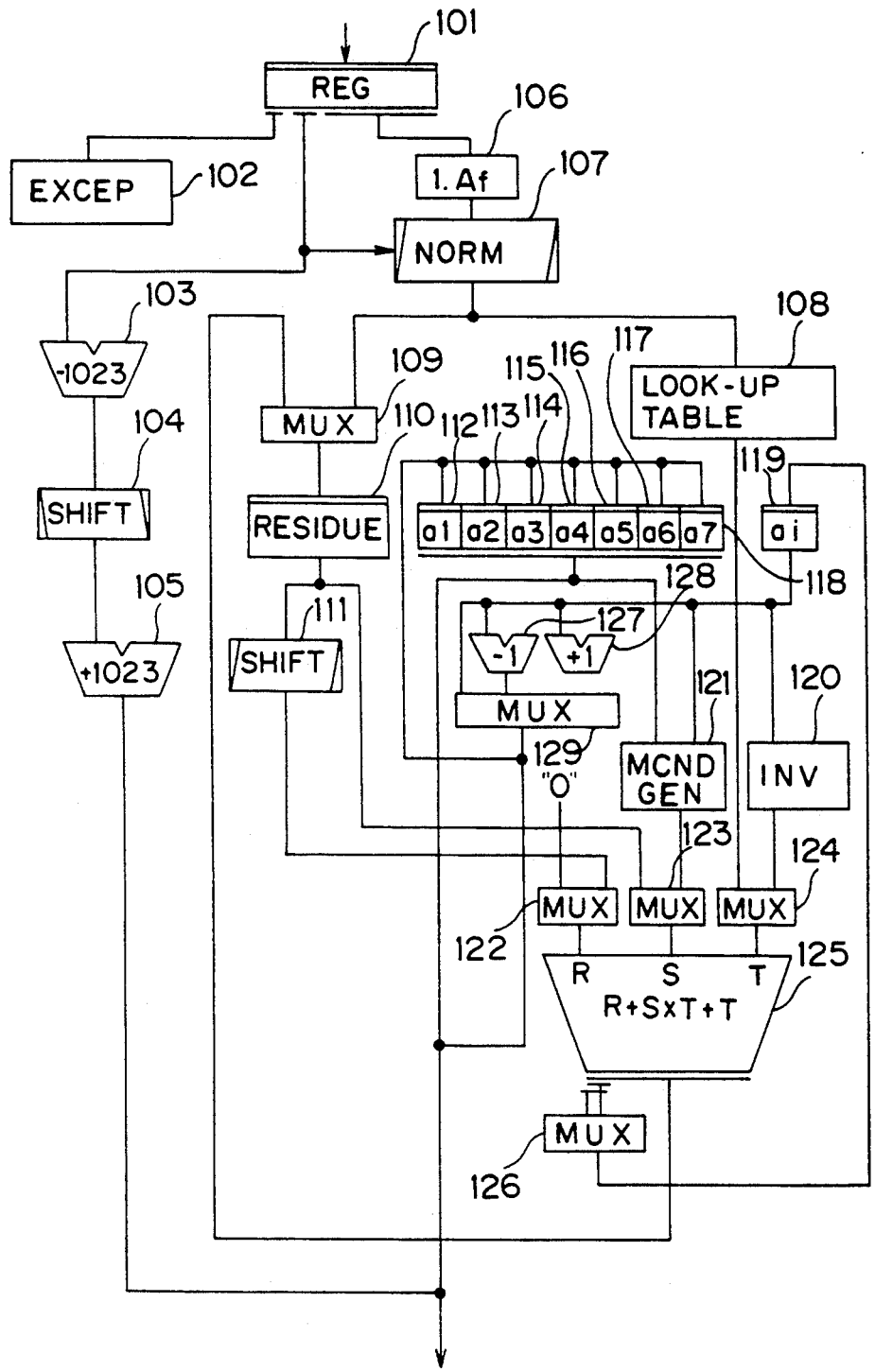
FIG. 7 is a block diagram showing a floating-point square root operation device of a fourth embodiment of the present invention.

FIG. 7 is a block diagram of a floating-point square root operation device in accordance with a fourth embodiment of the invention. An IEEE standard double-precision floating-point number is input into the floating-point square root operation device which outputs the square root of such a double-precision floating-point number, wherein a bit length as being data for a partial square root value is "8" and there is no overlap between partial square root values. FIG. 7 shows each of construction elements of this embodiment, wherein the reference numeral 101 denotes an input register; 102, an exception detector; 103, an exponent constant subtracter; 104, a shifter; 105, an exponent constant adder; 106, a leading-bit adding circuit; 107, a normalizing circuit; 108, a table information storing unit; 109, a multiplexer; 110, a residue holding circuit; 111, a shifter; 112 to 118, post-correction partial square root value holding circuit (which are hereinafter referred to as the "partial square root value holding circuit" without "post-correction"); 119, a pre-correction partial square root value holding circuit; 120, an inverting circuit; 121, a multiplicand generator; 122 to 124, multiplexers; 125, a $(R+S \times T+T)$ operation unit; 126, a multiplexer; 127, a constant subtracter; 128, a constant adder; and 129, a multiplexer.

The operation of the floating-point square root operation device as shown in FIG. 7 will be described using specified numeric values below. FIGS. 4 and 5 show a process in which an operand input is processed at each means. 56F80A494B9A80F8 is first input as an operand and set in the input register 101. The exception detector 102 carries out a positive-negative check for operands input so that it detects a data exception when the operand is negative. In the case of any exception taking place, an external instruction executing control unit, connected to the floating-point square root operation device, is alerted, accordingly. For the instant numeric values used here, the operand is positive (this precondition will be omitted below). No data exceptions are detected, accordingly. 3FF is subtracted from exponents of $2^{62}$ to $^{52}$ of the output of the input register 101 by the exponent constant subtracter 103. Then the exponents are right-shifted one bit place by the shifter 104. 3FF is again added to the exponents by the exponent constant adder 105. Accordingly, resultant exponents are found. In the leading-bit adding circuit 106, as leading bit, "1" is added to the leading ends of significand parts of $2^{51}$ to $2^0$ of the output of the input register 101. The normalizing circuit 107, if the bit of $2^{52}$ of the output of the input register 101 is "1", outputs the input after left-shifting it two bit places. If the $2^{52}$ bits is "0", it outputs the input after left-shifting it three bit places. The table information storing unit 108 is supplied with 13 bits comprised $2^{55}$ to $2^{43}$ of the normalizing circuit 107, and 0D0DE is output. Further, the bit of $2^{52}$ of the normalizing circuit 107 shall be inverted and added as a least significant bit to the above output, however, "1" is added thereto in this embodiment instead. A practical multiplier in the $(R+S\times T+T)$ operation unit 125 is 0D0DF. The multiplexer 109 selects the output of the normalizing circuit 107. The output thus selected is set int he residue holding circuit 110, at which point in time the partial square root value holding circuits 112 to 118 are reset to zero. The multiplexers 122, 123 and 124 select "0", the output of the residue holding circuit 110 and the output of the table information storing unit 108, respectively. In the $(R+S\times T+T)$ operation unit 125, the multiplication of 06029252E6A03E0 time 0D0DF is carried out, producing a product, 04E75320D19917F6020. The multiplexer 126 selects nine bits comprised from $2^{71}$ to $2^{63}$ of the $(R+S\times T+T)$ operation unit 125, as a first partial square root value comprised of one bit for sign and eight bits for data. This partial square root value is set in the pre-correction partial square root value holding circuit 119. In the shifter 111, the output of the residue holding circuit 110 is shifted 8 bit places to the left. The partial square root value is supplied to the inverting circuit 120 which bit-inverts such an input, extends an 8-bit sign at high-order positions, and adds "0" to a least significant bit for output if two bits in an adjoining relationship at low-order positions of the partial square root value are "11" or if the partial square root is negative, while it adds "1" in other cases other than the above. Further, in the multiplicand generator 121, eight bits for data, excluding a sign bit, of the output of the pre-correction partial square root value holding circuit 119 are padded into $2^{55}$ to $2^{48}$, and other bits are output in the form of zero, at the first iteration. The multiplexers 122, 123 and 124 select the outputs of the shifter 111, the multiplicand generator 121 and the inverting circuit 120, respectively. The $(R+S\times T+T)$ operation unit 1256 is supplied with the output of the multiplexer 122 taken as R, the output of the multiplexer 123 taken as S and the output of the multiplexer 124 taken as T, carrying out the operation $(R+S\times T+T)$ if "0" has been added to a least significant bit in the inverting circuit 120, or the operation $(R+S\times T)$ in other cases other than the above. A carry over is carried out in order that a corresponding bit to the least significant bit of a partial square root goes to the place of $2^{48}$ at the first iteration, to the place of $2^{40}$ at the second iteration, to the place of $2^{32}$ at the third iteration, to the place of $2^{24}$ at the fourth iteration, to the place of $2^{16}$ at the fifth iteration, to the place of $2^8$ at the sixth iteration and to the place of $2^0$ at the seventh iteration, thereafter "+T" in $(R+S\times T+T)$ being input into a carry-wave adder tree. 3E0252E6A0-3E000 output from the $(R+S\times T+T)$ operation unit 125 is selected by the multiplexer 109, thereafter being set in the residue holding circuit 110. The constant subtracter 127 subtracts "1" from LSB of the output of the pre-correction partial square root value holding circuit 119. The constant adder 128 adds "1" to LSB of the output of the pre-correction partial square root value holding circuit 119. If the output of the pre-correction partial square root value holding circuit 119 is positive and the output of the $(R+S\times T+T)$ operation unit 125 is negative, the multiplexer 129 selects the output of the constant subtracter 124 while, if two bits in an adjoining relationship at low-order positions of the partial square root value are "11" and the output of the $(R+S\times T+T)$ operation unit 125 is positive of if the partial square root value is negative and the output of the $(R+S\times T+T)$ operation unit 125 is positive, the output of the constant adder 128 is selected. In other cases other than the above, the output of the pre-correction partial square root value holding circuit 119 is selected. Judging from the above conditions, the output of the multiplexer 119 is selected at the first iteration. An output of the multiplexer 129 is set in the partial square root value holding circuit 112.

Next, a second iterative computation begins. The output of the table information storing unit 108 is the same as the first iterative computation and will stay unchanged at subsequent iterative computations. The multiplexers 122, 123 and 123 select "0", 3E0252E6A0-3E000 for a first residue $R_1$ set in the residue holding circuit 110 and 0D0DF output from the table information storing unit 108, respectively. The $(R+S\times T+T)$ operation unit 125 carries out the operation $(S\times T)$, a result of which is 3E6027619917F602000 that is output. 1E6 of $2^{72}$ to $2^{64}$ is selected by the multiplexer 126, as a second partial square root value comprised of one bit for sign and eight bits for data. This partial square root value is set in the pre-correction partial square root value holding circuit 119. The shifter 111 left-shifts the output of the residue holding circuit 110 eight bit places. In the inverting circuit 120, 1E6 is inverted, extended with an 8-bit sign at high-order positions to form 00019, added "0" as a least significant bit and output. The $(R+S\times T+T)$ operation unit 125 carries out an operation in which 00019 is taken as an actual multiplier. On the other hand, the multiplicand generator 121 left-shifts the output of the partial square root value holding circuits 112 to 118 one bit place and pads nine bits output from the pre-correction partial square root value holding circuit 119 into $2^{48}$ to $2^{40}$ to output 139E60000000000. Although FIGS. 4 and 5 show 139E70000000000 whose $2^{40}$ bit is "1" to correspond to an output of the multiplicand generator 121, it is so designed that a practically like result is led by "+T" in the operation $(R+S\times T+T)$, in the square root operation devices as shown in FIG. 7. The multiplexers 122, 123 and 124 select the output of the shifter 111, the output of the multiplicand generator 121, and the output of the inverting circuit 120, respectively. The $(R+S\times T+T)$ operation unit 125, which is supplied with the output of the multiplexer 122 taken as R, the output of the multiplexer 123 taken as S and the output of the multiplexer 124 taken as T, carries out the operation $(R+S\times T+T)$. 2CCBD6A03E00000 output from the $(R+S\times T+T)$ operation unit 125 is selected by the multiplexer 109 and set in the residue holding circuit 110. The multiplexer 129 selects the output of the pre-correction partial square root value holding circuit 119 and outputs it. In the partial square root value holding circuit 113, the output of the multiplexer 129 is set.

Next, a third iterative computation commences. The output of the table information storing unit 108 still remains the same as the first iterative computation. The multiplexers 122, 123 and 124 select "0", 2CCBD6A0-3E00000of a second residue $R_2$ set in the residue holding circuit 110 and 0D0DF output from the table information storing unit 108, respectively. The (R+S×T+T) operation unit 125 carries out the operation (S×T), a result of which is 3054E3F227F60200000 that is output. 105 of $2^{72}$ to $2^{64}$ is selected by the multiplexer 126, as a third partial square root value comprised of one bit for sign and eight bits for data. This partial square root value is set in the pre-correction partial square root value holding circuit 119. The shifter 111 left-shifts the output of the residue holding circuit 110 eight bit places. In the inverting circuit 120, 105 is inverted, extended with an 8-bit sign at high-order positions to form 000FA, added "0" as a least significant bit and output. The (R+S×T+T) operation unit 125 carries out an operation in which 000FA is taken as an actual multiplier. The multiplicand generator 121 left-shifts the outputs of the partial square root value holding circuits 112 to 118 one bit place and pads nine bits output from the pre-correction partial square root value holding circuit 119 into $2^{40}$ to $2^{32}$ to output 139CD0500000000. Although FIGS. 4 and 5 show 139CD0500000000. Although FIGS. 4 and 5 show 139CD0600000000 whose $2^{32}$ bit is added by "1" to correspond to the output of the multiplicand generator 121, it is so designed that a practically like result is led by "+T" in the operation (R+S×T+T), in the square root operation device as shown in FIG. 7. The multiplexers 122, 123 and 124 select the output of the shifter 111, the output of the multiplicand generator 121, and the output of the inverting circuit 120, respectively. The (R+S×T+T) operation unit 125, which is supplied with the output of the multiplexer 122 (i.e., R), the output of the multiplexer 123 (i.e., S) and the output of the multiplexer 124 (i.e., T), carries out the operation (R+S×T+T). 32F1DFE0000000 output from the (R+S×T+T) operation unit 125 is selected by the multiplexer 109 and set in the residue holding circuit 110. The multiplexer 129 selects the output of the pre-correction partial square root value holding circuit 119 and outputs it. In the partial square root value holding circuit 114, the output of the multiplexer 129 is set.

A fourth iterative computations begins. The output of the table information storing unit 108 still remains the same as the first iterative computation. The multiplexers 122, 123 and 124 select "0", 32FA1DFE0000000 of a third residue $R_3$ set in the residue holding circuit 110 and 0D0DF output from the table information storing unit 108, respectively. The (R+S ×T+T) operation unit 125 carries out the operation (S×T), a result of which is 355FE03E80420000000 that is output. 155 of $2^{72}$ to $2^{64}$ is selected by the multiplexer 126 as a fourth partial square root value comprised of one bit for sign and eight bits for data. This partial square root value is set in the pre-correction partial square root value holding circuit 119. The shifter 111 left-shifts the output of the residue holding circuit 110 eight bit places. In the inverting circuit 120, 155 is inverted, extended with an 8-bit sign at high-order positions to form 000AA, added "0" as a least significant bit and output. The (R+S×T+T) operation unit 125 carries out an operation in which 000AA is taken as an actual multiplier. The multiplicand generator 121 left-shifts the outputs of the partial square root value holding circuits 112 to 118 one bit place and pads nine bits output from the pre-correction partial square root value holding circuit 119 into $2^{32}$ to $2^{24}$ to output 139CC0B55000000. Although FIGS. 4 and 5 show 139CC0B56000000 whose $2^{24}$ bit is added by "1" to correspond to the output of the multiplicand generator 121, it is so designed that a practically like result is led by "+T" in the operation (R+S×T+T), in the square root operation device as shown in FIG. 7. The multiplexers 122, 123 and 124 select the output of the shifter 111, the output of the multiplicand generator 121, and the output of the inverting circuit 120, respectively. The (R+S×T+T) operation unit 125 is supplied with the output of the multiplexer 122 (i.e., R), the output of the multiplexer 123 (i.e., S) and the output of the multiplexer 124 (i.e., T) so that it carries out the operation (R+S×T+T). 0035F671C000000 output from the (R+S×T+T) operation unit 125 is selected by the multiplexer 109 and set in the residue holding circuit 110. The multiplexer 129 selects the output of the constant adder 128 and outputs it. In the partial square root value holding circuit 115, the output of the multiplexer 129 is set.

A fifth iterative computation begins. The output of the table information storing unit 108 still remains the same as the first iterative computation. The multiplexers 122, 123 and 124 select "0", 0035F671C000000 of a fourth residue $R_4$ set in the radius holding circuit 110 and 0D0DF output from the table information storing unit 108, respectively. The (R +S×T+T) operation unit 125 carries out the operation (S×T), a result of which is 002C073E19164000000 that is output. 002 of $2^{72}$ to $2^{64}$ is selected by the multiplexer 126 as a fifth partial square root value comprised of one bit for sign and eight bits for data. This partial square root value is set in the pre-correction partial square root value holding circuit 119. The shifter 111 left-shifts the output of the residue holding circuit 110 eight bit places. In the inverting circuit 120, 002 is inverted, extended with an 8-bit sign at high-order positions to form 1FFFD, added "0" as a least significant bit and output. The (R+S×T+T) operation unit 125 carries out an operation in which 1FFFD is taken as an actual multiplier. On the other hand, the multiplicand generator 121 left-shifts the outputs of the partial square root value holding circuits 112 to 118 one bit place and pads nine bits output from the pre-correction partial square root value holding circuit 119 into $2^{24}$ to $2^{16}$ to output 139CC0AAC020000. Although FIGS. 4 and 5 show 139CC0AAC030000 whose $2^{16}$ bit is "1" to correspond to the output of the multiplicand generator 121, it is so designed that a practically like result is led by "+T" in the operation (R+S×T+T), in the square root operation device as shown in FIG. 7. The multiplexers 122, 123 and 124 select the output of the shifter 111, the output of the multiplicand generator 121, and the output of the inverting circuit 120, respectively. The (R+S×T+T) operation unit 125 is supplied with the output of the multiplexer 122 (i.e., R), the output of the multiplexer 123 (i.e., S) and the output of the multiplexer 124 (i.e., T) so that it carries out the operation (R+S×T+T). 3B202FBFBF70000 output from the (R+S×T+T) operation unit 125 is selected by the multiplexer 109 and set in the residue holding circuit 110. The multiplexer 129 selects the output of the pre-correction partial square root value holding circuit 119 and outputs it. In the partial square root value holding circuit 116, the output of the multiplexer 129 is set.

A sixth iterative computation begins. The output of the table information storing unit 108 still remains the same as the first iterative computation. The multiplexers 122, 123 and 124 select "0", 3B202FBFBF70000 of a fifth residue $R_5$ set in the residue holding circuit 110 and 0D0DF output from the table information storing unit 108, respectively. The (R+S×T+T) operation unit 125 carries out the operation (S×T), a result of which is 3C05E7D5639000 that is output. 1CO of $2^{72}$ to $2^{64}$ is selected by the multiplexer 126 as a sixth partial square root value comprised of one bit for sign and eight bits for data. This partial square root value is set in the pre-correction partial square root value holding circuit 119. The shifter 111 left-shifts the output of the residue holding circuit 110 eight bit places. In the inverting circuit 120, 1CO is inverted, extended with an 8-bit sign at high-order positions to form 0003F, added "0" as a least significant bit and output. The (R+S×T+T) operation unit 125 carries out an operation in which 0003F is taken as an actual multiplier. On the other hand, the multiplicand generator 121 left-shifts the outputs of the partial square root value holding circuits 112 to 118 one bit place and pads nine bits output from the pre-correction partial square root value holding circuit 119 into $2^{16}$ to $2^8$ to output 139CC0AAC05C000. Although FIGS. 4 and 5 show 139CC0AAC05C100 whose $2^8$ bit is "1" to correspond to the output of the multiplicand generator 121, it is so designed that a practically like result is led by "+T" in the operation (R+S×T+T) in the square root operation device as shown in FIG. 7. The multiplexers 122, 123 and 124 select the output of the shifter 111, the output of the multiplicand generator 121 and the output of the inverting circuit 120, respectively. The (R+S×T+T) operation unit 125 is supplied with the output of the multiplexer 122 (i.e., R), the output of the multiplexer 123 (i.e., S) and the output of the multiplexer 124 (i.e., T) so that it carries out the operation (R+S×T+T). 33C329C4C6A7F00 output from the (R+S×T+T) operation unit 125 is selected by the multiplexer 109 and set in the residue holding circuit 110. The multiplexer 129 selects the output of the pre-correction partial square root value holding circuit 119 and outputs it. In the partial square root value holding circuit 117, the output of the multiplexer 129 is set.

A seventh iterative computation begins. The output of the table information storing unit 108 still remains the same as the first iterative computation. The multiplexers 122, 123 and 124 select "0", 33C329C4C6A7F00 of a seventh residue $R_7$ set in the residue holding circuit 110 and 0D0DF output from the table information storing unit 108, respectively. The (R+S×T+T) operation unit 125 carries out the operation (S×T), a result of which is 3603E8F143D17F4A100 that is output. 160 of $2^{72}$ to $2^{64}$ is selected by the multiplexer 126 as a seventh partial square root value comprised of one bit for sign and eight bits for data. This partial square root value is set in the pre-correction partial square root value holding circuit 119. The shifter 111 left-shifts the output of the residue holding circuit 110 eight bit places. In the inverting circuit 120, 160 is inverted, extended with an 8-bit sign at high-order positions to form 0009F, added "0" as a least significant bit and output. The (R+S×T+T) operation unit 125 carries out an operation in which 0009F is taken as an actual multiplier. The multiplicand generator 121 left-shifts the outputs of the partial square root value holding circuits 112 to 118 one bit place and pads nine bits output from the pre-correction partial square root value holding circuit 119 into $2^8$ to $2^0$ to output 139CC0AAC058160. Although FIGS. 4 and 5 show 139CC0AA058161 whose $2^0$ bit is "1" to correspond tot he output of the multiplicand generator 121, it is so designed that a practically like result is led by "+T" in the operation (R+S×T+T) in the square root operation device as shown in FIG. 7. The multiplexers 122, 123 and 124 select the output of the shifter 111, the output of the multiplicand generator 121 and the output of the inverting circuit 120, respectively. The (R+S×T+T) operation unit 125 is supplied with the output of the multiplexer 122 (i.e., R), the output of the multiplexer 123 (i.e., S) and the output of the multiplexer 124 (i.e., T) so that it carries out the operation (R+S×T+T). 31856ED41EA5B3F output from the (R+S×T+T) operation unit 125 is selected by the multiplexer 109 and set in the residue holding circuit 110. The multiplexer 129 selects the output of the pre-correction partial square root value holding circuit 119 and outputs it. In the partial square root value holding circuit 118, the output of the multiplexer 129 is set.

As a final result, 46739CC0AAC0580C is output from the square root operation device as shown in FIG. 7, which is obtained by batching "0" as a sign bit for $2^{63}$, 11 bits output by the exponent constant adder 105 as exponent parts for $2^{62}$ to $2^{52}$, and seven low-order bits of the partial square root value holding circuit 112, 40 bits of the partial square root value holding circuits 113 to 117, and 5 high-order bits of the output of the multiplexer 129, as significant parts for $2^{51}$ to $2^0$.

FIFTH EMBODIMENT

Figure 8:
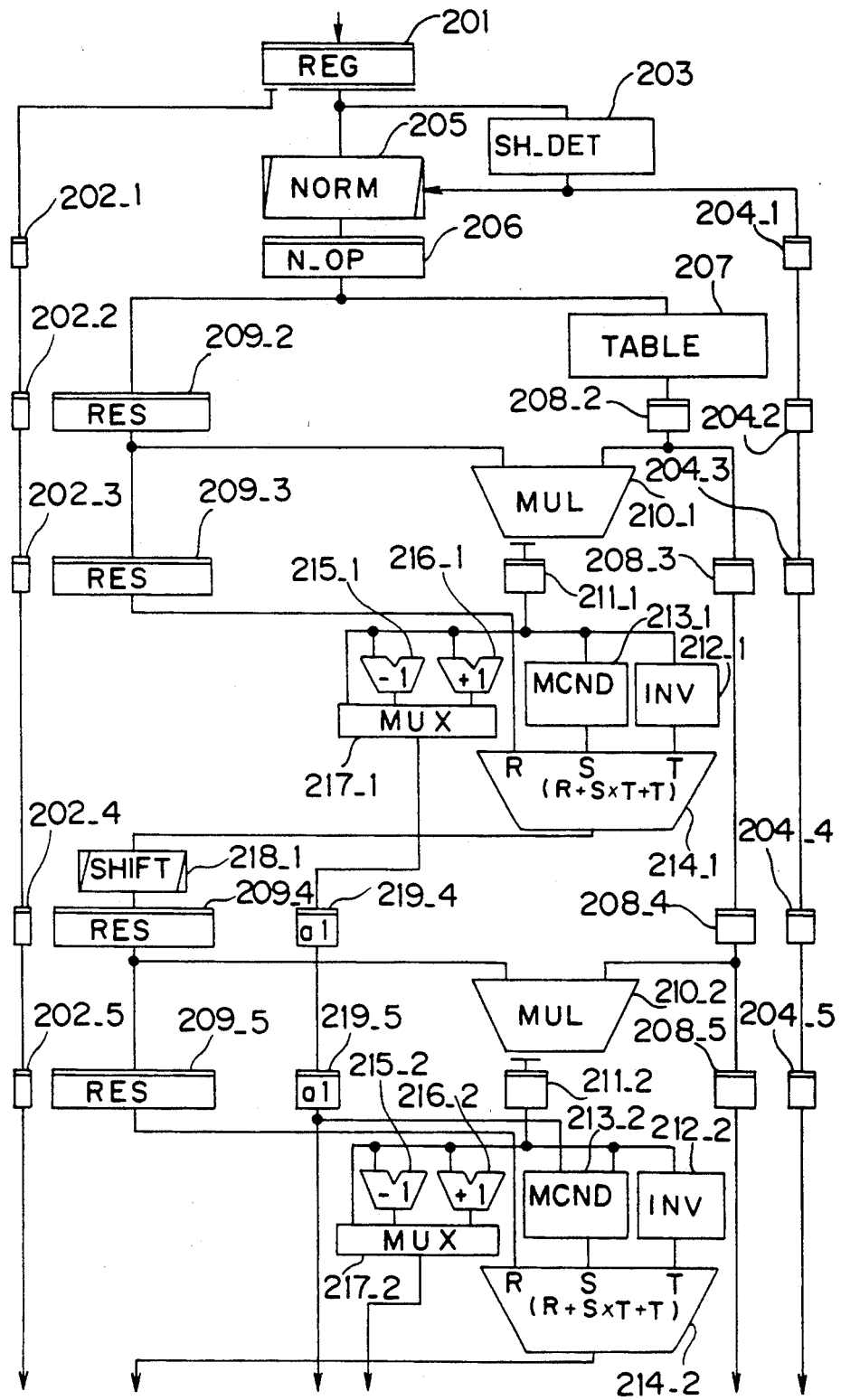
FIG. 8 is a block diagram showing one half of a fixed-point vector square root operation device of a fifth embodiment of the present invention.
Figure 9:
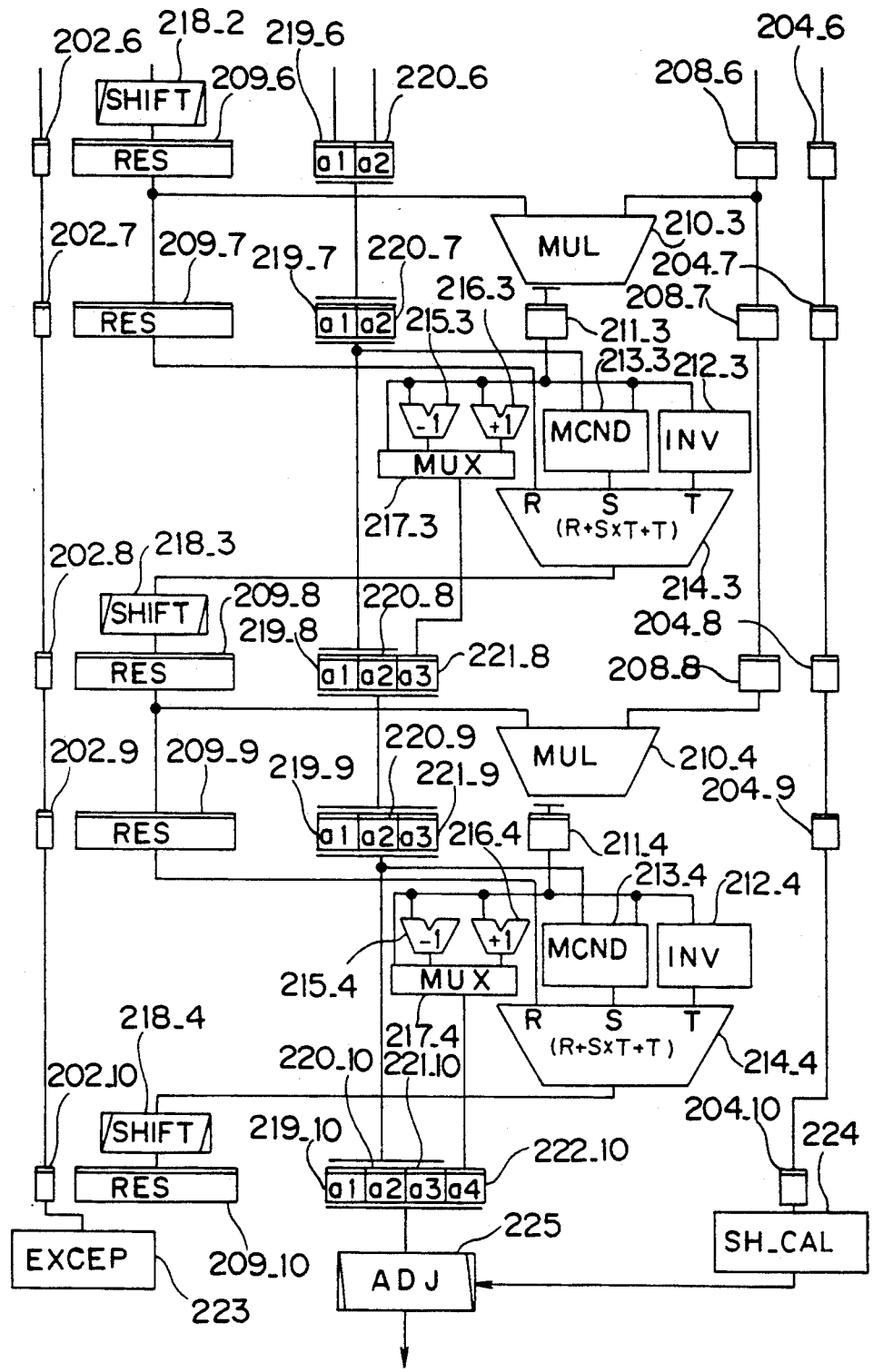
FIG. 9 is a block diagram showing the other half of the fixed-point vector square root operation device in FIG. 8.

FIGS. 8 and 9 are block diagrams of a fixed-point vector square root operation device in accordance with a fifth embodiment of the invention. The fixed-point vector square root operation device of this embodiment is supplied with in an element order a 64-bit fixed-point number in 2's complement notation and outputs in an element order a 32-bit square root in 3's complement notation, wherein a bit length as being data for a partial square root value is "8" and there is no overlap between partial square root values. In FIGS. 8 and 9, the reference numeral 201 denotes an input register; 202_1 to 202_10, exception detecting information holding circuits; 203, a normalization shift count detector; 204_1 to 204_10, normalization shift count holding circuits; 205, a normalization circuit; 206, a normalized operand register; 207, a table information storing unit; 208_2 to 208_9; table output information holding circuits; 209_2 to 209_9; residue holding circuits; 210_1 to 210_4, multiplying circuits; 211_1 to 211_4, pre-correction partial square root value holding circuits; 212_1 to 212_4, inverting circuits; 213_1 to 213_4, multiplicand generators; 214_1 to 214_4, (R+S×T+T) operation units; 215_1 to 215_4, constant subtracters; 216_1 to 216_4, constant adders; 217_1 to 217_4, multiplexers; 218_1 to 218_4, shifters; 219_4 to 219_10, 220_6 to 220_10, 221_8 to 221_10, post-correction partial square root value holding circuits (hereinafter referred to as the "partial square root value holding circuit" without "post-correction"); 223, an exception detector; 224, a digit adjustment shift count calculator; and 225, a digit adjustor.

The operation of the fixed-point vector square root operation device as shown in FIGS. 8 and 9 will be described below with the help of specific numeric values. FIG. 2 shows a process in which an operand input that is an element of a vector is processed at each means. The process of how such a single element is processed is described below.

STAGE 0

In the first place, an operand, namely 10DF854CED-1AA07D is input and set in the input register 201. The normalization shift count detector 203 detects the number of shifts necessary for carrying out 2-bit normalization, which outputs "2". The normalizing circuit 205 receives from the normalization shift count detector 203 an instruction telling that the number of shifts is 2 and then left-shifts the input data two bit places, thereby outputting 437E1533B46A81F4.

STAGE 1

First two leading bits of the output of the input register 210, the output of the normalizing circuit 205 and the output of the normalizing shift count detector 203 are set in the exception detecting information holding circuit 202_1, the normalized operand register 206 and the normalizing shift count holding circuit 204_1, respectively. Input into the table information storing unit 207 are 13 bits comprised of $2^{63}$ to $2^{51}$ of the normalized operand register 206, and 0F96B is output. The bit of $2^{50}$ of the normalizing circuit 205 shall be inverted and added as a least significant bit to this output, however, "0" is added thereto in this embodiment instead. 0F96B becomes an actual multiplier in the multiplying circuits 201_1 to 210_4.

STAGE 2

An output of the exception detecting information holding circuit 202_1, the output of the normalized operand register 206 with the addition of a 4-bit zero to its leading end, the output of the table information storing unit 207, and the output of the normalization shift count holding circuit 204_1 are set in the 202_2, the residue holding circuit 209_2, the table output information holding circuit 208_2, and the 204_2, respectively. In the multiplying circuit 210_1, 0437E1533B46A81F4 is multiplied by 0F96B, a product, 041C1D852271800EAA4FC being obtained.

STAGE 3

First, nine bits comprised of $2^{79}$ to $2^{71}$ of the multiplying circuit 210_1 serving as a first partial square root value comprised of one bit for sign and eight bits for data are set in the pre-correction partial square root value holding circuit 211_1. An output of the exception detecting information holding circuit 202_2, the output of the residue holding circuit 209_2, the output of the table output information holding circuit 208_2 and the output of the normalization shift count holding circuit 204_2 are set in the 202_3, the 209_3, the 208_3 and 204_3, respectively. The inverting circuit 212_1 is supplied with the output of the pre-correction partial square root value holding circuit 211_1. The inverting circuit 212_2 inverts the input data, and further adds "0" to a least significant bit for output, if two bits in an adjoining relationship at low-order positions of the partial square root value are "11" or if the partial square root is negative, while "1" is added in other cases other than the above. Furthermore, in the multiplicand generator 213_1, the output of the pre-correction square root value holding circuit 211_1 is padded into $2^{55}$ to $2^{48}$, and other bits are output in the form of zero. The (R+S×T+T) operation unit 214_1 is supplied with the output of the residue holding circuit 209_3 (i.e., R), the output of the multiplicand generator 213_1 (i.e., S) and the output of the inverting circuit 212_1 (i.e., T) so that it carries out the operation (R+S×T+T) if "0" has been added to a least significant bit in the inverting circuit 212_1, or the operation (R+S×T) in other cases other than the above. A carry over is carried out in order that a corresponding bit to the least significant bit of a partial square root goes to the place of $2^{48}$ in the (R+S×T+T) operation unit 214_1, to the place of $2^{40}$ in the 214_2, to the place of $2^{32}$ in the 214_3 and to the place of $2^{24}$ in the 214_4, thereafter "+T" in (R+S×T+T) being input into a carry-save adder tree. 000751533D46A81F4 output from the (R+S×T+T) operation unit 214_1 is shifted by the shifter 218_1 eight bit places to the left. On the other hand, the constant subtracter 214_1 subtracts "1" from LSB of the output of the pre-correction partial square root value holding circuit 211_1. The constant adder 216_1 adds "1" to LSB of the output of the pre-correction partial square root value holding circuit 211_1. When the output of the pre-correction partial square root value holding circuit 211_1 is positive and the output of the (R+S×T+T) operation unit 214_1 is negative, the multiplexer 217_1 selects the output of the constant subtracter 215_1 while, when two bits in an adjoining relationship at low-order positions of the partial square root value are "11" and the output of the (R+S×T+T) operation unit 214_1 is positive or when the partial square root value is negative and the output of the (R+S×T+T) operation unit is 214_1 is positive, the output of the constant adder 216_1 is selected. In other cases other than the above, the output of the pre-correction partial square root value holding circuit 211_1 is selected. Judging from the above conditions, the output of the pre-correction partial square root value holding circuit 211_1 is selected in this embodiment.

STAGE 4

An output of the shifter 218_1 is set in the residue holding circuit 209_4, the output of the multiplexer 217_1, in the partial square root value holding circuit 219_4, the output of the exception detecting information holding circuit 202_3, in the 202_4, the output of the table output information holding circuit 208_4, int eh 208_5 and the output of the normalization shift count holding circuit 204_4, in the 204_5. 0751533B46A81F400 of a first residue $R_1$ set in the residue holding circuit 209_4 is multiplied by 0F96B output from the table output information holding circuit 208_4 by means of the multiplying circuit 210_2, a result of which is 072128F271800EAA4FC00 that is output.

STAGE 5

072, serving as a second partial square root value comprised of one bit for sign and eight bits for data, of $2^{80}$ to $2^{72}$ of the output of the multiplying 210_2 is set in the pre-correction partial square root value holding circuit 211_2, the output of the exception detecting information holding circuit 202_4, in the 204_5, the output of the residue holding circuit 209_4, in the 209_5, the output of the partial square root value holding means 219_4, in the 219_5, the output of the table output information holding circuit 208_4, in the 208_5 and the output of the normalization shift count holding circuit 204_4, in the 204_5. The inverting circuit 212_2 inverts 072 to form 18D, adds to it "0" as a least significant bit and outputs it. The (R+S×T+T) operation unit 214_2 carries out an operation in which 18D is taken as an actual multiplier. On the other hand, the multiplicand generator 213_2 left-shifts the output of the partial square root value holding circuit 219_5 one bit place and pads nine bits output from the pre-correction partial square root value holding circuit 211_2 into $2^{48}$ to $2^{40}$ to output 106720000000000. Although FIG. 2 shows 106730000000000 whose $2^{40}$ bit is "1" to correspond to the output of the multiplicand generator 213_2, it is so designed that a practically like result is led by "+T" in the operation (R+S×T+T) in the square root operation device as shown in FIGS. 8 and 9. The (R+S×T+T) operation unit 214_2 is supplied with the output of the residue holding circuit 209_5, R, the output of the multiplicand generator 213_2, S and the output of the inverting circuit 212_2, T so that it carries out the operation (R+S×T+T) if "0" has been added to a least significant bit in the inverting circuit 212_2, or the operation (R+S×T) in other cases other than the above. A carry over is carried out in order that a corresponding bit to the least significant bit of a partial square root goes to the place of $2^{40}$ at the second iteration, thereafter "+T" in (R+S×T+T) being input into the carry-save adder tree. FFF2F8AB46A81F400 output from the (R+S×T+T) operation unit 214_2 is left-shifted by the shifter 218_2 eight bit places. The multiplexer 217_2 selects the output of the pre-correction partial square root value holding circuit 211_2 and outputs it.

STAGE 6

An output of the shifter 218_2 is set in the residue holding circuit 209_6, the output of the partial square root value holding circuit 219_5, in the 219_6, the output of the multiplexer 217_2, in the partial square root value holding circuit 220_6, the output of the exception detecting information holding circuit 202_5, in the 202_6, the output of the table output information holding circuit 208_5, in the 208_6 and the output of the normalization shift count holding circuit 204_5, in the 204_6. F2F8AB46A81F4000 of a second residue $R_2$ set in the residue holding circuit 209_6 is multiplied by 0F96B output from the table output information holding circuit 208_6 by means of the multiplying circuit 210_3, a result of which id F34E6C875-00EAA4FC0000 that is output.

STAGE 7

134, serving as a third partial square root value comprised of one bit for sign and eight bits for data, of $2^{80}$ to $2^{72}$ of the output the multiplying circuit 210_3 is set in the pre-correction partial square root value holding circuit 211_3, the output of the exception detecting information holding circuit 202_6, in the 204_7, the output of the residue holding circuit 209_6, in the 209_7, the output of the partial square root value holding circuit 219_6, in the 219_7, the output of the partial square root value holding circuit 220_6, in the 220_7, the output of the table output information holding circuit 208_6, in the 208_7 and the output of the normalization shift count holding circuit 204_6, in the 204_7. The inverting circuit 212_3 inverts 134 to form 0CB, adds to it "0" as a least significant bit and outputs it. The (R+S×T+T) operation unit 214_3 carries out an operation in which 0CB is taken as an actual multiplier. On the other hand, the multiplicand generator 213_3 left-shifts the output of the partial square root value holding circuits 219_7 and 220_7 one bit place and pads nine bits output from the pre-correction partial square root value holding circuit 211_3 into $2^{40}$ to $2^{32}$ to output 106E53400000000. Although FIG. 2 shows 106E53500000000 whose $2^{32}$ bit is "1" to correspond to the output of the multiplicand generator 213_3, it is so designed that a practically like result is led by "+T" in the operation (R+S×T+T) in the square root operation device as shown in FIGS. 8 and 9. The (R+S×T+T) operation unit 214_3 is supplied with the output of the residue holding circuit 209_7, R, the output of the multiplicand generator 213_3, S and the output of the inverting circuit 212_3, T so that it carries out the operation (R+S×T+T) if "0" has been added to a least significant bit in the inverting circuit 212_3, or the operation (R+S×T) in other cases other than the above. A carry over is carried out in order that a corresponding bit to the least significant bit of a partial square root goes to the place of $2^{32}$ at the third iteration, thereafter "+T" in (R+S×T+T) being input into the carry-save adder tree. 0002757181F40000 output from the (R +S×T+T) operation unit 214_3 is left-shifted by the shifter 218_3 eight bit places. The multiplexer 217_3 selects the output of the constant adder 215_3 and outputs it.

STAGE 8

An output of the shifter 218_3 is set in the residue holding circuit 209_8, the output of the partial square root value holding circuit 219_7, in the 219_8, the output of the partial square root value holding circuit 220_7, in the 220_8, the output of the multiplexer 217_3, in the partial square root value holding circuit 221_8, the output of the exception detecting information holding circuit 202_7, in the 202_8, the output of the table output information holding circuit 208_7, in the 208_8 and the output of the normalization shift count holding circuit 204_7, in the 204_8. 002757181F4000000 of a third residue $R_3$ set in the residue holding circuit 209_8 is multiplied by 0F96B output form the table output information holding circuit 208_8 by means of the multiplying circuit 210_4, a result of which is 00265427DD7A4FC000000 that is output.

STAGE 9

002, serving as a fourth partial square root value comprised of one bit for sign and eight bits for data, of $2^{80}$ to $2^{72}$ of the output of the multiplying circuit 210_4 is set in the pre-correction partial square root value holding circuit 211_4, the output of the exception detecting information holding circuit 202_8, in the 202_9, the output of the residue holding circuit 209_8, in the 209_9, the output of the partial square root value holding circuit 219_8, in the 219_9, the output of the partial square root value holding circuit 220_8, in the 220_9, the output of the partial square root value holding circuit 221_8, in the 221_9 and the output of the normalization shift count holding circuit 204_8, in the 204_9. The inverting circuit 212_4 inverts 002 to form 1FD, adds to it "1" as a least significant bit and outputs it. The (R+S×T+T) operation unit 214_4 carries out an operation in which 1FE is taken as an actual multiplier. On the other hand, the multiplicand generator 213_4 left-shifts the outputs of the partial square root value holding circuits 219_9 to 221_9 one bit place and pads nine bits output from the pre-correction partial square root value holding circuit 211_4 into $2^{32}$ to $2^{24}$ to output 106E46A02000000. The (R+S×T+T) operation unit 214_4 is supplied with the output of the residue holding circuit 209_9, R, the output of the multiplicand generator 213_4, S and the output of the inverting circuit 212_4, T so that it carries out the operation (R+S×T+T) if "0" has been added to a least significant bit in the inverting circuit 212_4, or the operation (R+S×T) in other cases other than the above. A carry over is carried out in order that a corresponding bit to the least significant bit of a partial square root goes to the place of $2^{24}$ at the fourth iteration, thereafter "+T" in (R+S×T+T) being input into the carry-save adder tree. 00067A8ADF0000000 output from the (R+S×T+T) operation unit 214_4 is left-shifted by shifter 218_4 eight bit places. The multiplexer 217_4 selects the output of the pre-correction partial square root value holding circuit 211_4 and outputs it.

STAGE 10

An output of the shifter 218_4 is set in the residue holding circuit 209_10, the output of the partial square root value holding circuit 219_9, in the 219_10, the output of the partial square root value holding circuit 220_9, in the 220_10, the output of the partial square root value holding circuit 221_9, in the 221_10, the output of the multiplexer 217_4, in the partial square root value holding circuit 222_10, the output of the exception detecting information holding circuit 202_9, in the 202_10, and the output of the normalization shift count holding circuit 204_9, in the 204_10. The exception detector 223 carries out a check, which detects a data exception if two bits output from the exception detecting information holding circuit 202_10 are "10" or "11" and further detects and overflow exception if the two bits are "01". In the case of any exception taking place, an external instruction executing control unit, connected to the fixed-point vector square root operation device, is alerted by the exception detector 223. In this embodiment, no data exceptions are detected. The digit adjustment calculator 224 receives "2" from the normalization shift count holding circuit 204_10 and right-shifts the data received one bit place to form and output "1". The digit adjustor 225 merges the outputs of the partial square root holding circuits 219_10 to 222_10, being supplied with 83723502. Then the digit adjustor 225 right-shifts the data by 1 as instructed by the digit adjustment shift count calculator 224 and outputs a final result of 41B91A81.

SIXTH EMBODIMENT

Figure 10:
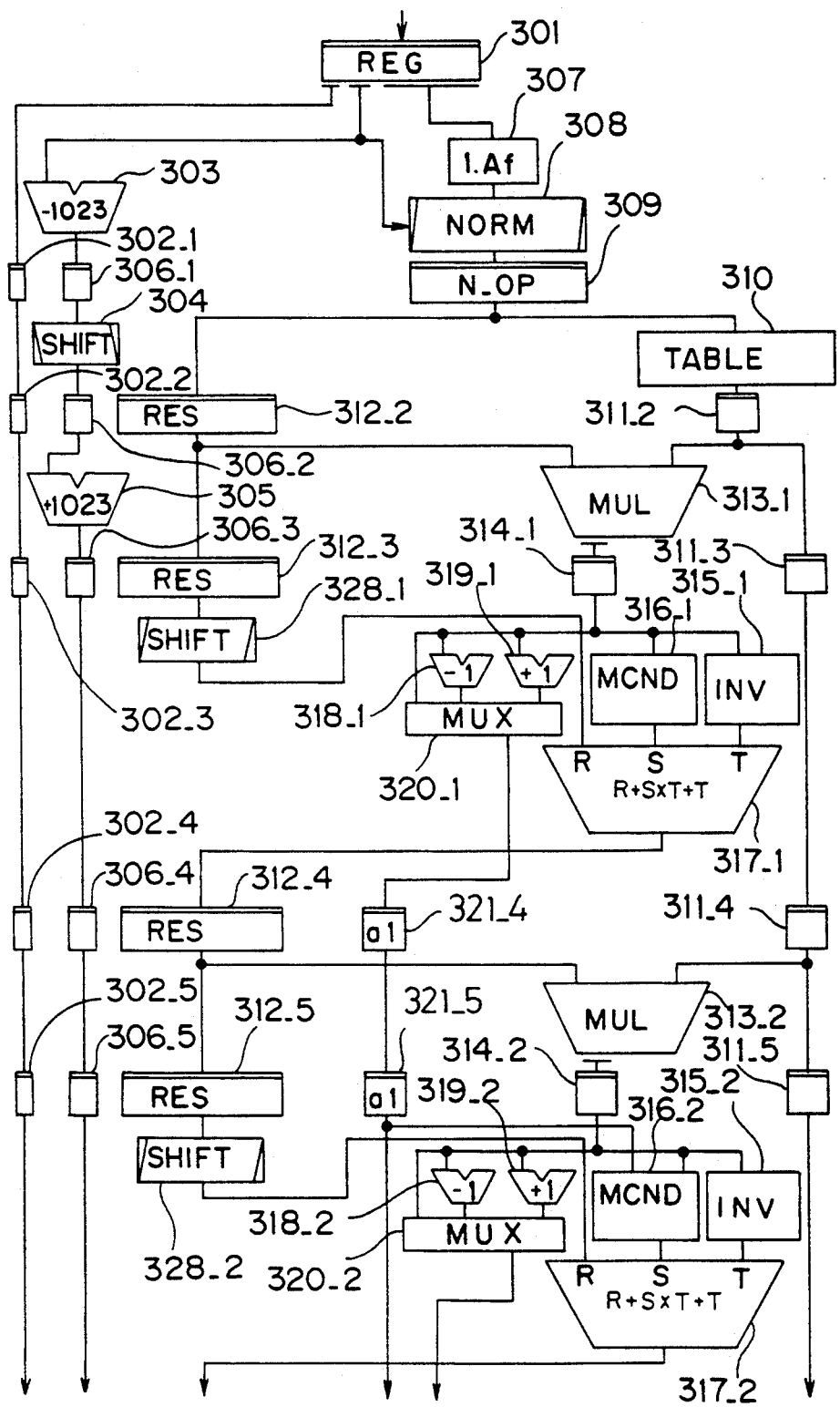
FIG. 10 is a block diagram showing a first section of a floating-point vector square root operation device of a sixth embodiment of the present invention.
Figure 11:
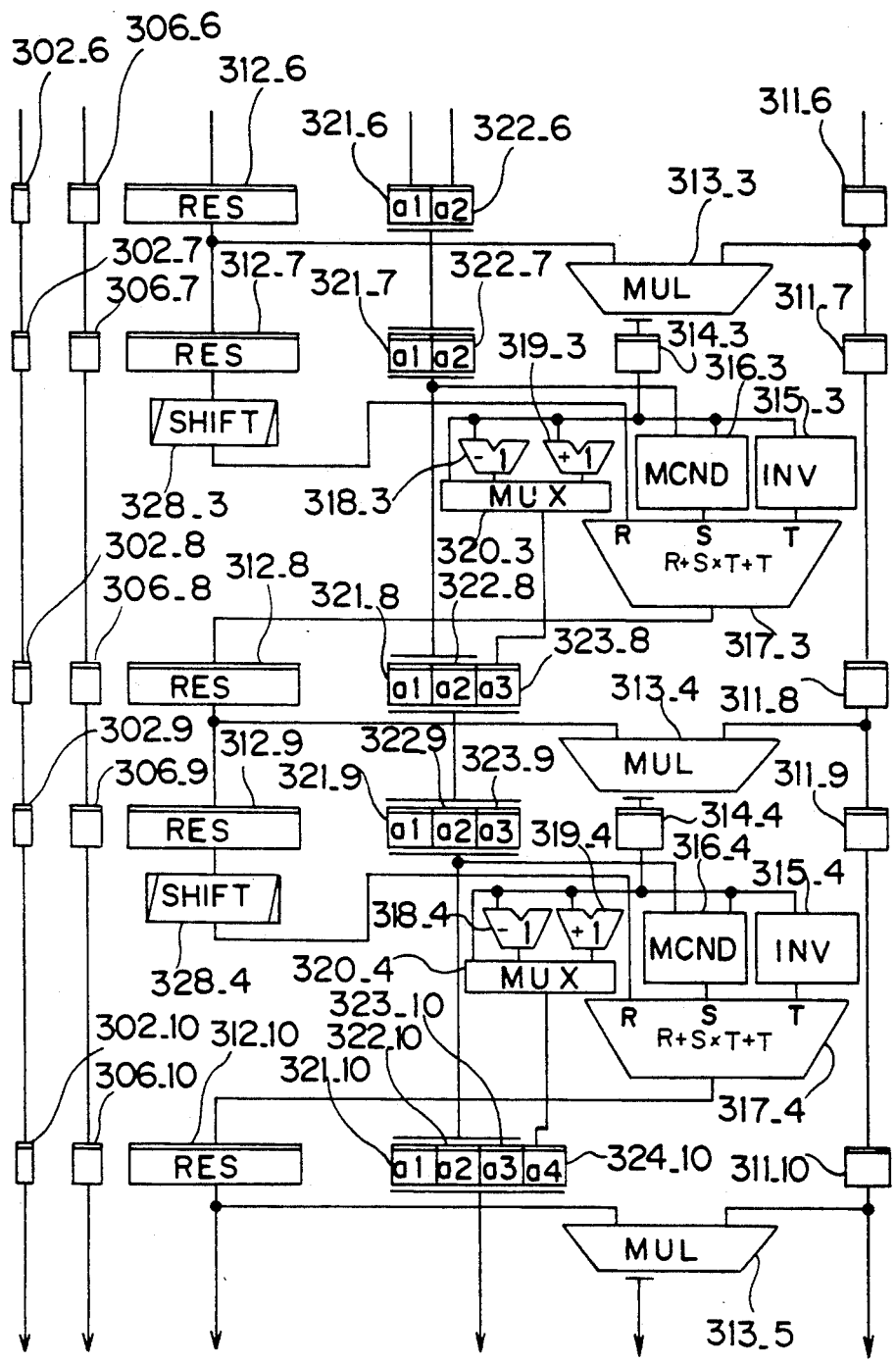
FIG. 11 is a block diagram showing a second section of the floating-point vector square root operation device in FIG. 10.
Figure 12:
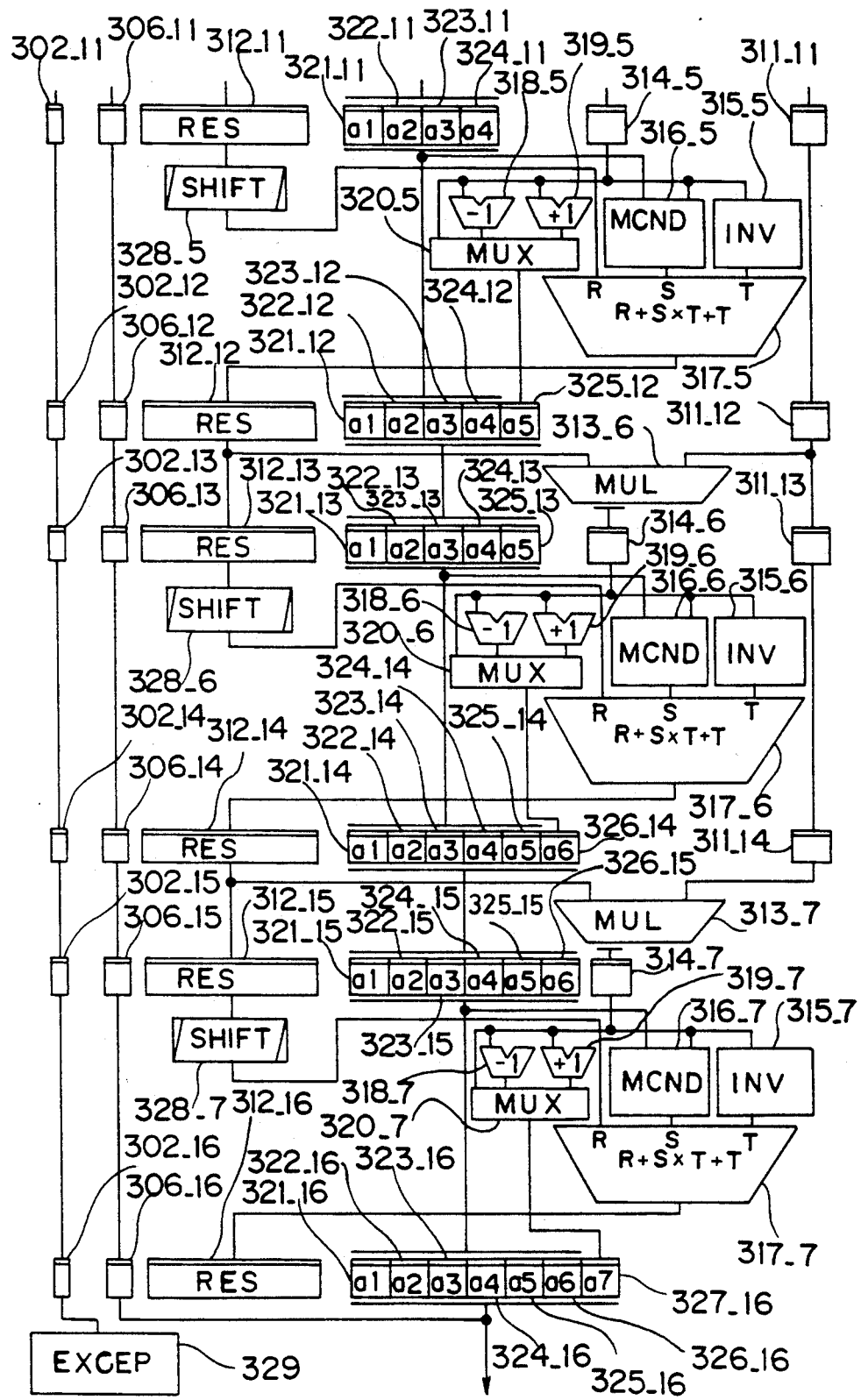
FIG. 12 is a block diagram showing the remaining section of the floating-point vector square root operation device in FIG. 10.

FIGS. 10, 11 and 12 are block diagrams of a floating-point vector square root operation device in accordance with a sixth embodiment of the invention. An IEEE standard double-precision floating-point number vector is input in element order into the floating-point vector square root operation device which outputs in element order the square root vector of such a double-precision floating-point number, wherein a bit length as being data for a partial square root value is "8" and there is no overlap between partial square root values. In FIGS. 10, 11 and 12, the reference numeral 301 denotes an input register; 302_1 to 302_16, exception detecting information holding circuits; 303, an exponent constant subtracter; 304, a shifter; 305, an exponent constant adder; 306_1 to 306_16, exponent holding circuits; 307, a leading-bit adding circuit; 308, a normalizing circuit; 309, a normalized operand register; 310, a table information storing unit; 311_2 to 311_14, table output information holding circuits; 312_2 to 312_16, residue holding circuits; 313_1 to 313_7, multiplying circuits; 314_1 to 314_7, pre-correction partial square root value holding circuits; 315_1 to 315_7, inverting circuits; 316_1 to 316, multiplicand generators; 317_1 to 317_7, (R+S×T+T) operation units; 318_1 to 318_7, constant subtracters; 319_1 to 319_7, constant adders; 320_1 to 320_7, multiplexers; 321_4 to 321_16, 322_6 to 322_16, 323_8 to 323_16, 324_10 to 324_16, 325_12 to 325_16, 326_14 to 236_16 and 327_16, post-correction partial square root value holding circuits; 328_1 to 328_7, shifters; and 329, an exception detector.

The operation of the floating-point vector square root operation device as shown in FIGS. 10, 11 and 12 will be described using specified numeric values below. FIGS. 4 and 5 show a process in which an operand input that is an element of a vector is processed at each means. The process of how such a single element is processed is described below.

STAGE 0

56F80A494B9A80F8 is first input as an operand and set in the input register 301. 3FF is subtracted from exponents of $2^{62}$ to $2^{52}$ of the output of the input register 301 by means of the exponent constant subtracter 303. In the leading-bit adding circuit 307, as the leading bit, "1" is added to the leading ends of significand parts of $2^{51}$ to $2^0$ of the output of the input register 301. The normalizing circuit 308 outputs the input data after left-shifting it two bit places, if the bit of $2^{52}$ of the output of the input register 301 is "1" while, if the $2^{52}$ is "0", it outputs the input data after left-shifting it three bit places.

STAGE 1

In the first place, first one leading bit of the output of the input register 301 is set in the exception detecting information holding circuit 302_1, the output of the exponent constant subtracter 303, in the exponent holding circuit 306_1 and the output of the normalizing circuit 308, in the normalized operand register 309. An output of the exponent holding circuit 306_1 is right-shifted one bit place by the shifter 304. The table information storing unit 310 is supplied with 13 bits comprised of $2^{55}$ to $2^{43}$ output from the normalized operand register 209, and 0D0DE is output. Further, the bit of $2^{42}$ of the output of the normalized operand register 309 shall be inverted and added as a least significant bit to the above output, however, "1" is added thereto in this embodiment instead. A practical multiplier in the multiplying circuits 313_1 to 313_7 is 0D0DF.

STAGE 2

An output of the exception detecting information holding circuit 302_1 is set in the 302_2, the output of the shifter 304, in the exponent holding circuit 306_2, the output of the normalized operand register 309, in the residue holding circuit 312_2 and the output of the table information storing unit 310, in the table output information holding circuit 311_2. 3FF is added to the output of the exponent holding circuit 206_2 by the exponent constant adder 305 to find a resultant exponent. The multiplying circuit 313_1 carries out a multiplication of 06029252E6A03E0 times 0D0DF, producing a product, 04E75320D19917F6020.

STAGE 3

An output of the exponent constant adder 305 is set in the exponent holding circuit 306_3, nine bits comprised of one bit for sign and eight bits for data and serving as a first partial square root value, in the pre-correction partial square root value holding circuit 314_1, the output of the except detecting information holding circuit 302_2, in the 302_3, the output of the residue holding circuit 312_2, in the 312_3 and the output of the table output information holding circuit 311_2, in the 311_3. The shifter 328_1 left-shifts the output of the residue holding circuit 312_3 eight bit places. An output of the pre-correction partial square root value holding circuit 314_1 is supplied to the inverting circuit 315_1 which bit-inverts the input and adds "0" to a least significant bit for output if two bits in an adjoining relationship at low-order positions of the partial square root value are "11" of if the partial square root is negative, while "1" is added in other cases other than the above. In the multiplicand generator 316_1, the output of the partial square root value holding circuit 314_1 is padded into $2^{55}$ to $2^{48}$, and other bits are output in the form of zero, at the first iteration. The $(R+S \times T+T)$ operation unit 317_1 is supplied with the output of the shifter 328_1, R, the output of the multiplicand generator 316_1, S and the output of the inverting circuit 315_1, T so that it carries out the operation $(R+S \times T+T)$ if "0" has been added to a least significant bit in the inverting circuit 315_1, or the operation $(R+S \times T)$ in other cases other than the above. A carry over is carried out in order that a corresponding bit to the least significant bit of a partial square root goes to the place $2^{48}$ in the $(R+S \times T+T)$ operation unit 317_1, to the place of $2^{40}$ in the 317_2, to the place of $2^{32}$ in the 317_3 and the place of $2^{24}$ in the 317_4, to the place of $2^{16}$ in the 317_5, the place of $2^{8}$ in the 317_6 and the place of $2^{0}$ in the 317_7, thereafter "+T" in $(R+S \times T+T)$ being input into a carry-save adder tree. The $(R+S \times T+T)$ operation unit 317_1 outputs 3E0252E6A03E000. The constant subtracter 318_1 subtracts "1" from LSB of the output of the partial square root value holding circuit 314_1. The constant adder 319_1 adds "1" to LSB of the output of the pre-correction partial square root value holding circuit 314_1. If the output of the partial square root value holding circuit 314_1 is positive and the output of the $(R+S \times T+T)$ operation unit 317_1 is negative, the multiplexer 320_1 selects the output of the constant subtracter 318_1 while, if two bits in an adjoining relationship at low-order positions of the partial square root value are "11" and the output of the $(R+S \times T+T)$ operation unit 317_1 is positive or if the partial square root value is negative and the output of the $(R+S \times T+T)$ operation unit 317_1 is positive, it selects the output of the constant adder 319_1. In other cases other than the above, the output of the partial square root value holding circuit 314_1 is selected. Judging from the above conditions, the output of the partial square root value holding circuit 314_1 is selected in this embodiment.

STAGE 4

An output of the $(R+S \times T+T)$ operation unit 317_1 is set in the residue holding circuit 312_4. The output of the multiplexer 320_1, in the post-correction partial square root value holding circuit 321_4, the output of the exception detecting information holding circuit 302_3, in the 302_4, the output of the exponent holding circuit 306_3, in the 306_4, and the output of the table output information holding circuit 311_3, in the 311_4. 3E0252E6A03E000 of a first residue $R_1$ set in the residue holding circuit 312_4 is multiplied by 0D0DF output from the table output information holding circuit 311_4 by means of the multiplying circuit 313_2, a result of which is 3E6027619917F602000 that is output.

STAGE 5

1E6 of $2^{72}$ to $2^{64}$ of the output of the multiplying circuit 313_2 comprised of one bit for sign and eight bits for data and serving as a second partial value is set in the partial square root value holding circuit 314_2, the output of the exception detecting information holding circuit 302_4, in the 302_5, the output of the exponent holding circuit 306_4, in the 306_5, the output of the residue holding circuit 312_4, in the 312_5, the output of the partial square root value holding circuit 321_4, in the 321_5 and the output of the table output information holding circuit 311_4, in the 311_5. The shifter 328_2 left-shifts the output of the residue holding circuit 312_5 eight bit places. The inverting circuit 315_2 inverts 1E6 to form 019, adds to it "0" as a least significant bit and outputs it. The $(R+S \times T+T)$ operation unit 317_2 carries out an operation in which 019 is taken as an actual multiplier. The multiplicand generator 316_2 left-shifts the output of the partial square root value holding circuit 321_5 one bit place and pads nine bits output from the partial square root value holding circuit 314_2 into $2^{48}$ to $2^{40}$ to output 139E60000000000. Although FIGS. 4 and 5 show 139E70000000000 whose $2^{40}$ bit is "1" to correspond to the output of the multiplicand generator 316_2, it is so designed that a practically like result is led by "+T" in the operation $(R+S \times T+T)$, in the square root operation device as shown in FIGS. 10, 11 and 12. The $(R+S \times T+T)$ operation unit 317_2 is supplied with the output of the shifter 328_2, R, the output of the multiplicand generator 316_2, S and the output of the inverting circuit 315_2, T so that it carries out the operation $(R+S \times T+T)$. The $(R+S \times T+T)$ operation unit 317_2 outputs 2CCBD6A03E00000. The multiplexer 320_2 selects the output of the partial square root value holding circuit 314_2 and outputs it.

STAGE 6

An output of the $(R+S \times T+T)$ operation unit 317_2 is set in the residue holding circuit 312_6, the output of the partial square root value holding circuit 321_5, in the 321_6, the output of the multiplexer 320_2, in the partial square root value holding circuit 322_6, the output of the exception detecting information holding circuit 302_5, in the 302_6, the output of the exponent holding circuit 306_5, in the 306_6, and the output of the table output information holding circuit 311_5, in the 311_6. 2CCBD6A03E00000 of a second residue $R_2$ set in the residue holding circuit 312_6 is multiplied by 0D0DF output from the table output information holding circuit 311_6 by means of the multiplying circuit 313_3, a result of which is 3054E3F227F60200000 that is output.

STAGE 7

105 of $2^{72}$ to $2^{64}$ of the output of the multiplying circuit 313_3 comprised of one bit for sign and eight bits for data and serving as a third partial square root value is set in the partial square root value holding circuit 314_3, the output of the exception detecting information holding circuit 302_6, in the 302_7, the output of the exponent holding circuit 306_6, in the 306_7, the output of the residue holding circuit 312_6, in the 312_7, the output of the partial square root value holding circuit 321_6, in the 321_7, the output of the partial square root value holding circuit 322_6, in the 322_7 and the output of the table output information holding circuit 311_6, in the 311_7. The shifter 328_3 left-shifts the output of the residue holding circuit 312_7 eight bit places. The inverting circuit 315_3 inverts 105 to form 0FA, adds to it "0" as a least significant bit and outputs it. The (R+S×T+T) operation unit 317_3 carries out an operation in which 0FA is taken as an actual multiplier. The multiplicand generator 316_3 left-shifts the outputs of the partial square root value holding circuits 321_7 and 322_7 one bit place and pads nine bits output from the pre-correction partial square root value holding circuit 314_3 into $2^{40}$ to $2^{32}$ to output 139CD0500000000. Although FIGS. 4 and 5 show 139CD0600000000 whose $2^{32}$ bit is added by "1" to correspond to the output of the multiplicand generator 316_3, it is so designed that a practically like result is led by "+T" in the operation (R+S×T+T), in the square root operation device as shown in FIGS. 10, 11 and 12. The (R+S×T+T) operation unit 317_3 is supplied with the output of the shifter 328_3, R, the output of the multiplicand generator 316_3, S and the output of the inverting circuit 315_3, T so that it carries out the operation (R+S×T+T). The (R+S×T+T) operation unit 317_3 outputs 32FA1DFE0000000. The multiplexer 320_3 selects the output of the partial square root value holding circuit 314_3 and outputs it.

STAGE 8

An output of the (R+S×T+T) operation unit 317_3 is set in the residue holding circuit 312_8, the output of the partial square root value holding circuit 321_7, in the 321_8, the output of the square root value holding circuit 322_7, in the 322_8, the output of the multiplexer 320_3, in the partial square root value holding circuit 323_8, the output of the exception detecting information holding circuit 302_7, in the 302_8, the output of the exponent holding circuit 306_7, in the 306_8, and the output of the table output information holding circuit 311_7, in the 311_8. 32FA1DFE0000000 of a third residue $R_3$ set in the residue holding circuit 312_8 is multiplied by 0D0DF output from the table output information holding circuit 311_8 by means of the multiplying circuit 313_4, a result of which is 355FE03E80420000000 that is output.

STAGE 9

155 of $2^{72}$ to $2^{64}$ of the output of the multiplying circuit 313_4 comprised of one bit of sign and eight bits for data and serving as a fourth partial square root value is set in the partial square root value holding circuit 314_4, the output of the exception detecting information holding circuit 302_8, in the 302_9, the output of the exponent holding circuit 306_8, in the 306_9, the output of the residue holding circuit 312_8, in the 312_9, the output of the partial square root value holding circuit 321_8, in the 321_9, the output of the partial square root value holding circuit 322_8, in the 322_9, the output of the partial square root value holding circuit 323_8, in the 323_9 and the output of the table output information holding circuit 311_8, in the 311_9. The shifter 328_4 left-shifts the output of the residue holding circuit 312_9 eight bit places. The inverting circuit 315_4 inverts 155 to form 0AA, adds to it "0" as a least significant bit and outputs it. The (R+S×T+T) operation unit 317_4 carries out an operation in which 0AA is taken as an actual multiplier. The multiplicand generator 316_4 left-shifts the outputs of the partial square root value holding circuits 321_9, 322_9 and 323_9 one bit place and pads nine bits output from the pre-correction partial square root value holding circuit 314_4 into $2^{32}$ to $2^{24}$ to output 139CC0B55000000. Although FIGS. 4 and 5 show 139CC0B56000000 whose $2^{24}$ bit is added by "1" to correspond to the output of the multiplicand generator 316_4, it is so designed that a practically like result is led by "+T" in the operation (R+S×T+T), in the square root operation device as shown in FIGS. 10, 11 and 12. The (R+S×T+T) operation unit 317_4 is supplied with the output of the shifter 328_4, R, the output of the multiplicand generator 316_4, S and the output of the inverting circuit 315_4, T so that it carries out the operation (R+S×T+T). The (R+S×T+T) operation unit 317_4 outputs 0035F671C000000. The multiplexer 320_4 selects the output of the constant adder 319_4 and outputs it.

STAGE 10

An output of the (R+S×T+T) operation unit 317_4 is set in the residue holding circuit 312_10, the output of the partial square root value holding circuit 321_9, in the 321_10, the output of the partial square root value holding circuit 322_9, in the 322_10, the output of the partial square root value holding circuit 323_9, in the 323_10, the output of the multiplexer 320_4, in the partial square root value holding circuit 324_10, the output of the exception detecting information holding circuit 302_9, in the 302_10, the output of the exponent holding circuit 306_9, in the 306_10 and the output of the table output information holding circuit 311_9, in the 311_10. 0035F671C000000 of a fourth residue $R_4$ set in the residue holding circuit 312_10 is multiplied by 0D0DF output from the table output information holding circuit 311_10 by means of the multiplying circuit 313_5, a result of which is 002C073E191640000000 that is output.

STAGE 11

002 of $2^{72}$ to $2^{64}$ of the output of the multiplying circuit 313_5 comprised of one bit for sign and eight bits for data and serving as a fifth partial value is set in the partial square root value holding circuit 314_5, the output of the exception detecting information holding circuit 302_10, in the 302_11, the output of the exponent holding circuit 306_10, in the 306_11, the output of the residue holding circuit 312_10, in the 312_11, the output of the partial square root value holding circuit 321_10, in the 321_11, the output of the partial square root value holding circuit 322_10, in the 322_11, the output of the partial square root value holding circuit 323_10, in the 323_11, the output of the partial square root value holding circuit 324_10, in the 324_11 and the output of the table output information holding circuit 311_10, in the 311_11. The shifter 328_5 left-shifts the output of the residue holding circuit 312_11 eight bit places. The inverting circuit 315_5 inverts 022 to form 1FD, adds to it "0" as a least significant bit and outputs it. The (R+S×T+T) operation unit 317_5 carries out an operation in which 1FD is taken as an actual multiplier. The multiplicand generator 316_5 left-shifts the outputs of the partial square root value holding circuits 321_11, 322_11, 323_11 and 324_11 one bit place and pads nine bits output from the pre-correction partial square root value holding circuit 314_5 into $2^{24}$ to $2^{16}$ to output 139CC0AAC020000. Although FIGS. 4 and 5 show 139CC0AAC030000 whose $2^{16}$ bit is "1" to correspond to the output of the multiplicand generator 316_5, it is so designed that a practically like result is led by "+T" in the operation (R+S×T+T), in the square root operation device as shown in FIGS. 10, 11 and 12. The (R+S×T+T) operation unit 317_5 is supplied with the output of the shifter 3278_5, R, the output of the multiplicand generator 316_5, S and the output of the inverting circuit 315_5, T so that it carries out the operation (R+S×T+T). The (R+S×T+T) operation unit 317_5 outputs 3B202FBFBF70000. The multiplexer 320_5 selects the output of the pre-correction partial square root value holding circuit 314_5 and outputs it.

STAGE 12

An output of the (R+S×T+T) operation unit 317_5 is set in the residue holding circuit 312_12, the output of the partial square root value holding circuit 321_11, in the 321_12, the output of the partial square root value holding circuit 322_11, in the 322_12, the output of the partial square root value holding circuit 323_11, in the 323_12, the output of the partial square root value holding circuit 324_11, in the 324_12, the output of the multiplexer 320_5, in the partial square root value holding circuit 325_12, the output of the exception detecting information holding circuit 302_11, in the 302_12, the output of the exponent holding circuit 306_11, in the 306_12 and the output of the table output information holding circuit 311_11, in the 311_12. 3B202FBFBF70000 of a fifth residue $R_5$ set in the residue holding circuit 312_12 is multiplied by 0D0DF output from the table output information holding circuit 311_12 by means of the multiplying circuit 313_6, a result of which is 3C05E7D56392C290000 that is output.

STAGE 13

1C0 of $2^{72}$ to $2^{64}$ of the output the multiplying circuit 313_6 comprised of one bit for sign and eight bits for data and serving as a sixth partial value is set in the partial square root value holding circuit 314_6, the output of the exception detecting information holding circuit 302_12, in the 302_13, the output of the exponent holding circuit 306_12, in the 306_13, the output of the residue holding circuit 312_12, in the 312_13, the output of the partial square root value holding circuit 321_12, in the 321_13, the output of the partial square root value holding circuit 322_12, in the 322_13, the output of the partial square root value holding circuit 323_12, in the 323_13, the output of the partial square root value holding circuit 324_12, in the 324_13, the output of the partial square root value holding circuit 325_12, in the 325_13 and the output of the table output information holding circuit 311_12, in the 311_13. The shifter 328_6 left-shifts the output of the residue holding circuit 312_13 eight bit places. The inverting circuit 315_6 inverts 1C0 to for 03F, adds to it "0" as a least significant bit and outputs it, The (R+S×T+T) operation unit 317_6 carries out an operation in which 03F is taken as an actual multiplier. The multiplicand generator 316_6 left-shifts the outputs of the partial square root value holding circuits 321_13, 322_13, 323_13, 324_13 and 325_13 one bit place and pads nine bits output from the pre-correction partial square root value holding circuit 314_6 into $2^{16}$ to $2^8$ to output 139CC0AAC05000. Although FIGS. 4 and 5 show 139CC0AAC05C100 whose $2^8$ bit is "1" to correspond to the output of the multiplicand generator 316_6, it is so designed that a practically like result is led by "+T" in the operation (R+S×T+T), in the square root operation device as shown in FIGS. 10, 11 and 12. The (R+S×T+T) operation unit 317_6 is supplied with the output of the shifter 328_6, R, the output of the multiplicand generator 316_6, S, and the output of the inverting circuit 315_6, T so that it carries out the operation (R+S×T+T). The (R+S×T+T) operation unit 317_6 outputs 33C329C4C6A7F00. The multiplexer 320_6 selects the output of the pre-correction partial square root value holding circuit 314_6 and outputs it.

STAGE 14

An output of the (R+S×T+T) operation unit 317_6 is set in the residue holding circuit 312_14, the output of the partial square root value holding circuit 321_13, in the 321_14, the output of the partial square root value holding circuit 322_13, in the 322_14, the output of the partial square root value holding circuit 323_13, in the 323_14, the output of the partial square root value holding circuit 324_13, in the 324_14, the output of the partial square root value holding circuit 325_13, in the 325_14, the output of the multiplexer 320_6, in the partial square root value holding circuit 326_14, the output of the exception detecting information holding circuit 302_13, in the 302_14, the output of the exponent holding circuit 306_13, in the 306_14 and the output of the table output information holding circuit 311_13, in the 311_14. 33C329C4C6A7F00 of a sixth residue $R_6$ set in the residue holding circuit 312_14 is multiplied by 0D0DF output from the table output information holding circuit 311_14 by means of the multiplying circuit 313_7, a result of which is 3603E8F143D17F4A100 that is output.

STAGE 15

160 of $2^{72}$ to $2^{64}$ of the output the multiplying circuit 313_7 comprised of one bit for sign and eight bits for data and serving as a seventh partial square root value is set in the partial square root value holding circuit 314_7, the output of the exception detecting information holding circuit 302_14, in the 302_15, the output of the exponent holding circuit 316_14, in the 306_15, the output of the residue holding circuit 312_14, in the 312_15, the output of the partial square root value holding circuit 321_14, in the 321_15, the output of the partial square root value holding circuit 322_14, in the 322_15, the output of the partial square root value holding circuit 323_14, in the 323_15, the output of the partial square root value holding circuit 324_14, in the 324_15, the output of the partial square root value holding circuit 325_14, in the 325_15, the output of the partial square root value holding circuit 326_14, in the 326_15 and the output of the table output information holding circuit 311_14, in the 311_15. The shifter 328_7 left-shifts the output of the residue holding circuit 312_15 eight bit places. The inverting circuit 315_7 inverts 160 to form 09F, adds to it "0" as a least significant bit and outputs it. The (R+S×T+T) operation unit 317_7 carries out an operation in which 09F is taken as an actual multiplier. The multiplicand generator 316_7 left-shifts the outputs of the partial square root value holding circuits 321_15, 322_15, 323_15, 324_15, 325_15 and 326_15 one bit place and pads nine bits output from the pre-correction partial square root value holding circuit 314_7 into $2^8$ to $2^0$ to output 139CC0AAC058160. Although FIGS. 4 and 5 show 139CC0AAC058161 whose $2^0$ bit is "1" to correspond to the output of the multiplicand generator 316_7, it is so designed that a practically like result is led by "+T" in the operation (R+S×T+T), in the square root operation device as shown in FIGS. 10, 11 and 12. The (R+S×T+T) operation unit 317_7 is supplied with the output of the shifter 328_7, R, the output of the multiplicand generator 316_7, S and the output of the inverting circuit 315_7, T so that it carries out the operation (R+S×T+T). The (R+S×T+T) operation unit 317_7 outputs 31856ED41EA5B3F. The multiplexer 320_7 selects the output of the pre-correction partial square root value holding circuit 314_7 and outputs it.

STAGE 16

An output of the (R+S×T+T) operation unit 317_7 is set in the residue holding circuit 312_16, the output of the partial square root value holding circuit 321_15, in the 321_16, the output of the partial square root value holding circuit 322_15, in the 322_16, the output of the partial square root value holding circuit 323_15, in the 323_16, the output of the partial square root value holding circuit 324_15, in the 324_16, the output of the partial square root value holding circuit 325_15, in the 325_16, the output of the partial square root value holding circuit 326_15, in the 326_16, the output of the multiplexer 320_7, in the partial square root value holding circuit 327_16, the output of the exception detecting information holding circuit 302_15, in the 302_16 and the output of the exponent holding circuit 306_15, in the 306_16. The exception detector 329 carries out a positive-negative check for input operands so that it detects a data exception if the operand is negative. In the case of any exception taking place, an external instruction executing control unit, connected to the floating-point vector square root operation device, is alerted the exception detector 329. For the numeric values used here, the operand is positive. No data exceptions are detected, accordingly.

As a final result, 46739CC0AAC0580C is output from the vector square root operation device as shown in FIGS. 10, 11 and 12, which is obtained by batching "0" as a sign bit for $2^{63}$, 11 bits output by the exponent holding circuit 306_16 as exponent parts for $2^{62}$ to $2^{52}$, and seven low-order bits of the partial square root value circuit 321_16, 40 bits of the partial square root value circuits 322_16 to 326_16, and 5 high-order bits of the output of the partial square root value holding circuit 327_16, as significand parts for $2^{51}$ to $2^0$.

SEVENTH EMBODIMENT

Figure 13:
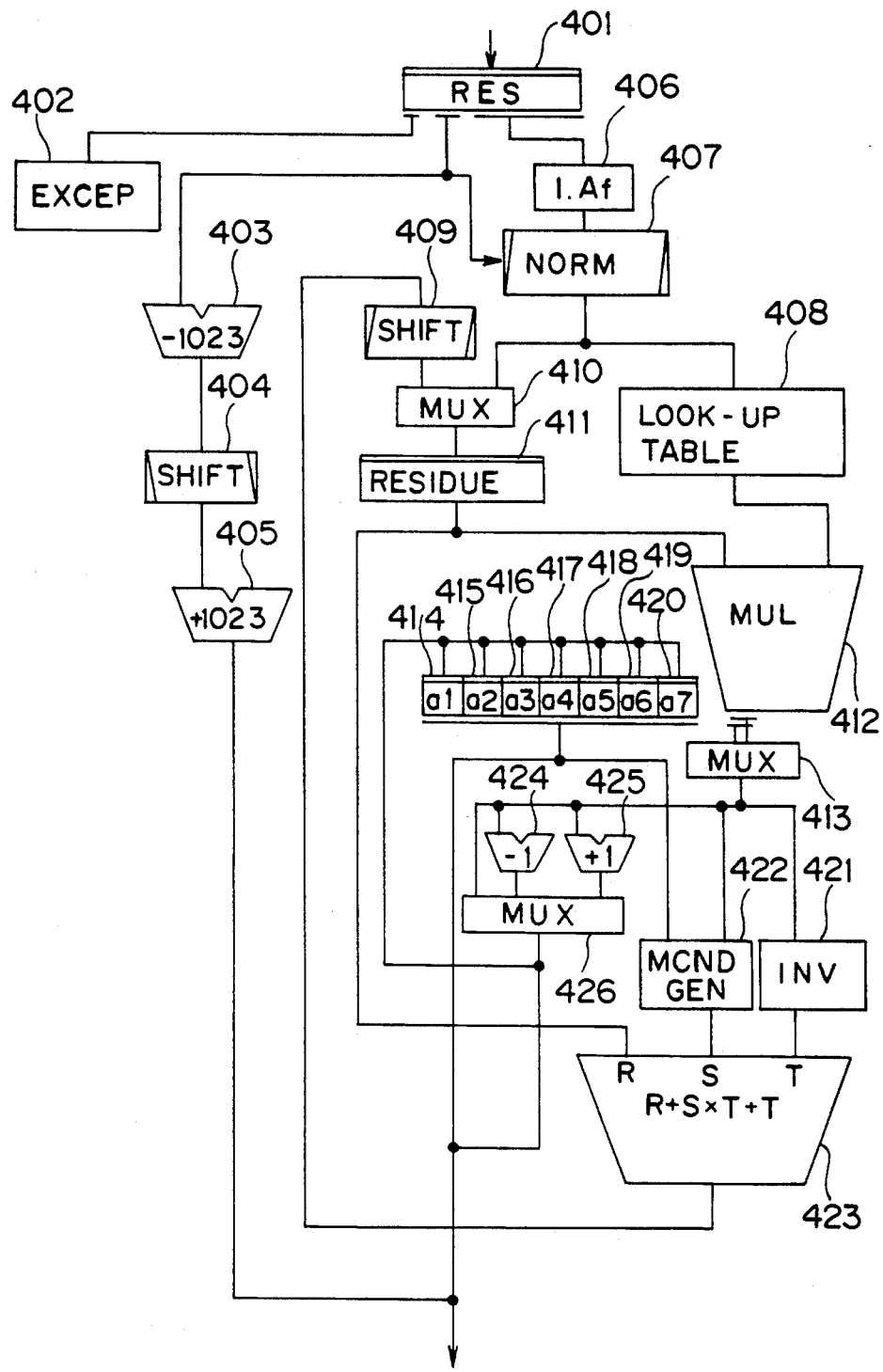
FIG. 13 is a block diagram showing a floating-point square root operation device of a seventh embodiment of the present invention.

FIG. 13 is a block diagram of a floating-point square root operation device in accordance with a seventh embodiment of the invention. An IEEE standard double-precision floating-point number is input into the floating-point square root operation device of this embodiment which outputs the square root of such a double-precision floating-point number. wherein a bit length as being data for a partial square root value is "8" and there is no overlap between partial square root values. FIG. 13 shows each of construction elements of this embodiment, wherein the reference numeral 401 denotes an input register; 402, an exception detector; 403, an exponent constant subtracter; 404, a shifter; 405, an exponent constant adder; 406, a leading-bit adding circuit; 407, a normalizing circuit; 408, a table information storing unit; 409, a shifter; 410, a multiplexer; 411, a residue holding circuit; 412, a multiplying circuit; 413, a multiplexer; 414 to 420, partial square root value holding circuits; 421, an inverting circuit; 422, a multiplicand generator; 423, a (R+S×T+T) operation unit; 424, a constant subtracter; 425, a constant adder, and 426, a multiplexer.

The operation of the floating-point square root operation device as shown in FIG. 13 will be described using specific numeric values below. FIGS. 14 and 15 show a process in which an operand input is processed at each means. 56F80A494B9A80F8 is first input as an operand and set in the input register 401. The exception detector 402 carries out a positive-negative check for input operands so that it detects a data exception if the operand is negative. In the case of any data exception occurring, an external instruction executing control unit, connected to the floating-point square root operation device, is alerted, accordingly. For the numeric values used here, the operand is positive (this precondition will be left out below). No data exceptions are detected, accordingly. 3FF is subtracted out of exponents of $2^{62}$ to $2^{52}$ of the output of the input register 401 by means of the exponent constant subtracter 403. Then the exponents are right-shifted one bit place by the shifter 404 and added 3FF again by the exponent constant adder 405. Accordingly, resultant exponents are found. In the leading-bit adding circuit 406, as a leading bit, "1" is added to the leading ends of significand parts of $2^{51}$ to $2^0$ of the output of the input register 401. The normalizing circuit 407, if the bit of $2^{52}$ of the output of the input register 401 is "1", outputs the output after left-shifting it 12 bit places while it, if the $2^{52}$ bits is "0", outputs the input after left-shifting it 13 bit places. The table information storing unit 408 is supplied with 13 bits comprised of $2^{65}$ to $2^{53}$ of the normalizing circuit 407, and 0D0DE is output. The bit of $2^{42}$ of the normalizing circuit 407 shall be inverted and added as a least significant bit to the above output, however, "1" is added thereto in this embodiment instead. A practical multiplier in the multiplying circuit 412 is 0D0DF. The multiplexer 410 selects the output of the normalizing circuit 407. The output thus selected is set in the residue holding circuit 411, at which point in time the partial square root value holding circuits 414 to 420 are reset to zero. In the multiplying circuit 412, a multiplication of 06029252E6A03E000 times 0D0DF is carried out, and a product, 04E75320D19917F602000 is obtained. The multiplexer 413 selects nine bits comprised of $2^{79}$ to $2^{71}$ of the multiplying circuit 412, the nine bit thus selected serving as a first partial square root value comprised of one bit for sign and eight bits for data. The partial square root value is supplied to the inverting circuit 421 which bit-inverts such an input and adds "0" to a least significant bit for output if two bits in an adjoining relationship at low-order positions of the partial square root value are "11" or if the partial square root is negative, while "1" is added to a least significant bit in other cases other than the above. In the multiplicand generator 422, eight bits for data, excluding a sign bit, of the output of the multiplexer 413 are padded into $2^{55}$ to $2^{48}$, and other bits are output in the form of zero, at the first iteration. The (R+S×T+T) operation unit 423 is supplied with the output of the residue holding circuit 411, the multiplicand generator 422 and the inverting circuit 421 and takes these outputs as R, S and T respectively. The (R+S×T+T) operation unit 423 carries out the operation (R+S×T+T) if "0" has been added to a least significant bit in the inverting circuit 421, while it carries out the operation (R+S×T) in other cases other than the above. A carry over is carried out in order that a corresponding bit to the least significant bit of a partial square root goes to the place of $2^{48}$ at the first iteration, to the place of $2^{40}$ at the second iteration, to the place of $2^{32}$ at the third iteration, to the place of $2^{24}$ at the fourth iteration, to the place of $2^{16}$ at the fifth iteration, to the place of $2^{8}$ at the sixth iteration and to the place of $2^{0}$ at the seventh iteration, thereafter "+T" in $(R+S\times T+T)$ being input into a carry-save adder tree. 3FFE0252E6A3E000 output from the $(R+S\times T+T)$ operation unit 423 is left-shifted eight bit places by the shifter 409, selected by the multiplexer 410 and set in the residue holding circuit 411. The constant subtracter 424 subtracts "1" from LSB of the output of the multiplexer 413. The constant adder 425 adds "1" to LSB of the output of the multiplexer 413. If the output of the multiplexer 413 is positive and the output of the $(R+S\times T+T)$ operation unit 423 is negative, the multiplexer 426 selects the output of the constant subtracter 424 while, if two bits in an adjoining relationship at low-order positions of the partial square root value are "11" and the output of the $(R+S\times T+T)$ operation unit 423 is positive, or if the partial square root value is negative, it selects the output of the constant adder 425. In other cases other than the above, the multiplexer 426 selects the output of the multiplexer 413. judging from the above conditions, the output of the multiplexer 413 is selected at the first iteration. An output of the multiplexer 426 is set in the partial square root value holding circuit 414.

A second iterative computation begins. The output of the table information storing unit 408 is the same as the first iterative computation and will stay unchanged at subsequent iterative computations. 3E0252E6A0-3E00000 of a first residue $R_1$ set in the residue holding circuit 411 is multiplied by 0D0DF by the multiplying circuit 412, a result of which is 3E6027619917F60200000 that is output. 1E6 of $2^{80}$ to $2^{72}$ is selected by the multiplexer 413 as a second partial square root value comprised of one bit for sign and eight bits for data. The inverting circuit 421 inverts 1E6 to form 019, adds to it "0" as a least significant bit and outputs it. The $(R+S\times T+T)$ operation unit 423 carries out an operation in which 019 is taken as an actual multiplier. The multiplicand generator 422 left-shifts the outputs of the partial square root value holding circuits 414 to 420 one bit place and pads nine bits output from the multiplexer 413 into $2^{48}$ to $2^{40}$ to output 139E60000000000. Although FIGS. 14 and 15 show 139E70000000000 whose $2^{40}$ bit is "1" to correspond to the output of the multiplicand generator 422, it is so designed that a practically like result is led by "+T" in the operation $(R+S\times T+T)$, in the square root operation device as shown in FIG. 13. The $(R+S\times T+T)$ operation unit 423 is supplied with the output of the residue holding circuit 411, the multiplicand generator 422 and the inverting circuit 421 and takes these outputs as R, S and T respectively, the operation $(R+S\times T+T)$ being carried out. 3FECCBD6A03E00000 output from the $(R+S\times T+T)$ operation unit 423 is left-shifted eight bit places, selected by the multiplexer 410 and set in the residue holding circuit 411. The multiplexer 426 selects the output of the multiplexer 413 and outputs it. In the partial square root value holding circuit 415, the output of the multiplexer 426 is set.

Next, a third iterative computation commences. The output of the table information storing unit 408 still remains the same as the first iterative computation. 2CCBD6A03E0000000 of a second residue $R_2$ set in the residue holding circuit 411 is multiplied by 0D0DF by means of the multiplying circuit 412, a result of which is 3054E3F227F6020000000 that is output. 105 of $2^{80}$ to $2^{72}$ is selected by the multiplexer 413 as a third partial square root value comprised of one bit for sign and eight bits for data. The inverting circuit 421 inverts 105 to form 0FA, adds to it "0" as a least significant bit and outputs it. In the $(R+S\times T+T)$ operation unit 423, an operation is carried out in which 0FA is taken as an actual multiplier. The multiplicand generator 422 left-shifts the outputs of the partial square root value holding circuits 414 to 420 one bit place and pads nine bits output from the multiplexer 413 into $2^{40}$ to $2^{32}$ to output 139CD0500000000. Although FIGS. 14 and 15 show 139CD0600000000 whose $2^{32}$ bit is added by "1" to correspond to the output of the multiplicand generator 422, it is so designed that a practically like result is led by "+T" in the operation $(R+S\times T+T)$, in the square root operation device as shown in FIG. 13. The $(R+S\times T+T)$ operation unit 423 is supplied with the outputs of the residue holding circuit 411, the multiplicand generator 422 and the inverting circuit 411, the multiplicand generator 422 and the inverting circuit 421 and carries out the operation $(R+S\times T+T)$, taking these outputs as R, S and T respectively. 3FF2FA1D-FE0000000 output from the $(R+S\times T+T)$ operation unit 423 is left-shifted by the shifter 409, selected by the multiplexer 410 and st in the residue holding circuit 411. The multiplexer 426 selects the output of the multiplexer 413 and outputs it. In the partial square root value holding circuit 416, the output of the multiplexer 426 is set.

A fourth iterative computation begins. The output of the table information storing unit 408 still remains the same as the first iterative computation. 32FA1D-FE000000000 of a third residue $R_3$ set in the residue holding circuit 411 is multiplied by 0D0DF by means of the multiplying circuit 412. a result of which is 355FE0-3E8042000000000 that is output. 155 of $2^{80}$ to $2^{72}$ is selected by the multiplexer 413 as a fourth partial square root value comprised of one bit for sign and eight bits for data. The inverting circuit 421 inverts 155 to form 0AA, adds to it "0" as a least significant bit and outputs it. The $(R+S\times T+T)$ operation unit 423 carries out an operation wherein 0AA is taken as an actual multiplier. The multiplicand generator 422 left-shifts the outputs of the partial square root value holding circuit 414 to 420 one bit place and pads nine bits output from the multiplexer 413 into $2^{32}$ to $2^{24}$ to output 139CC0B55000000. FIGS. 14 and 15 show 139CC0B56000000 whose $2^{24}$ bit is added by "1" to correspond to the output of the multiplicand generator 422, however, it is so designed that a practically like result is led by "+T" in the operation $(R+S\times T+T)$, in the square root operation device as shown in FIG. 13. The $(R+S\times T+T)$ operation unit 423 is supplied with the outputs of the residue holding circuit 411, the multiplicand generator 422 and the inverting circuit 521 and carries out, taking these outputs as R, S and T respectively, the operations $(R+S\times T+T)$. The $(R+S\times T+T)$ operation unit 423 outputs 000035F571C000000 which is left-shifted eight bit places by the shifter 409. selected by the multiplexer 411 and set in the residue holding circuit 411. The multiplexer 426 selects the output of the constant adder 425 and outputs it. In the partial square root value holding circuit 417, the output of the multiplexer 426 is set.

Next, a fifth iterative computation starts. The output of the table information storing unit 408 still remains unchanged (i.e., is the same as the first iterative computation). 0035F671C00000000 of a fourth residue $R_4$ set in the residue holding circuit 411 is multiplied by 0D0DF by means of the multiplying circuit 412, a result of which is 002C073E1916400000000 that is output. 002 of $2^{80}$ to $2^{72}$ is selected by the multiplexer 413 as a fifth partial square root value comprised of one bit for sign and eight bits for data. The inverting circuit 421 inverts 002 to form 1FD, adds to it '0" as a least significant bit and outputs it. The $(R+S\times T+T)$ operation unit 423 carries out an operation wherein 1FD is taken as an actual multiplier. The multiplicand generator 422 left-shifts the outputs of the partial square root value holding circuits 414 to 420 one bit place and pads nine bits output from the multiplexer 413 into $2^{24}$ to $2^{16}$ to output 139CC0AAC020000. FIGS. 14 and 15 show 139CC0AAC030000 whose $2^{16}$ bit is "1" to correspond to the output of the multiplicand generator 422, however, it is so designed that a practically like result is led by "+T" in the operation $(R+S\times T+T)$, in the square root operation device as shown in FIG. 13. The $(R+S\times T+T)$ operation unit 423 is supplied with the outputs of the residue holding circuit 411, the multiplicand generator 422 and the inverting circuit 421 and carries out, taking these outputs as R, S and T respectively, the operation $(R+S\times T+T)$. 3FFB202FBFBF70000 output from the $(R+S\times T+T)$ operation unit 423 is left-shifted eight bit places by the shifter 409, selected by the multiplexer 410 and set in the residue holding circuit 411. The multiplexer 426 selects the output of the multiplexer 413 and outputs it. The partial square root value holding circuit 418, the output of the multiplexer 426 is set.

Next, a sixth iterative computation starts. The output of the table information storing unit 408 still remains unchanged (i.e., is the same as the first iterative computation). 3B202FBFBF7000000 of a fifth residue $R_5$ set in the residue holding circuit 411 is multiplied by 0D0DF by means of the multiplying circuit 412, a result of which is 3C05E7D56392C29000000 that is output. 1C0 of $2^{80}$ to $2^{72}$ is selected by the multiplexer 413 as a sixth partial square root value comprised of one bit for sign and eight bits for data. The inverting circuit 421 inverts 1C0 to form 03F, adds to it "0" as a least significant bit and outputs it. The $(R+S\times T+T)$ operation unit 423 carries out an operation wherein 03F is taken as an actual multiplier. The multiplicand generator 422 left-shifts the outputs of the partial square root value holding circuits 414 to 420 one bit place and pads nine bits output from the multiplexer 413 into $2^{16}$ to $2^{8}$ to output 139CC0AAC05C000. FIGS. 14 and 15 show 139CC0AAC05C100 whose $2^{8}$ bit is "1" to correspond to the output of the multiplicand generator 422, however, it is so designed that a practically like result is led by "+T" in the operation $(R+S\times T+T)$, the square root operation device as shown in FIG. 13. The $(R+S\times T+T)$ operation unit 423 is supplied with the outputs of the residue holding circuit 411, the multiplicand generator 422 and the inverting circuit 421 and carries out, taken these outputs as R, S and T respectively, the operation $(R+S\times T+T)$. 3FF3C329C4C6A7F00 output from the $(R+S\times T+T)$ operation unit 423 is shifted eight bit places to the left by the shifter 409, selected by the multiplexer 410 and st in the residue holding circuit 411. The multiplexer 426 selects the output of the multiplexer 413, outputting it.

In the partial square root value holding circuit 419, the output of the multiplexer 426 is set.

Finally, a seventh iterative computation starts. The output of the table information storing unit 408 still remains unchanged (i.e., is the same as the first iterative computation). 33C329C4C6A7F0000 of a sixth residue $R_6$ set in the residue holding circuit 411 is multiplied by 0D0DF by means of the multiplying circuit 412, as a result of which is 3603E8F143D17F4A10000 that is output. 160 of $2^{80}$ to $2^{72}$ is selected by the multiplexer 413 as a seventh partial square root value comprised of one bit for sign and eight bits for data. The inverting circuit 421 inverts 160 to form 09F, adds to it "0" as a least significant bit and outputs it. The $(R+S\times T+T)$ operation unit 423 carries out an operation wherein 09F is taken as an actual multiplier. The multiplicand generator 422 left-shifts the outputs of the partial square root value holding circuits 414 to 420 one bit place and pads nine bits output from the multiplexer 413 into $2^{8}$ to $2^{0}$ to output 139CC0AAC058160. FIGS. 14 and 15 show 139CC0AAC058161 whose $2^{0}$ bit is "1" to correspond to the output of the multiplicand generator 422, however, it is so designed that a practically like result is led by "+T" in the operation $(R+S\times T+T)$, in the square root operation device as shown in FIG. 13. The $(R+S\times T+T)$ operation unit 423 is supplied with the outputs of the residue holding circuit 411, the multiplicand generator 422 and the inverting circuit 421 and carries out, taking these outputs as R, S and T respectively, the operation $(R+S\times T+T)$. 3FF1856ED4-1EA5B3F output from the $(R+S\times T+T)$ operation unit 423 is left-shifted by the shifter 409 eight bit places, selected by the multiplexer 410 and set in the residue holding circuit 411. The multiplexer 426 selects the output of the multiplexer 413, outputting it. In the partial square root value holding circuit 420, the output of the multiplexer 426 is set.

As a final result, 46739CC0AAC0580C is output from the square root operation device of FIG. 13, which is obtained by batching "0" as a sign bit for $2^{63}$, 11 bits output by the exponent constant adder 405 as exponent parts for $2^{62}$ to $2^{52}$, and seven low-order bits of the partial square root value circuit 414, 40 bits of the partial square root value circuits 415 to 419, and 5 high-order bits of the output of the multiplexer 426, as significand parts for $2^{51}$ to $2^{0}$.

EIGHTH EMBODIMENT

Figure 16:
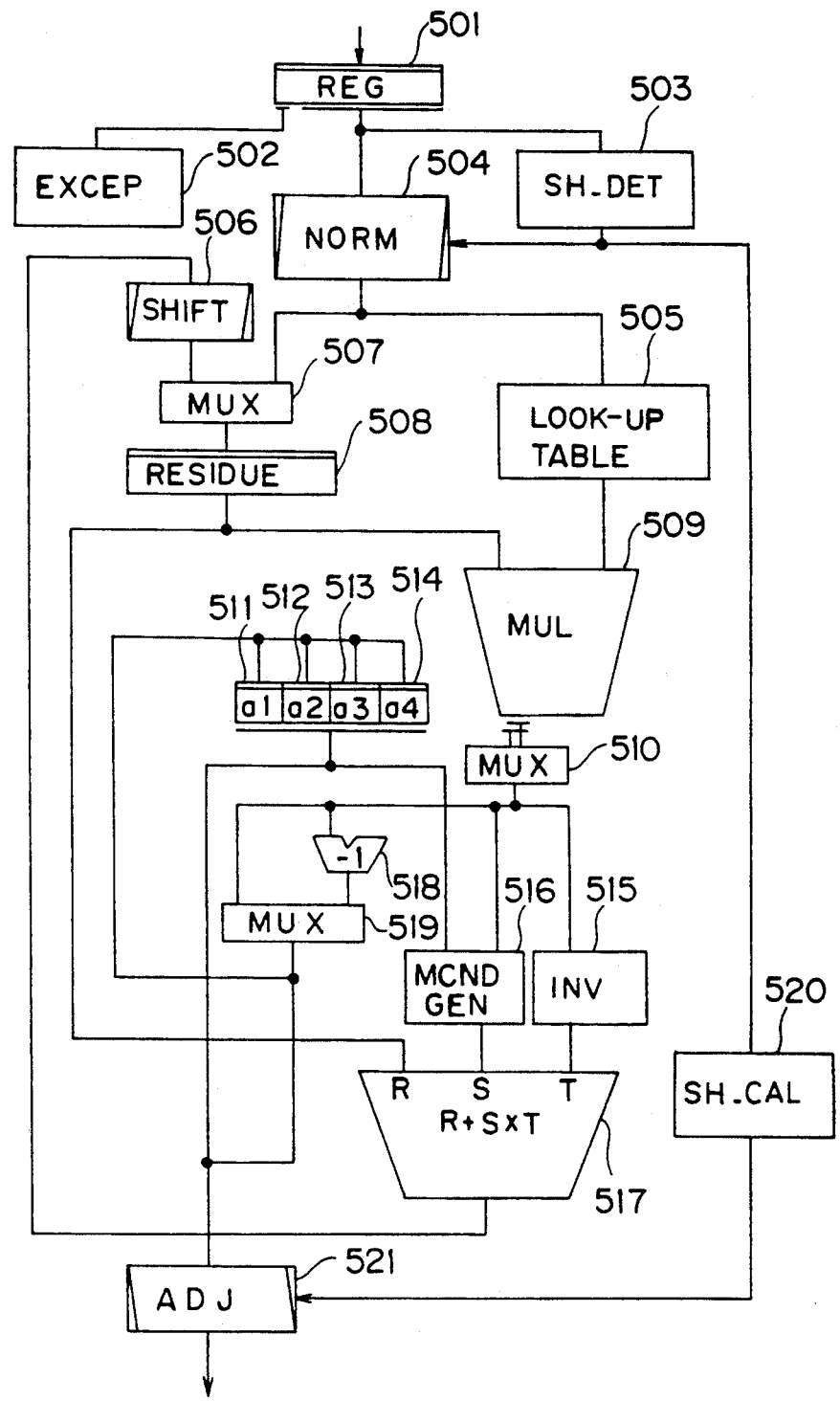
FIG. 16 is a block diagram of a fixed-point square root operation device of an eighth embodiment of the present invention.

FIG. 16 is a block diagram of a fixed-point square root operation device in accordance with an eighth embodiment of the present invention. The fixed-point square root operation device of this embodiment is supplied with a 64-bit fixed-point number in 2's complement notation and outputs a 32-bit square root in 2's complement notation wherein a bit length as being data for a partial square root value is "8" and there is no overlap between partial square root values. In FIG. 16, the reference numeral 501 denotes an input register; 502, an exception detector; 503, a normalization shift count detector; 504, a normalizing circuit; 505, a table information storing unit; 506, a shifter; 507, a multiplexer; 508, a residue holding circuit; 509, a multiplying circuit; 510, a multiplexer; 511 to 514, partial square root value holding circuits; 515, an inverting circuit; 516, a multiplicand generator; 517, a $(R+S\times T)$ operation unit; 518, a constant subtracter; 519, a multiplexer; 520, a digit adjustment shift count calculator; and 521, a digit adjustor.

The operation of the fixed-point square root operation device as shown in FIG. 16 will be described using specific numeric values. FIG. 18 show a process through which an operand input is processed at each means. First, an operand, that is, 10DF854CED-1AA07D is input and set in the input register 501. The exception detector 502 carries out a check for operands, which detects a data exception if first two leading bits of the input operand are "10" or "11" while it detects an overflow exception if the two bits are "01". When there occurs an exception, the exception detector 502 will alert an external instruction executing control unit connected to the fixed-point square root operation device. For the numeric values used in this embodiment, no data exceptions are detected (this precondition will be left out below). The normalization shift count detector 503 detects the number of shifts necessary for carrying out 2-bit normalization, outputting "2". The normalizing circuit 504 receives from the normalization shift count detector 503 an instruction (i.e., the number of shifts=2) and then left-shifts the input data two bit places to output 437E1533B46A81F4. Input into the table information storing unit 505 are 13 bits comprised of $2^{63}$ to $2^{51}$ of the normalizing circuit 504, and 0F96B is output. The bit of $2^{50}$ of the normalizing circuit 504 shall be inverted and added as a least significant bit to this output, however, "0" is added thereto in this embodiment instead. A practical multiplier in the multiplying circuit 509 is 0F96B. The multiplexer 507 selects the output of the normalizing circuit 504 with the addition of a 4-bit zero to its leading end. The output thus selected is set in the residue holding circuit 508, at which point in time the partial square root value holding circuits 511 to 514 are reset to zero. In the multiplying circuit 509, 0437E1533B46A81F4 is multiplied by 0F96B, and a product, 041C1D852271800EAA4FC is found.

Figure 17:
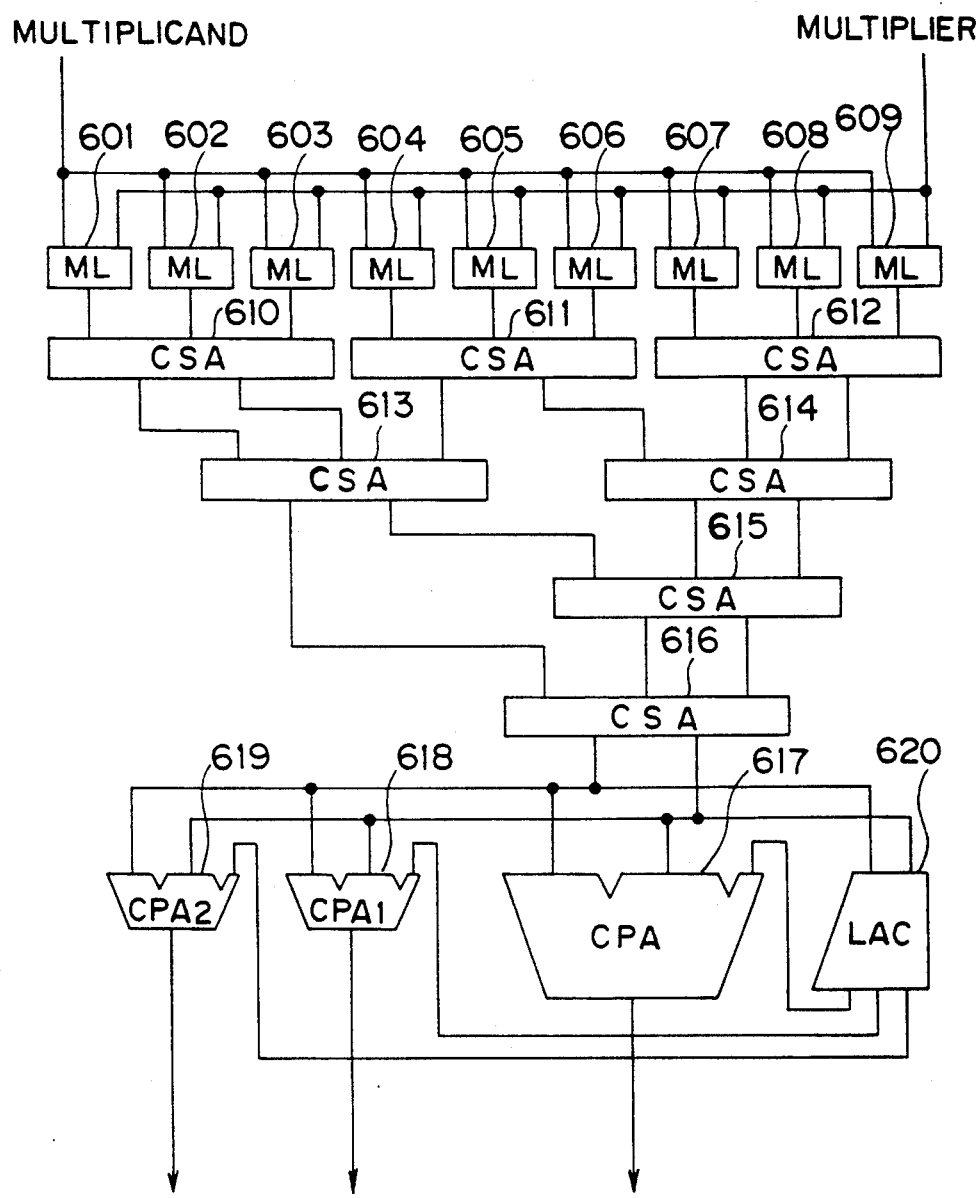
FIG. 17 is an internal block diagram of a multiplying circuit in FIG. 16.

FIG. 17 is an internal block diagram of the multiplying circuit 509 which incorporates a partial square root value adder for carrying out a rounding off at a place lower than the least significant bit of a partial square root value by one bit. In the figure, the reference numerals 601 to 609 are multiple generators (MLs); 610 to 616, carry-save adders (CSAs); 617, a carry-propagate adder (CPA); 618 and 619, partial square root value calculation adder (CPA1 and CPA2); and 620, a lookahead carry portion (LAC). The multiple generators 601 to 609 are individually supplied with a multiplicand as well as a multiplier comprised of 3 bits of which one bit is overlapped with an adjacent multiple generator, outputting a multiple of the multiplicand as shown in Table. As shown in FIG. 17, the outputs of the MLs 601 to 608 are input into the CSAs 610 to 612 respectively for the execution of carry-save addition, thereafter being finally arranged into two, namely a partial carry over and a partial sum by means of the CSAs 613 to 616. The its of $2^{83}$ to $2^0$, $2^{79}$ to $2^{71}$ and $2^{80}$ to $2^{72}$ of the partial carry over and a partial sum output from the CSA 616 are input into the CPA 617 and the LAC 620, the CPA1 618 and the CPA2 619. The LAC 620 outputs the input data to the CPA1, estimating a carry over to $2^{70}$, while it outputs the input data to the CPA2, estimating a carry over to $2^{71}$. Both CPA1 and CPA2 carry out a rounding off at the places of $2^{70}$ to $2^{71}$ respectively to output respective nine bits of $2^{79}$ to $2^{71}$ and $2^{80}$ to $2^{72}$ as a partial square root value comprised of one bit for sign and eight bits for data.

The multiplexer 510 selects nine bits of 084 output from the CPA1 as a first partial square root value comprised of one bit for sign and eight bits for data. The partial square root value is supplied to the inverting circuit 515 which bit-inverts such an input, adds "1" to its least significant bit and outputs it. In the multiplicand generator 516, eight bits for data except a sign bit of an output of the multiplexer 510 are padded into $2^{55}$ to $2^{48}$, and other bits are output in the form of zero, at the first iteration. The $(R+S\times T)$ operation unit 517 is supplied with the outputs of the residue holding circuit 508, the multiplicand generator 516 and the inverting circuit 515 and carries out, taking these outputs as R, S and T respectively, the operation $(R+S\times T)$. FFF6E1533B-46A81F4 output from the $(R+S\times T)$ operation unit 517 is shifted by the shifter 506 eight bit places to the left, selected by the multiplexer 507 and set in the residue holding circuit 508. The constant subtracter 518 subtracts "1" from LSB of the output of the multiplexer 510. When the output of the $(R+S\times T)$ operation unit 517 is negative, the multiplexer 519 selects the output of the constant subtracter 518, while it selects the output of the multiplexer 510 in other cases than that. Judging from the above conditions, the output of the constant subtracter 518 is selected and output at the first iteration. An output of the multiplexer 519 is set in the partial square root value holding circuit 511.

Next, a second iterative computation begins. The output of the table information storing unit 505 is the same as the first iterative computation and will stay unchanged at subsequent iterative computations. F6E1533B46A81F400 of a first residue $R_1$ set in the residue holding circuit 508 is multiplied by 0F96B by the multiplying circuit 509, a result of which is F71D4A2271800EAA4FC00 that is output. 172 output from the CPA2 619 is selected by the multiplexer 510 as a second partial square root value comprised of one bit for sign and eight bits for data. The inverting circuit 515 inverts 172 to form 08D, adds to it "1" as a least significant bit and outputs it. The $(R+S\times T)$ operation unit 517 carries out an operation in which 08E is taken as an actual multiplier. The multiplicand generator 516 leftshifts the outputs of the partial square root value holding circuits 511 to 514 one bit place and pads nine bits output from the multiplexer 510 into $2^{48}$ to $2^{40}$ to output 107720000000000. The $(R+S\times T)$ operation unit 517 is supplied with the outputs of the residue holding circuit 508, the multiplicand generator 516 and the inverting circuit 515 so that it carries out the operation $(R+S\times T)$, taking these outputs as R, S and T respectively. 000366FB46A81F400 output from the $(R+S\times T)$ operation unit 517 is left-shifted eight bit places by the shifter 506, selected by the multiplexer 570 and set in the residue holding circuit 508. The multiplexer 519 selects the output of the multiplexer 510 and outputs it. In the partial square root value holding circuit 512, the output of the multiplexer 519 is set.

Next, a third iterative computation begins. The output of the table information storing unit 505 is the same as the first iterative computation. 0366FB56A81F40000 of a second residue $R_2$ set in the residue holding circuit 508 is multiplied by 0F96B by the multiplying circuit 509, a result of which is 03509672C00EAA4FC0000 that is output. 035 output from the CPA2 619 is selected by the multiplexer 510 as a third partial square root value comprised of one bit for sign and eight bits for data. The inverting circuit 515 inverts 035 to form 1CA, adds to it "1" as a least significant bit and outputs it. The (R+S×T) operation unit 517 carries out an operation in which 1CB is taken as an actual multiplier. The multiplicand generator 516 left-shifts the outputs of the partial square root value holding circuits 511 to 514 one bit place and pads nine bits output from the multiplexer 510 into $2^{40}$ to $2^{32}$ to output 106E43500000000. The (R+S×T) operation unit 517 is supplied with the outputs of the residue holding circuit 508, the multiplicand generator 516 and the inverting circuit 515 so that it carries out the operation (R+S×T), taking these outputs as R, S and T respectively. 00002757181F40000 output from the (R+S×T) operation unit 517 is left-shifted eight bit places by the shifter 506, selected by the multiplexer 507 and set in the residue holding circuit 508. The multiplexer 519 selects the output of the multiplexer 510 and outputs it. In the partial square root value holding circuit 513, the output of the multiplexer 519 is set.

Then a fourth iterative computation begins. The output of the table information storing unit 505 is the same as the first iterative computation. 002757181F4000000 of a third residue $R_3$ set in the residue holding circuit 508 is multiplied by 0F96B by the multiplying circuit 509, a result of which is 00265427DD7A4FC000000 that is output. 002 output from the CPA2 619 is selected by the multiplexer 510 as a fourth partial square root value comprised of one bit for sign and eight bits for data. The inverting circuit 515 inverts 002 to form 1FD, adds to it "1" as a least significant bit and outputs it. The (R+S×T) operation unit 517 carries out an operation in which 1FE is taken as an actual multiplier. The multiplicand generator 516 left-shifts the outputs of the partial square root value holding circuits 511 to 514 one bit place and pads nine bits output from the multiplexer 510 into $2^{32}$ to $2^{24}$ to output 106E46A02000000. The (R+S×T) operation unit 517 is supplied with the outputs of the residue holding circuit 508, the multiplicand generator 516 and the inverting circuit 515 so that it carries out the operation (R+S×T), taking these outputs as R, S and T respectively. 00067A8ADF0000000 is output from the (R+S×T) operation unit 517. The multiplexer 519 selects the output of the multiplexer 510 and outputs it. In the partial square root value holding circuit 514, the output of the multiplexer 519 is set. The digit adjustment shift count calculator 520 right-shifts "2" which is an instruction received from the normalization shift count detector 503 one bit place to form and output "1". The digit adjustor 521 merges the outputs of the partial square root holding circuits 511 to 513 and the output of the multiplexer 519 and is supplied with 83723502 which is right-shifted by 1 as instructed by the digit adjustment shift count calculator 520 to output a final result of 41B91A81.

Both the embodiments 5 (shown in FIGS. 8 and 9) and 6 (FIGS. 10 to 12) show the vector square root operation devices provided with a number of data holding means, however, the arrangement of such data holding means in the operative device may be decided according to a hardware circuit to be used in order that an optimum pipeline pitch is accomplished. An exponent part compares favorably with a significand part in that the former can be obtained more easily than the latter, which allows that in the vector square root operation device of the sixth embodiment an operation unit for exponents may be inserted between any two exponent holding means by which an operation result for a significant part has not been found.

The device of the eighth embodiment in FIG. 16 becomes the one of the first embodiment in FIG. 1 if a rounding off means is removed, a constant adding means for adding "1" to LSB of a pre-correction partial square root value is added and the (R+S×T) operation unit is replaced with the (R+S×T+T) operation unit, which leads that it is obvious that a square root operation device with a rounding off means corresponding to one of the second to seventh embodiments can be constructed easily, however, a specific embodiment thereof is omitted for want of space.

I claim:

1. A square root operation device for finding a square root of a fixed-point number input operand comprising:

normalization shift count detecting means for detecting the number of shifts in 2-bit normalizing said input operand, normalizing means for left-shifting said input operand by the number of shifts detected by said normalization shift count detecting means, table information storing means for indexing an approximation of square root's reciprocal, taking high-order bits of an output of said normalizing means as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, constant subtracting means for subtracting "1" from the least significant bit of the pre-correction partial square root value that is output from said multiplying means, constant adding means for adding "1" to the least significant bit of the pre-correction partial square root value that is output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, a plurality of post-correction partial square root value holding means for holding the respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, shifting means for left-shifting an output of said complex operation means by a bit length of a partial square root value, a hold data switch multiplexer for selecting either an output of said normalizing means or an output of said shifting means, as an input of said residue holding means, digit adjustment shift count calculating means for calculating from an output of said normalization shift count detecting means the number of right-shifts to be applied to said plurality of post-correction partial square root values, in order to find a final resultant square root, and digit adjusting means, which right-shifts the post-correction partial square root values output from said post-correction partial square root value holding means and the post-correction partial square root value output from said correction multiplexer, by the number of shifts output from said digit adjustment shift count calculating means, for outputting the final resultant square root.

2. The square root operation device of claim 1, wherein all of the post-correction partial square root values required as an input of said digit adjusting means are supplied from said plurality of post-correction partial square root value holding means.

3. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one of the value is odd, table information storing means for indexing an approximation of square root's reciprocal, taking high-order bits of an output of said normalizing means as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, constant subtracting means for subtracting "1" from the least significant bit of the pre-correction partial square root value output from said multiplying means, constant subtracting means for subtracting "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, a plurality of post-correction partial square root value holding means for holding the respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, shifting means for left-shifting the residue output out of said residue holding means by a bit length of a partial square root value, complex operation means, which is supplied with a post-shift residue, R output from said shifting means, a multiplicand, S output from said multiplicand generating means and a multiplier, T output from said inverting means, and hold data switching multiplexer for selecting either an output of said normalizing means or an output of said complex operation means, as an input of said residue holding means.

4. A square root operation device for finding a square root on a fixed-point number input operand comprising:

normalization shift count detecting means for detecting the number of shifts in 2-bit normalizing said input operand, normalizing means for left-shifting said input operand by the number of shifts detected by said normalization shift count detecting means, table information storing means for indexing an approximation of square root's reciprocal, taking high-order bits of an output of said normalizing means as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding a post-correction partial square root value produced one after another at each iteration, respectively, inverting means for inverting the partial square root value bit by bit output from said pre-correction partial square root value holding means, multiplicand generating means, which left-shifts respective outputs of said plurality of post-correction partial square root value holding means one bit place, for generating a multiplicand in cooperation with the pre-correction partial square root value output from said pre-correction partial square root value holding means, a residue multiplexer for selecting either a constant zero or the residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, complex operation means, which is supplied with an output of said residue multiplexer, R, an output of said multiplicand multiplexer, S, and an output of said multiplier multiplexer, T, shifting means for left-shifting an output of said complex operation means by a bit length of the partial square root value, a hold data switching multiplexer for selecting either an output of said normalizing means or an output of said shifting means, as an input of said residue holding means, constant subtracting means for subtracting "1" from the least significant bit of the partial square root value output from said pre-correction partial square root value holding means, constant adding means for adding "1" to the least significant bit of the partial square root value output from said pre-correction partial square root value holding means, a correction multiplexer, which selects one from among the partial square root value output from said pre-correction partial square root value holding means, an output of said constant subtracting means and an output of said constant adding means, for outputting the selected one as a post-correction partial square root value without a bit overlap, digit adjustment count calculating means for calculating from an output of said normalization shift count detecting means the number of right-shifts to be applied to said plurality of post-correction partial square root values, in order to find a final resultant square root, and digit adjusting means, which right-shifts said plurality of post-correction partial square root values output from said post-correction partial square root value holding means and the post-correction partial square root value output from said correction multiplexer, by the number of shifts output from said digit adjustment shift count calculating means, for outputting the final resultant square root, wherein:

high-order positions of the output of said multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, for carrying out the operation $(R+S \times T)$, operation result shifting means for left-shifting an output of said complex operation means by a bit length of a partial square root value, and a hold data switching multiplexer for selecting either an output of said normalizing means or an output of said complex operation means, as an input of said residue holding means.

5. The square root operation device of claim 4, wherein all of the post-correction partial square root values required as an input of said digit adjusting means are supplied from said plurality of post-correction partial square root value holding means.

6. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one if the value is odd, table information storing means for indexing an approximation of square root's reciprocal, taking high-order bits of an output of said normalizing means as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding respective post-correction partial square root values produced one after another at each iteration, residue shifting means for left-shifting the residue output from said residue holding means by a bit length of the partial square root value, inverting means for inverting the pre-correction partial square root value bit by bit output from said pre-correction partial square root value holding means, multiplicand generating means, which left-shifts respective outputs of said plurality of post-correction partial square root value holding means one bit place, for generating a multiplicand in cooperation with the partial square root value output from said pre-correction partial square root value holding means, a residue multiplexer for selecting either a constant zero or a post-shift residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, complex operation means, which is supplied with an output of said residue multiplexer, R, an output of said multiplicand multiplexer, S, and an output of said multiplier multiplexer, T, a hold data switching multiplexer for selecting either an output of said normalizing means or an output of said complex operation means, as an input of said residue holding means, constant subtracting means for subtracting "1" from the least significant bit of the partial square root value output from said pre-correction partial square root value holding means, constant adding means for adding "1" to the least significant bit of the partial square root value output from said pre-correction partial square root value holding means, and a correction multiplexer, which selects one from among the partial square root value output from said pre-correction partial square root value holding means, an output of said constant subtracting means and an output of said constant adding means, for outputting the selected one as a post-correction partial square root value without a bit overlap, wherein:

high-order positions of the output of said complex operation means are held successively in said pre-correction partial square root value holding means, as a pre-correction partial square root value, and the post-correction partial square root value output one after another from said correction multiplexer are held in said respective post-correction square root value holding means.

7. A square root operation device for finding in the order of element a square root vector on an input operand in the order of element of a vector made up of a fixed-point number comprising:

a preprocessing unit for performing a preprocess on said input operand, a main unit having therein first to last main circuits, the number of which corresponds to the number of iteration in repeating a process of finding a partial square root value to the extent that the sum of bit lengths of partial square root values without bit overlaps exceeds a bit length of a target square root, and a post-processing unit for performing a post-process on an output of said main unit, said preprocessing unit including:

an input register for holding said input operand, normalization shift count detecting means for detecting the number of shifts in 2-bit normalizing an output of said input register, normalizing means for left-shifting the output of said input register by the number of shifts output from said normalization shift count detecting means, a normalized operand register for holding an output of said normalizing means, normalization shaft count holding means for holding an output of said normalization shift count detecting means, table information storing means for indexing an approximation of square root's reciprocal, taking high-order bits of an output of said normalized operand register as an address, said first main circuit in said main unit including:

residue holding means, table output information holding means and normalization shift count holding means which are connected to said normalized operand register, table information storing means and normalization shift count holding means in said preprocessing unit respectively for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, inverting means for inverting the pre-correction partial square root value bit by bit output from said multiplying means, multiplicand generating means for generating a multiplicand from the pre-correction partial square root value output from said multiplying means, complex operation means, which is supplied with a residue, R output from said residue holding means, a multiplicand, S output from said multiplicand generating means and a multiplier, T output from said inverting means shifting means for left-shifting an output of said complex operation means by a bit length of the partial square root value, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, said second and subsequent main circuits in said main unit each including:

residue holding means, table output information holding means, normalization shift count holding means and post-correction partial square root value holding means the number of which depends upon to which main circuit the post-correction partial square root value holding means belongs, for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, inverting means for inverting the pre-correction partial square root value bit by bit output from said multiplying means, multiplicand generating means, which left-shifts respective outputs of said post-correction partial square root value holding means one bit place, for generating a multiplicand in cooperation with the per-correction partial square root value output from said multiplying means, complex operation means, which is supplied with a residue, R output from said residue holding means, a multiplicand, S output from said multiplicand generating means and a multiplier, T output from said inverting means, shifting means for left-shifting an output of said complex operation means by a bit length of the partial square root value, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, wherein:

in the second and subsequent main circuits, said residue holding means, said table output information holding means and said normalization shift count holding means are connected to the shifting means in the preceding main circuit, the table output information holding means in the preceding main circuit, and the normalization shift count holding means in the preceding main circuits respectively, whereas, for said post-correction partial square root value holding means, the one in the lowermost position is connected to the correction multiplexer in the preceding main circuit, and the others are connected to the respective post-correction partial square root value holding means in the preceding main circuit, said post-processing unit including:

normalization shift count holding means and a plurality of post-correction partial square root value holding means, for synchronization of pipeline operations, digit adjustment shift count calculating means for calculating from an output of said normalization shift count detecting means the number of right-shifts to be applied to the post-correction partial square root values, in order to find a final resultant square root, and digit adjusting means, which right-shifts outputs of said plurality of post-correction partial square root value holding means by the number of shifts output from said digit adjustment shift count calculating means, for outputting the final resultant square root, wherein:

in said post-processing unit, said normalization shift count holding means is connected to the normalization shift count holding means in said last main circuit in said main unit while, for said plurality of post-correction partial square root value holding means, the one in the lowermost position is connected to the correction multiplexer in said last main circuit, and the others are connected to the respective post-correction partial square root value holding means in the last main circuit.

8. A square root operation device for finding in the order of element a square root vector or an input operand in the order of element of a vector made up of a floating-point number in which the base of an exponent is 2 comprising:

a preprocessing unit for performing a preprocess on said input operand, a main unit having therein first to last main circuits, the number of which corresponds to the number of iteration in repeating a process of finding a partial square root value to the extent that the sum of bit lengths of partial square root values without bit overlaps exceeds a bit length of a target square root, and a post-processing unit for performing a post-process on an output of said main circuit, said preprocessing unit including:

an input register for holding said input operand, exponent constant subtracting means for removing an exponent bias from an exponent part of an output of said input register, exponent holding means for holding an output of said exponent constant subtracting means, normalizing means for left-shifting a significand part of the output of said input register one bit place to cause a value obtained after removing the exponent bias to be an even one if the value is odd, a normalized operand register for holding an output of said normalizing means, exponent shifting means for right-shifting an output of said exponent holding means one bit place, exponent constant adding means for adding the exponent bias to an output of said exponent shifting means, table information storing means for indexing an approximation of square root's reciprocal, taking high-order bits of an output of said normalized operand register as an address, said first main circuit in said main unit including:

constant holding means, residue holding means and table output information holding means which are connected to the exponent constant adding means, the normalized operand register, the table information storing means each in said preprocessing unit respectively for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value;

inverting means for inverting the pre-correction partial square root value bit by bit output from said multiplying means, multiplicand generating means for generating a multiplicand from the pre-correction partial square root value output from said multiplying means, residue shifting means for left-shifting a residue output from said residue holding means by a bit length of the partial square root value, complex operation means, which is supplied with a post-shift residue, R output from said residue holding means, a multiplicand, S output from said multiplicand generating means and a multiplier, T output from said inverting means, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, said second and subsequent main circuits in said main unit each including:

exponent holding means, residue holding means, table output information holding means and post-correction partial square root value holding means the number of which depends upon to which main circuit the post-correction partial square root value holding means belongs, for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, inverting means for inverting the pre-correction partial square root value bit by bit output from said multiplying means, multiplicand generating means, which left-shifts respective outputs of said post-correction partial square root value holding means one bit place, for generating a multiplicand in cooperation with the pre-correction partial square root value output from said multiplying means, residue shifting means for left-shifting a residue output from said residue holding means by a bit length of the partial square root value, complex operation means, which is supplied with a post-shift residue, R output from said residue holding means, a multiplicand, S output from said multiplicand generating means and a multiplier, T output from said inverting means, constant subtracting means for subtracting "1" from the least significant bit of the pre-correction partial square root value output from said multiplying means, constant adding means for adding "1" to the least significant bit of the pre-correction partial square root value output from said multiplying means, correction multiplexer, which selects one from among the pre-correction partial square root value output from said multiplying means, an output of said constant subtracting means and an output of said constant adding means, for outputting the selected one as a post-correction partial square root value without a bit overlap, wherein:

in the second and subsequent main circuits, said exponent holding means, said residue holding means and said table output information holding means are connected to the exponent holding means, the complex operation means and the table output information holding means each in the preceding main circuit, respectively, for said post-correction partial square root value holding means, the one in the lowermost position is connected to the correction multiplexer in the preceding main circuit, and the others are connected to the respective post-correction partial square root value holding means in the preceding main circuit, said post-processing unit including:

exponent holding means and a plurality of post-correction partial square root value holding means, for synchronization of pipeline operations, wherein:

in said post-processing unit, said exponent holding means is connected to the exponent holding means in said last main circuit in said main unit while, for said plurality of post-correction partial square root value holding means, the one in the lowermost position is connected to the correction multiplexer in said last main circuit, and the others are connected to the respective post-correction partial square root value holding means in the last main circuit.

9. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one if the value is odd, table information storing means for indexing an approximation of square root's reciprocal, taking high-order bits of an output of said normalizing means as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, a plurality of post-correction partial square root value holding means for holding respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, operation result shifting means for left-shifting an output of said complex operation means by a bit length of a partial square root value, and a hold data switching multiplexer for selecting either an output of said normalizing means or an output of said complex operation means, as an input of said residue holding means.

10. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one if the value is odd, table information storing means for indexing an approximation of square root's reciprocal, taking high-order bits of an output of said normalizing means as an address, residue holding means for holding a residue in finding the square root by iterating at a time a fixed number of bits form a high-order position downward, pre-correction partial square root value holding means for holding a partial square root value at each iteration, and a plurality of post-correction partial square root value holding means for holding respective post-correction partial square root values produced one after another at each iteration, inverting means for inverting the pre-correction partial square root value bit by bit output from said pre-correction partial square root value holding means, multiplicand generating means, which left-shifts respective outputs of said plurality of post-correction partial square root value holding means one bit place, for generating a multiplicand in cooperation with the pre-correction partial square root value output from said pre-correction partial square root value holding means, a residue multiplexer for selecting either a constant zero or the residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, complex operation means, which is supplied with an output of said residue multiplexer, R, an output of said multiplicand multiplexer, S, and an output of said multiplier multiplexer, T, operation result shifting means for left-shifting an output of said complex operation means by a bit length of the partial square root value, a hold data switching multiplexer for selecting either an output of said normalizing means or an output of said operation result shifting means, as an input of said residue holding means, constant subtracting means for subtracting "1" from the least significant bit of the partial square root value output from said pre-correction partial square root value holding means, constant adding means for adding "1" to the least significant bit of the partial square root value output from said pre-correction partial square root holding means, and a correction multiplexer, which selects one from among the partial square root value output from said pre-correction partial square root value output from said pre-correction partial square root value holding means, an output of said constant subtracting means and an output of said constant adding means, for outputting the selected one as a post-correction partial square root value without a bit overlap, wherein:

high-order positions of the output of said complex operation means are held successively in said pre-correction partial square root value holding means as a pre-correction partial square root value, and the post-correction partial square root values output one after another from said correction multiplexer are held in said respective post-correction square root value holding means.

11. A square root operation device for finding in the order of element a square root vector on an input operand in the order of element of a vector made up of a floating-point number in which the base of an exponent is 2 comprising:

a preprocessing unit for performing a preprocess on said input operand, a main unit having therein first to last main circuits, the number of which corresponds to the number of iteration in repeating a process of finding a partial square root value to the extent that the sum of bit lengths of partial square root values without bit overlaps exceeds a bit length of a target square root, and a post-processing unit for performing a post-process on an output of said main unit, said preprocessing unit including:

an input register for holding said input operand, exponent constant subtracting means for removing an exponent bias from an exponent part of an output of said input register, exponent holding means for holding an output of said exponent constant subtracting means, normalizing means for left-shifting a significand part of the output of said input register one bit place to cause a value obtained after removing the exponent bias to be an even one if the value is odd, a normalized operand register for holding an output of said normalizing means, exponent shifting means for right-shifting an output of said exponent holding means one bit place, exponent constant adding means for adding the exponent bias to an output of said exponent shifting means, table information storing means for indexing an approximation of square root's reciprocal, taking high-order bits of an output of said normalized operand register as an address, said first main circuit in said main unit including:

exponent holding means, residue holding means and table output information holding means which are connected to the exponent constant adding means, the normalized operand register, the table information storing means each in said preprocessing unit respectively for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, inverting means for inverting the pre-correction partial square root value bit by bit output from said multiplying means, multiplicand generating means for generating a multiplicand from the pre-correction partial square root value output from said multiplying means, complex operation means, which is supplied with a residue, R output from said residue holding means, a multiplicand, S output from said multiplicand generating means and a multiplier, T output from said inverting means, operation result shifting means for left-shifting an output from said complex operation means as a bit length of the partial square root value, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, said second and subsequent main circuits in said main unit each including:

exponent holding means, residue holding means, table output information holding means and post-correction partial square root vale holding means the number of which depends upon to which main circuit the post-correction partial square root value holding means belongs, for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, inverting means for inverting the pre-correction partial square root value bit by bit output from said multiplying means, multiplicand generating means, which left-shifts respective outputs of said post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, operation result shifting means for left-shifting an output from said complex operation means by a bit length of the partial square root value, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, wherein:

in the second and subsequent main circuits, said exponent holding means, said residue holding means and said table output information holding means are connected to the exponent holding means, the operation result shifting means and the table output information holding means each in the preceding main circuit, respectively, whereas, for said post-correction partial square root value holding means, the one in the lowermost position is connected to the correction multiplexer in the preceding main circuit, and the others are connected to the respective post-correction partial square root value holding means in the preceding main circuit, said post-processing unit including:

exponent holding means and a plurality of post-correction partial square root value holding means for synchronization of pipeline operations, wherein:

in said post-processing unit, said exponent holding means is connected to the exponent holding means in said last main circuit in said main unit while, for said plurality of post-correction partial square root value holding means, the one in the lowermost position is connected to the correction multiplexer in said last main circuit, and the other are connected to the respective post-correction partial square root value holding means in the last main circuit.

12. A square root operation device for finding a square root on a 2-bit normalized input operand comprising:

table information storing means for indexing an approximation of square root's reciprocal, taking high-order bits of said input operand as an address, residue holding means for holding a residue in finding the square root by iteration at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, a plurality of post-correction partial square root value holding means for holding respective post-correction partial square root values which are output one after another from said correction multiplexer, inverting means for inverting the pre-correction partial square root bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, residue shifting means for left-shifting the residue output from said residue holding means by a bit length of a partial square root value, complex operation means, which is supplied with a post-shift residue, R output from said residue holding means, a multiplicand, S output from said multiplicand generating means and a multiplier, T output from said inverting means, and a hold data switching multiplexer for selecting either said input operand or an output of said complex operation mans, as an input of said residue holding means.

13. A square root operation device for finding a square root on a 2-bit normalized input operand comprising:

table information storing means for indexing an approximation of square root's reciprocal, taking high-order bits of said input operand as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding respective post-correction partial square root values produces one after another at each iteration, residue shifting means for left-shifting the residue output from said residue holding means by a bit length of the partial square root value, inverting means for inverting the partial square root value bit by bit output from said pre-correction partial square root value holding means, multiplicand generating means, which left-shifts respective outputs of said plurality of post-correction partial square root value holding means one bit place, for generating a multiplicand in cooperation with the partial square root value output from said pre-correction partial square root value holding means, a residue multiplexer for selecting either a constant zero or a post-shift residue output from said residue shifting means, a multiplicand multiplexer for selecting either the residue output from said residue holding means or an output of said multiplicand generating means, a multiplier multiplexer for selecting either the approximation of square root's reciprocal output from table information storing means or an output of said inverting means, complex operation means, which is supplied with an output of said residue multiplexer, R, an output of said multiplicand multiplexer, S, and an output of said multiplier multiplexer, T a hold data switching multiplexer for selecting either said input operand or an output of said complex operation means, as an input of said residue holding means, constant subtracting means for subtracting "1" from the least significant bit of the partial square root value output from said pre-correction partial square root value holding means, constant adding means for adding "1" to the least significant bit of the partial square root value output from said pre-correction partial square root value holding means, and a correction multiplexer, which selects one from among the partial square root value output from said pre-correction partial square root value holding means, an output of said constant subtracting means and an output of said constant adding means, for outputting the selected one as a post-correction partial square root value without a bit overlap, wherein:

high-order positions of the output of said complex operation means are held successively in said pre-correction partial square root value holding means, as a pre-correction partial square root value, and the post-correction partial square root values output one after another from said correction multiplexer are held in said respective post-correction square root value holding means.

14. A square root operation device for finding a square root on a 2-bit normalized input operand comprising:

table information storing means for indexing an approximation of square root's reciprocal, taking high-order bits of said input operand as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, constant subtracting means for subtracting "1" from the least significant bit of the pre-correction partial square root value output from said multiplying means, constant adding means for adding "1" to the least significant bit of the pre-correction partial square root value output from said multiplying means, a correction multiplexer, which selects one from among the pre-correction partial square root value output from said multiplying means, an output of said constant subtracting means and an output of said constant adding means, for outputting the selected one as a post-correction partial square root value without a bit overlap, a plurality of post-correction partial square root value holding means for holding respective post-correction partial square root value which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, shifting means for left-shifting an output of said complex operation means by a bit length of a partial square root value, and a hold data switching multiplexer for selecting either said input operand or an output of said shifting means, as an input of said residue holding means.

15. A square root operation device for finding a square root on a 2-bit normalized input operand comprising:

table information storing means for indexing an approximation of square root's reciprocal, taking high-order bits of said input operand as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding respective post-correction partial square root values produced one after another at each iteration, inverting means for inverting the partial square root value bit by bit output from said pre-correction partial square root value holding means, multiplicand generating means, which left-shifts respective outputs of said plurality of post-correction partial square root value holding means one bit place, for generating a multiplicand in cooperation with the partial square root value output from said pre-correction partial square root value holding means, a residue multiplexer for selecting either a constant zero or the residue output from said residue holding means, a multiplicand multiplexer for selecting either the residue output from said residue holding means or an output of said multiplicand generating means, a multiplier multiplexer for selecting either the approximation of square root's reciprocal output from table information storing means or an output of said inverting means, complex operation means, which is supplied with an output of said residue multiplexer, R, an output of said multiplicand multiplexer, S, and an output of said multiplier multiplexer, T, shifting means for left-shifting an output from said complex operation means by a bit length of the partial square root value, a hold data switching multiplexer for selecting either said input operand or an output of said shifting means, as an input of said residue holding means, constant subtracting means for subtracting "1" from the least significant bit of the partial square root value output from said pre-correction partial square root value holding means, constant adding means for adding "1" to the least significant bit of the partial square root value output from said pre-correction partial square root value holding means, and a correction multiplexer, which selects one from among the partial square root value output from said pre-correction partial square root value holding means, an output of said constant subtracting means and an output of said constant adding means, for outputting the selected one as a post-correction partial square root value without a bit overlap, wherein:

high-order positions of the output of said complex operation means are held successively in said pre-correction partial square root value holding means, as a pre-correction partial square root value, and the post-correction partial square root values output one after another from said correction multiplexer are held in said respective post-correction square root value holding means.

16. A square root operation device for finding a square root on a fixed-point number input operand comprising:

normalization shift count detecting means for detecting the number of shifts in 2-bit normalizing said input operand, normalizing means for left-shifting said input operand by the number of shifts detected by said normalization shift count detecting means, table information storing means for indexing an approximation of square root's reciprocal, taking high-order bits of an output of said normalizing means as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, constant subtracting means for subtracting "1" from the least significant bit of the pre-correction partial square root value that is output from said multiplying means, a correction multiplexer, which selects one from among the pre-correction partial square root value output from said multiplying means, and an output of said constant subtracting means, for outputting the selected one as a post-correction partial square root value without a bit overlap, a plurality of post-correction partial square root value holding means for holding the respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, for carrying out the operation (R+S×T), shifting means for left-shifting an output of said complex operation means by a bit length of a partial square root value, a hold data switching multiplexer for selecting either an output of said normalizing means or an output of said shifting means, as an input of said residue holding means, digit adjustment shift count calculating means for calculating from an output of said normalization shift count detecting means the number of right-shifts to be applied to said plurality of post-correction partial square root values, in order to find a final resultant square root, and digit adjusting means, which right-shifts the post-correction partial square root values output from said post-correction partial square root value holding means and the post-correction partial square root value output from said correction multiplexer, by the number of shifts output from said digit adjustment shift count calculating means, for outputting the final resultant square root.

17. The square root operation device of claim 16, wherein all of the post-correction partial square root values required as an input of said digit adjusting means are supplied from said plurality of post-correction partial square root value holding means.

18. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one if the value is odd, table information storing means for indexing an approximation of square root's reciprocal, taking high-order bits of an output of said normalizing means as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, a plurality of post-correction partial square root value holding means for holding the respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, shifting means for left-shifting the residue output out of said residue holding means by a bit length of a partial square root value, complex operation means, which is supplied with a post-shift residue, R output from said shifting means, a multiplicand, S output from said multiplicand generating means and a multiplier, T output from said inverting means, for carrying out the operation (R+S×T), and a hold data switching multiplexer for selecting either an output of said normalizing means or an output of said complex operation means, as an input of said residue holding means.

19. A square root operation device for finding a square root on a fixed-point number input operand comprising:

normalization shift count detecting means for detecting the number of shifts in 2-bit normalizing said input operand, normalizing means for left-shifting said input operand by the number of shifts detected by said normalization shift count detecting means, table information storing means for indexing an approximation of square root's reciprocal, taking high-order bits of an output of said normalizing means as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding a post-correction partial square root value produced one after another at each iteration, respectively, inverting means for inverting the partial square root value bit by bit output from said pre-correction partial square root value holding means, multiplicand generating means, which left-shifts respective outputs of said plurality of post-correction partial square root value holding means one bit place, for generating a multiplicand in cooperation with the pre-correction partial square root value output from said pre-correction partial square root value holding means, a residue multiplexer for selecting either a constant zero or the residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, complex operation means, which is supplied with an output of said residue multiplexer, R, an output of said multiplicand multiplexer, S, and an output of said multiplier multiplexer, T, for carrying out the operation $(R+S\times T)$, partial square root value calculation adding means at an output stage in said complex operation means, for carrying out a rounding off at a place one bit lower than the least significant bit of the partial square root value, shifting means for left-shifting an output of said complex operation means by a bit length of the partial square root value, a hold data switching multiplexer for selecting either an output of said normalizing means or an output of said shifting means, as an input of said residue holding means, constant subtracting means for subtracting "1" from the least significant bit of the partial square root value output from said pre-correction partial square root value holding means, a correction multiplexer, which selects one from among the partial square root value output from said pre-correction partial square root value holding means, and an output of said constant subtracting means, for outputting the selected one as a post-correction partial square root value without a bit overlap, digit adjustment shift count calculating means for calculating from an output of said normalization shift count detecting means the number of right-shifts to be applied to said plurality of post-correction partial square root values, in order to find a final resultant square root, and digit adjusting means, which right-shifts said plurality of post-correction partial square root values output from said post-correction partial square root value holding means and the post-correction partial square root value output from said correction multiplexer, by the number of shifts output from said digit adjustment shift count calculating means, for outputting the final resultant square root, wherein:

high-order positions of the output of said complex operation means are held successively in said pre-correction partial square root value holding means, as a pre-correction partial square root value, and the post-correction partial square root values output one after another from said correction multiplexer are held in said respective post-correction square root value holding means.

20. The square root operation device of claim 19, wherein all of the post-correction partial square root values required as an input of said digit adjusting means are supplied from said plurality of post-correction partial square root value holding means.

21. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one if the value is odd, table information storing means for indexing an approximation of square root's reciprocal, taking high-order bits of an output of said normalizing means as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding respective post-correction partial square root values produced one after another at each iteration, residue shifting means for left-shifting the residue output from said residue holding means by a bit length of the partial square root value, inverting means for inverting the pre-correction partial square root value bit by bit output from said pre-correction partial square root value holding means, multiplicand generating means, which left-shifts respective outputs of said plurality of post-correction partial square root value holding means one bit place, for generating a multiplicand in cooperation with the partial square root value output from said pre-correction partial square root value holding means, a residue multiplexer for selecting either a constant zero or a post-shift residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, complex operation means, which is supplied with an output of said residue multiplexer, R, an output of said multiplicand multiplexer, S, and an output of said multiplier multiplexer, T, for carrying out the operation $(R+S\times T)$, partial square root value calculation adding means at an output stage in said complex operation means, for carrying out a rounding off at a place one bit lower that the least significant bit of the partial square root value, a hold data switching multiplexer for selecting either an output of said normalizing means or an output of said complex operation means, as an input of said residue holding means, constant subtracting means for subtracting "1" from the least significant bit of the partial square root value output from said pre-correction partial square root value holding means, a correction multiplexer, which selects one from among the partial square root value output from said pre-correction partial square root value holding means, and an output of said constant subtracting means, for outputting the selected one as a post-correction partial square root value without a bit overlap, wherein:

high-order positions of the output of said complex operation means are held successively in said pre-correction partial square root value holding means, as a pre-correction partial square root value, and the post-correction partial square root values output one after another from said correction multiplexer are held in said respective post-correction square root value holding means.

22. A square root operation device for finding in the order of element a square root vector or an input operand in the order of element of a vector made up of a fixed-point number comprising:

a preprocessing unit for performing a preprocess on said input operand, a main unit having therein first to last main circuits, the number of which corresponds to the number of iteration in repeating a process of finding a partial square root value to the extent that the sum of bit lengths of partial square root values without bit overlaps exceeds a bit length of a target square root, and a post-processing unit for performing a post-process on an output of said main unit, said preprocessing unit including:

an input register for holding said input operand, normalization shift count detecting means for detecting the number of shifts in 2-bit normalizing an output of said input register, normalizing means for left-shifting the output of said input register by the number of shifts output from said normalization shift count detecting means, a normalized operand register for holding an output of said normalizing means, normalization shift count holding means for holding an output of said normalization shift count detecting means, table information storing means for indexing an approximation of square root's reciprocal, taking high-order bits of an output of said normalized operand register as an address, said first main circuit in said main unit including:

residue holding means, table output information holding means and normalization shift count holding means which are connected to said normalized operand register, table information storing means and normalization shift count holding means in said preprocessing unit respectively for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, inverting means for inverting the pre-correction partial square root value bit by bit output from said multiplying means, multiplicand generating means for generating a multiplicand from the pre-correction partial square root value output from said multiplying means, complex operation means, which is supplied with a residue, R output from said residue holding means, a multiplicand, S output from said multiplicand generating means and a multiplexer, T output from said inverting means, for carrying out the operation $(R + S \times T)$, shifting means for left-shifting an output of said complex operation means by a bit length of the partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, said second and subsequent main circuits in said main unit each including:

residue holding means, table output information holding means, normalization shift count holding means and post-correction partial square root value holding means the number of which depends upon to which main circuit the post-correction partial square root value holding means belongs, for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, inverting means for inverting the pre-correction partial square root value bit by bit output from said multiplying means, multiplicand generating means, which left-shifts respective outputs of said post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating mans and a multiplier, T output from said inverting means, for carrying out the operation $(R + S \times T)$, shifting means for left-shifting an output of said complex operation means by a bit length of the partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, wherein:

in the second and subsequent main circuits, said residue holding means, said table output information holding means and said normalization shift count holding means are connected to the shifting means in the preceding main circuit, the table output information holding means in the preceding main circuit, and the normalization shift count holding means in the preceding main circuits respectively, whereas, for said post-correction partial square root value holding means, the one in the lowermost position is connected to the correction multiplexer in the preceding main circuit, and the others are connected to the respective post-correction partial square root value holding means in the preceding main circuit, said post-processing unit including:

normalization shift count holding means and a plurality of post-correction partial square root value holding means, for synchronization of pipeline operations, digit adjustment shift count calculating means for calculating from an output of said normalization shift count detecting means the number of right-shifts to be applied to the post-correction partial square root values, in order to find a final resultant square root, and digit adjusting means, which right-shifts outputs of said plurality of post-correction partial square root value holding means by the number of shifts output from said digit adjustment shift count calculating means, for outputting the final resultant square root, wherein:

in said post-processing unit, said normalization shift count holding means is connected to the normalization shift count holding means in said last main circuit in said main unit while, for said plurality of post-correction partial square root value holding means, the one in the lowermost position is connected to the correction multiplexer in said last main circuit, and the others are connected to the respective post-correction partial square root value holding means in the last main circuit.

23. A square root operation device for finding in the order of element a square root vector on an input operand in the order of element of a vector made up of a floating-point number in which the base of an exponent is 2 comprising:

a preprocessing unit for performing a preprocess on said input operand, a main unit having therein first to last main circuits, the number of which corresponds to the number of iteration in repeating a process of finding a partial square root value to the extent that the sum of bit lengths of partial square root values without bit overlaps exceeds a bit length of a target square root, and a post-processing unit for performing a post-process on an output of said main circuit, said preprocessing unit including:

an input register for holding said input operand, exponent constant subtracting means for removing an exponent bias from an exponent part of an output of said input register, exponent holding means for holding an output of said exponent constant subtracting means, normalizing means for left-shifting a significand part of the output of said input register one bit place to cause a value obtained after removing the exponent bias to be an even one if the value is odd, a normalized operand register for holding an output of said normalizing means, exponent shifting means for right-shifting an output of said exponent holding means one bit place, exponent constant adding means for adding the exponent bias to an output of said exponent shifting means, table information storing means for indexing an approximation of square root's reciprocal, taking high-order bits of an output of said normalized operand register as an address, said first main circuit in said main unit including:

constant holding means, residue holding means and table output information holding means which are connected to the exponent constant adding means, the normalized operand register, the table information storing means each in said preprocessing unit respectively for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, inverting means for inverting the pre-correction partial square root value bit by bit output from said multiplying means, multiplicand generating means for generating a multiplicand from the pre-correction partial square root value output from said multiplying means, residue shifting means for left-shifting a residue output from said residue holding means by a bit length of the partial square root value, complex operation means, which is supplied with a post-shift residue, R output from said residue holding means, a multiplicand, S output from said multiplicand generating means and a multiplier, T output from said inverting means, for carrying out the operation $(R + S \times T)$, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, said second and subsequent main circuits in said main unit each including:

exponent holding means, residue holding means, table output information holding means and post-correction partial square root value holding means the number of which depends upon to which main circuit the post-correction partial square root value holding means belongs, for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, inverting means for inverting the pre-correction partial square root value bit by bit output from said multiplying means, multiplicand generating means, which left-shifts respective outputs of said post-correction partial square root value holding means one bit place, for generating a multiplicand in cooperation with the pre-correction partial square root value output from said multiplying means, residue shifting means for left-shifting a residue output from said residue holding means by a bit length of the partial square root value, complex operation means, which is supplied with a post-shift residue, R output from said residue holding means, a multiplicand, S output from said multiplicand generating means and a multiplier, T output from said inverting means, for carrying out the operation $(R + S \times T)$, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, wherein:

in the second and subsequent main circuits, said exponent holding means, said residue holding means and said table output information holding means are connected to the exponent holding means, the complex operation means and the table output information holding means each in the preceding main circuit, respectively, whereas, for said post-correction partial square root value holding means, the one in the lowermost position is connected to the correction multiplexer in the preceding main circuit, and the others are connected to the respective post-correction partial square root value holding means in the preceding main circuit, said post-processing unit including:

exponent holding means and a plurality of post-correction partial square root value holding means, for synchronization of pipeline operations, wherein:

in said post-processing unit, said exponent holding means is connected to the exponent holding means in said last main circuit in said main unit while, for said plurality of post-correction partial square root value holding means, the one in the lowermost position is connected to the correction multiplexer in said last main circuit, and the others are connected to the respective post-correction partial square root value holding means in the last main circuit.

24. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one if the value is odd, table information storing means for indexing an approximation of square root's reciprocal, taking high-order bits of an output of said normalizing means as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, a plurality of post-correction partial square root value holding means for holding respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, for carrying out the operation $(R+S\times T)$, operation result shifting means for left-shifting an output of said complex operation means by a bit length of a partial square root value, and a hold data switching multiplexer for selecting either an output of said normalizing means or an output of said complex operation means, as an input of said residue holding means.

25. A square root operation device for finding a square root on a floating-point number input operand in which the base of an exponent is 2 comprising:

exponent constant subtracting means for removing an exponent bias from the exponent of said input operand, exponent shifting means for right-shifting an output of said exponent constant subtracting means one bit place, exponent constant adding means for adding the exponent bias to an output of said exponent shifting means, normalizing means for left-shifting a significand of said input operand one bit place to cause a value obtained after removing the exponent bias to be an even one if the value is odd, table information storing means for indexing an approximation of square root's reciprocal, taking high-order bits of an output of said normalizing means as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding respective post-correction partial square root values produced one after another at each iteration, inverting means for inverting the pre-correction partial square root value bit by bit output from said pre-correction partial square root value holding means, multiplicand generating means, which left-shifts respective outputs of said plurality of post-correction partial square root value holding means one bit place, for generating a multiplicand in cooperation with the pre-correction partial square root value output from said pre-correction partial square root value holding means, a residue multiplexer for selecting either a constant zero or the residue output from said residue holding means, a multiplicand multiplexer for selecting either the residue output from said residue holding means or an output of said multiplicand generating means, a multiplier multiplexer for selecting either the approximation of square root's reciprocal output from said table information storing means or an output of said inverting means, complex operation means, which is supplied with an output of said residue multiplexer, R, an output of said multiplicand multiplexer, S, and an output of said multiplier multiplexer, T, for carrying out the operation $(R+S\times T)$, partial square root value calculation adding means at an output stage in said complex operation means, for carrying out a rounding off at a place one bit lower than the least significant bit of the partial square root value, operation result shifting means for left-shifting an output of said complex operation means by a bit length of the partial square root value, a hold data switching multiplexer for selecting either an output of said normalizing means or an output of said operation result shifting means, as an input of said residue holding means, constant subtracting means for subtracting "1" from the least significant bit of the partial square root value output from said pre-correction partial square root value holding means, and a correction multiplexer, which selects one from among the partial square root value output from said pre-correction partial square root value holding means, and an output of said constant subtracting means, for outputting the selected one as a post-correction partial square root value without a bit overlap, wherein:

high-order positions of the output of said complex operation means are held successively in said pre-correction partial square root value holding means as a pre-correction partial square root value, and the post-correction partial square root values output one after another from said correction multiplexer are held in said respective post-correction square root value holding means.

26. A square root operation device for finding in the order of element a square root vector on an input operand in the order of element of a vector made up of a floating-point number in which the base of an exponent is 2 comprising:

a preprocessing unit for performing a preprocess on said input operand, a main unit having therein first to last main circuits, the number of which corresponds to the number of iteration in repeating a process of finding a partial square root value to the extent that the sum of bit lengths of partial square root values without bit overlaps exceeds a bit length of a target square root, and a post-processing unit for performing a post-process on an output of said main unit, said preprocessing unit including:

an input register for holding said input operand, exponent constant subtracting means for removing an exponent bias from an exponent part of an output of said input register, exponent holding means for holding an output of said exponent constant subtracting means, normalizing means for left-shifting a significand part of the output of said input register one bit place to cause a value obtained after removing the exponent bias to be an even one if the value is odd, a normalized operand register for holding an output of said normalizing means, exponent shifting means for right-shifting an output of said exponent holding means one bit place, exponent constant adding means for adding the exponent bias to an output of said exponent shifting means, table information storing means for indexing an approximation of square root's reciprocal, taking high-order bits of an output of said normalized operand register as an address, said first main circuit in said main unit including:

exponent holding means, residue holding means and table output information holding means which are connected to the exponent constant adding means, the normalized operand register, the table information storing means each in said preprocessing unit respectively for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of said pre-correction partial square root value, inverting means for inverting the pre-correction partial square root value bit by bit output from said multiplying means, multiplicand generating means for generating a multiplicand from the pre-correction partial square root value output from said multiplying means, complex operation means, which is supplied with a residue, R output from said residue holding means, a multiplicand, S output from said multiplicand generating means and a multiplier, T output from said inverting means, for carrying out the operation $(R+S \times T)$, operation result shifting means for left-shifting an output from said complex operation means by a bit length of the partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, said second and subsequent main circuits in said main unit each including:

exponent holding means, residue holding means, table output information holding means and post-correction partial square root value holding means the number of which depends upon to which main circuit the post-correction partial square root value holding means belongs, for synchronization of pipeline operations, multiplying means, which is supplied with an output of said residue holding means that serves as a multiplicand and with an output of said table output information holding means that serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of said pre-correction partial square root value, inverting means for inverting the pre-correction partial square root value bit by bit output from said multiplying means, multiplicand generating means, which left-shifts respective outputs of said post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T output from said inverting means, for carrying out the operation $(R+S \times T)$, operation result shifting means for left-shifting an output from said complex operation means by a bit length of the partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, wherein:

in the second and subsequent main circuits, said exponent holding means, said residue holding means and said table output information holding means are connected to the exponent holding means, the operation result shifting means and the table output information holding means each in the preceding main circuit, respectively, whereas, for said post-correction partial square root value holding means, the one in the lowermost position is connected to the correction multiplexer in the preceding main circuit, and the others are connected to the respectively post-correction partial square root value holding means in the preceding main circuit, said post-processing unit including:

exponent holding means and a plurality of post-correction partial square root value holding means for synchronization of pipeline operations, wherein:

in said post-processing unit, said exponent holding means is connected to the exponent holding means in said last main circuit in said main unit while, for said plurality of post-correction partial square root value holding means, the one in the lowermost position is connected to the correction multiplexer in said last main circuit, and the others are connected to the respective post-correction partial square root value holding means in the last main circuit.

27. A square root operation device for finding a square root on a 2-bit normalized input operand comprising:

table information storing means for indexing an approximation of square root's reciprocal, taking high-order bits of said input operand as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of said pre-correction partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, a plurality of post-correction partial square root value holding means for holding respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, residue shifting means for left-shifting the residue output from said residue holding means by a bit length of a partial square root value, complex operation means, which is supplied with a post-shift residue, R output from said residue holding means, a multiplicand, S output from said multiplicand generating means and a multiplier, T output from said inverting means, for carrying out the operation (R+S×T), and a hold data switching multiplexer for selecting either said input operand or an output of said complex operation means, as an input of said residue holding means.

28. A square root operation device for finding a square root on a 2-bit normalized input operand comprising:

table information storing means for indexing an approximation of square root's reciprocal, taking high-order bits of said input operand as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding respective post-correction partial square root values produced one after another at each iteration, residue shifting means for left-shifting the residue output from said residue holding means by a bit length of the partial square root value, inverting means for inverting the partial square root value bit by bit output from said pre-correction partial square root value holding means, multiplicand generating means, which left-shifts respective outputs of said plurality of post-correction partial square root value holding means one bit place, for generating a multiplicand in cooperation with the partial square root value output from said pre-correction partial square root value holding means, a residue multiplexer for selecting either a constant zero or a post-shift residue output from said residue shifting means, a multiplicand multiplexer for selecting either the residue output from said residue holding means or an output of said multiplicand generating means, a multiplier multiplexer for selecting either the approximation of square root's reciprocal output from table information storing means or an output of said inverting means, complex operation means, which is supplied with an output of said residue multiplexer, R, an output of said multiplicand multiplexer, S, and an output of said multiplier multiplexer, T, for carrying out the operation (R+S×T), partial square root value calculation adding means at an output stage in said complex operation means for carrying out a rounding off at a place one bit lower than the least significant bit of the partial square root value, a hold data switching multiplexer for selecting either said input operand or an output of said complex operation means, as an input of said residue holding means, constant subtracting means for subtracting "1" from the least significant bit of the partial square root value output from said pre-correction partial square root value holding means, a correction multiplexer, which selects one from among the partial square root value output from said pre-correction partial square root value holding means, and an output of said constant subtracting means, for outputting the selected one as a post-correction partial square root value without a bit overlap, wherein:

high-order positions of the output of said complex operation means are held successively in said pre-correction partial square root value holding means, as a pre-correction partial square root value, and the post-correction partial square root values output one after another from said correction multiplexer are held in said respective post-correction square root value holding means.

29. A square root operation device for finding a square root on a 2-bit normalized input operand comprising:

table information storing means for indexing an approximation of square root's reciprocal, taking high-order bits of said input operand as an address, residue holding means for holding a residue in finding the square root by iterating at a time a fixed number of bits from a high-order position downward, multiplying means, which is supplied with the residue that is output from said residue holding means and serves as a multiplicand and with the approximation of square root's reciprocal that is output from said table information storing means and serves as a multiplier, for carrying out a multiplication to output high-order positions of a resultant product as a pre-correction partial square root value, partial square root value calculation adding means at an output stage in said multiplying means, for carrying out a rounding off at a place one bit lower than the least significant bit of the pre-correction partial square root value, constant subtracting means for subtracting "1" from the least significant bit of the pre-correction partial square root value output from said multiplying means, a correction multiplexer, which selects one from among the pre-correction partial square root value output from said multiplying means, and an output of said constant subtracting means, for outputting the selected one as a post-correction partial square root value without a bit overlap, a plurality of post-correction partial square root value holding means for holding respective post-correction partial square root values which are output one after another from said correction multiplexer, inverting means for inverting the pre-correction partial square root value bit by bit output from said multiplying means, multiplicand generating means, which left-shifts respective outputs of said plurality of post-correction partial square root value holding means one bit place, for generating a multiplicand in cooperation with the pre-correction partial square root value output from said multiplying means, complex operation means, which is supplied with a residue, R output from said residue holding means, a multiplicand, S output from said multiplicand generating means and a multiplier, T outputs from said inverting means, for carrying out the operation $(R+S\times T)$, shifting means for left-shifting an output of said complex operation means by a bit length of a partial square root value, and a hold data switching multiplexer for selecting either said input operand or an output of said shifting means, as an input of said residue holding means.

30. A square root operation device for finding a square root on a 2-bit normalized input operand comprising:

table information storing means for indexing an approximation of square root's reciprocal, taking high-order bits of said input operand as an address, residue holding means for holding a residue in finding the square root by iterating at a time a fixed number of bits from a high-order position downward, pre-correction partial square root value holding means for holding a partial square root value at each iteration, and a plurality of post-correction partial square root value holding means for holding respective post-correction partial square root values produced one after another at each iteration, inverting means for inverting the partial square root value bit by bit output from said pre-correction partial square root value holding means, multiplicand generating means, which left-shifts respective outputs of said plurality of post-correction partial square root value holding means one bit place, for generating a multiplicand in cooperation with the partial square root value holding means.

a residue multiplexer for selecting either a constant zero or the residue output from said residue holding means, a multiplicand multiplexer for selecting either the residue output from said residue holding means or an output of said multiplicand generating means, a multiplier multiplexer for selecting either the approximation of square root's reciprocal output from table information storing means or an output of said inverting means, complex operation means, which is supplied with an output of said residue multiplexer, R, an output of said multiplicand multiplexer, S, and an output of said multiplier multiplexer, T, for carrying out the operation $(R+S\times T)$, partial square root value calculation adding means at an output stage in said complex operation means, for carrying out a rounding off at a place one bit lower than the least significant bit of said partial square root value, shifting means for left-shifting an output from said complex operation means by a bit length of the partial square root value, a hold data switching multiplexer for selecting either said input operand or an output of said shifting means, as an input of said residue holding means, constant subtracting means for subtracting "1" from the least significant bit of the partial square root value output from said pre-correction partial square root value holding means, a correction multiplexer, which selects one from among the partial square root value output from said pre-correction partial square root value holding means, and an output of said constant subtracting means, for outputting the selected one as a post-correction partial square root value without a bit overlap, wherein:

high-order positions of the output of said complex operation means are held successively in said pre-correction partial square root value holding means, as a pre-correction partial square root value, and the post-correction partial square root values output one another from said correction multiplexer are held in said respective post-correction square root value holding means.

* * * * *